United States Patent
Hayashi et al.

(10) Patent No.: US 7,611,760 B2
(45) Date of Patent: Nov. 3, 2009

(54) CELLULOSE ACYLATE FILM, OPTICAL COMPENSATION FILM, POLARIZING PLATE AND LIQUID CRYSTAL DISPLAY

(75) Inventors: Hidenori Hayashi, Minami-Ashigara (JP); Keiichi Taguchi, Minami-Ashigara (JP); Kunihiro Atsumi, Minami-Ashigara (JP); Yutaka Nozoe, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 181 days.

(21) Appl. No.: 11/408,029

(22) Filed: Apr. 21, 2006

(65) Prior Publication Data

US 2006/0257589 A1    Nov. 16, 2006

(30) Foreign Application Priority Data

Apr. 22, 2005   (JP)   ............................. 2005-125463
Sep. 30, 2005   (JP)   ............................. 2005-288708

(51) Int. Cl.
*G02F 1/1335*   (2006.01)
(52) U.S. Cl. ..................................... 428/1.33; 349/118
(58) Field of Classification Search ................ 428/1.31, 428/1.33, 1.54; 536/58, 64; 349/96, 122, 349/117–118
See application file for complete search history.

(56) References Cited

U.S. PATENT DOCUMENTS

| | | | |
|---|---|---|---|
| 5,219,510 A * | 6/1993 | Machell et al. | 264/210.6 |
| 5,583,679 A | 12/1996 | Ito et al. | |
| 2002/0041352 A1* | 4/2002 | Kuzuhara et al. | 349/117 |
| 2004/0104496 A1* | 6/2004 | Arai et al. | 264/28 |
| 2004/0247918 A1* | 12/2004 | Hashimoto | 428/532 |
| 2005/0045064 A1* | 3/2005 | Oya | 106/170.27 |
| 2005/0150426 A1* | 7/2005 | Hashimoto et al. | 106/170.21 |
| 2005/0212172 A1* | 9/2005 | Sakamaki | 264/216 |

FOREIGN PATENT DOCUMENTS

| | | |
|---|---|---|
| EP | 0 911 656 A2 | 4/1999 |
| JP | 2000-131524 | 5/2000 |
| JP | 2001-129838 | 5/2001 |

OTHER PUBLICATIONS

JPO Website Machine English Translation of JP 2005-178194, Hashimoto, Jul. 7, 2005.*
Chandler, Two Faces of Water, Nature, vol. 417, p. 491, May 30, 2002.*

* cited by examiner

*Primary Examiner*—David R Sample
*Assistant Examiner*—Sophie Hon
(74) *Attorney, Agent, or Firm*—Buchanan Ingersoll & Rooney PC

(57) ABSTRACT

A cellulose acylate film is provided and has an elasticity modulus of 4,800 MPa to 10,000 MPa in at least either a machine direction MD at film-formation time or a direction TD perpendicular to the machine direction.

12 Claims, 2 Drawing Sheets

CELLULOSE ACYLATE FILM, OPTICAL COMPENSATION FILM, POLARIZING PLATE AND LIQUID CRYSTAL DISPLAY

FIELD OF THE INVENTION

The present invention relates to a cellulose acylate film, a polarizing plate and a liquid crystal display.

BACKGROUND OF THE INVENTION

Liquid crystal displays are widely used in personal computers, mobile equipment monitors and televisions since they have various advantages, e.g., in their low voltage and low consumption power and high possibility for reduction in size and profile. Although a variety of modes depending on how liquid crystalline molecules are aligned in a liquid crystal cell have been proposed for such liquid crystal displays, the dominating mode has hitherto been a TN mode in which liquid crystalline molecules are in an aligned state that their orientations twist by about 90° toward an upper side substrate from a lower side substrate.

In general a liquid crystal display is made up of a liquid crystal cell, an optical compensation film and a polarizer. The optical compensation film is used for dissolution of coloring of images and expansion of a viewing angle, and a stretched birefringent film or a transparent film coated with a liquid crystal is employed as the optical compensation film. For instance, Japanese Patent No. 2587398 discloses the art of expanding a viewing angle by applying to a TN-mode liquid crystal cell the optical compensation film formed by coating a discotic liquid crystal on a triacetyl cellulose film, forcing the liquid crystal into an aligned state and fixing the aligned state. However, liquid crystal displays for television use, which are supposed to be equipped with big screens and to be viewed from various angles, have stringent demands on viewing angle dependence, so even the foregoing art cannot satisfy such demands. Under these circumstances, liquid crystal displays employing modes different from the TN mode, such as an IPS (In-Plane Switching) mode, an OCB (Optically Compensatory Bend) mode and a VA (Vertically Aligned) mode, have been studied. The VA mode in particular has captured the spotlight in liquid crystal displays for TV uses because it can ensure high contrast and relatively high manufacturing yield.

Cellulose acylate films have a feature that they are high in optical isotropy (low in retardation value), compared with other polymer films. Accordingly, it is a general rule that cellulose acetate film is used for applications requiring optical isotropy, such as for polarizing plates. JP-A-2000-131524 in particular discloses the method of manufacturing a cellulose acetate film having high transparency and a low content of insoluble matter by specifying the relationship between a viscosity-average polymerization degree of cellulose acetate and a viscosity of the dope prepared by dissolving the cellulose acetate in a solvent. In addition, JP-A-2001-129838 discloses a desirable relationship between the thickness d of cellulose acetate film, the solids content y (%) in a solution for forming the cellulose acetate film and the viscosity ρ of the solution for the purpose of resolving sheet troubles referred to as die streaks.

By contrast, optical anisotropy (high retardation value) is required of optical compensation sheets (retardation films) used in liquid crystal displays. The optical compensation sheets for VA-mode in particular are required to have an in-plane retardation (Re) of 30 nm to 200 nm and a thickness-direction retardation (Rth) of 70 nm to 400 nm. Therefore, it is a general rule that synthetic polymer films having high retardation values, such as polycarbonate film and polysulfone film, are used as optical compensation sheet.

As mentioned above, it has been a general rule in the technical field of optical materials that synthetic polymer films are used in the case of requiring for polymer films to have optical anisotropy (high retardation values Re and Rth), whereas cellulose acetate film is used in the case of requiring for polymer films to have optical isotropy (low retardation values).

EP-A-911656 discloses the cellulose acetate film having high retardation values which, though against the rule hitherto regarded as general, is also usable for applications requiring optical anisotropy. In that patent, a compound having at least two aromatic rings, notably a compound having a 1,3,5-triazine ring, is added and stretch processing is performed in order to achieve high retardation values in the case of using cellulose acetate.

Although it is generally known that cellulose acetate is a polymer material hard to stretch and its birefringence factor is difficult to increase, the patent document cited makes it possible to increase the birefringence factor through simultaneous alignment of the additive molecules by stretch processing and achieves high retardation values (Re, Rth). Such a film can also serve as protective film of a polarizing plate, so it has an advantage in its suitability for offering thin liquid crystal displays at low prices.

The method described in the patent document cited helps offer thin liquid crystal displays at low prices.

On the other hand, when liquid crystal displays are exposed to varying temperatures and humidities, changes in dimensions are induced in polarizing plates and thereby glass cells suffer warping. When the glass cells suffer warping, the edge part thereof is brought into contact with a flame part and light leaks occur in the contact part. A main cause of the warping is dimensional changes occurring in the polarizing plate through shrinkage in its polarizer. Chief among measures to control the warping is enhancement of stiffness of a protective film for the polarizer, e.g., through an increase in thickness or elasticity modulus of the protective film. The term "stiffness" as used herein is defined as the product of film thickness and elasticity modulus. Since thickness reduction is now required for polarizing plates, it is impossible to increase the thickness in the extreme. Therefore, films with high elasticity moduli have been required. With respect to the control of film's physical properties, however, controls of an in-plane retardation and a thickness-direction retardation, which relate to display qualities, such as viewing angle contrast and hue, have been assigned the highest priority, whereas elasticity modulus control has been difficult since even any technique to control an elasticity modulus has never been developed.

The light leaks are observed more noticeably when there is a large difference between the elasticity modulus in a film-conveying direction (machine direction) and the elasticity modulus in the direction orthogonal thereto.

This phenomenon stems from anisotropy induced in amounts of dimensional changes depending on temperature and humidity. In regard to this point also, it has been expected to initiate improvements.

SUMMARY OF THE INVENTION

An object of an illustrative, non-limiting embodiment of the invention is to provide a cellulose acylate film having a high elasticity modulus.

Another object of an illustrative, non-limiting embodiment of the invention is to provide a liquid crystal display which does not cause light leaks from its edge part by changes in temperature and humidity, and besides, which is reduced in viewing angle characteristic change as well as optical characteristic and hue changes according to variations in ambient humidity.

Although cellulose acylate films are produced following a course that includes dope preparation, flow casting and stretching in the order of mention, it has been found as a result of our intensive studies that the foregoing objects can be attained by stretching condition control, thereby achieving the invention.

Of stretching conditions, adjustment of a solvent content at the start of a stretching operation to a specified range is especially effective in enhancing an elasticity modulus. Alternatively, film stiffness can be enhanced without increase in film thickness through a high elasticity modulus acquired by addition of a compound having two or more groups capable of forming hydrogen bonds, preferably a compound having not only two or more groups capable of forming hydrogen bonds but also two or more aromatic rings and further by performance of stretching under specified conditions; as a result, it becomes possible to make liquid crystal displays free of light leaks incident to the occurrence of warping.

Those objects can be attained with the following embodiments of the invention.

(1) A cellulose acylate film having an elasticity modulus of 4,800 MPa to 10,000 MPa in at least one direction of a machine direction MD in producing of the cellulose acylate film and a direction TD perpendicular to the machine direction.

(2) The cellulose acylate film as described in (1), which is produced by stretching a film having a solvent in a proportion of 20% by mass (weight) or less at the start of the stretching.

(3) The cellulose acylate film as described in (1) or (2), which has undergone a stretching at a drawing ration of 1.01 to 3.

(4) The cellulose acylate film as described in any one of (1) to (3), which has undergone a stretching at a temperature of 70° C. to 250° C.

(5) The cellulose acylate film as described in (1), which is produced under a condition that a ratio between an elasticity modulus S(MD) of the cellulose acylate film in the machine direction MD in producing of the cellulose acylate film and an elasticity modulus S(TD) of the cellulose acylate film in the direction TD satisfies Expression:

$$0.95 < S(MD)/S(TD) < 1.05$$

(6) The cellulose acylate film as described in (5), which comprises a compound having at least two groups each capable of forming a hydrogen bond.

(7) The cellulose acylate film as described in (5) or (6), which has undergone a biaxial stretching at a drawing ration of 1.01 to 2.

(8) The cellulose acylate film as described in any one of (5) to (7), which is produced by a method comprising:
flow-casting a cellulose acylate solution on a drum-shaped metal support to provide a film;
stretching the film in the machine direction MD; and
stretching the film in the direction TD,
wherein
a residual solvent content in the film at the start of the stretching in the machine direction MD is 60% by weight or more, and a residual solvent in the film at the start of the stretching in the direction TD is 80% by weight or less.

(9) The cellulose acylate film as described in any one of (5) to (7), which is produced by a method comprising:
flow-casting a cellulose acylate solution on a band-shaped metal support to provide a film;
stretching the film in the machine direction MD; and
stretching the film in the direction TD,
wherein
a residual solvent content in the film at the start of the stretching in the machine direction MD is 25% by weight or more, and a residual solvent in the film at the start of the stretching in the direction TD is 25% by weight or less.

(10) The cellulose acylate film as described in any one of (1) to (9), which has an in-plane retardation $Re(\lambda)$ satisfying Expression 20 nm$\leq Re(590) \leq$200 nm and a thickness-direction retardation $Rth(\lambda)$ satisfying Expression 70 nm$\leq Rth(590) \leq$350 nm.

(11) The cellulose acylate film as described in any one of (1) to (10), which has a thickness of 40 μm to 150 μm.

(12) The cellulose acylate film as described in any one of (1) to (11), which comprises mixed fatty acid ester of cellulose, wherein a hydroxyl group of the cellulose is substituted by an acetyl group, another hydroxyl group of the cellulose is substituted by an acyl group having 3 or more carbon atoms, and the cellulose acylate film satisfies Expressions (I) and (II):

$$2.0 \leq A+B \leq 3.0 \quad \text{(I)}$$

$$0 \leq B \quad \text{(II)}$$

wherein A represents a substitution degree of the acetyl group, and B represents a substitution degree of the acyl group having 3 or more carbon atoms.

(13) The cellulose acylate film as described in (12), wherein the acyl group is a butanoyl group.

(14) The cellulose acylate film as described in (12), wherein the acyl group is a propionyl group, and the substitution degree B is at least 0.6.

(15) The cellulose acylate film as described in (12), which comprises cellulose acylate comprising a glucose unit, wherein a hydroxyl group of the glucose unit is substituted by an acyl group having 2 or more carbon atoms, and the cellulose acylate film satisfies Expressions (III) and (IV):

$$2.0 \leq DS2+DS3+DS6 \leq 2.85 \quad \text{(III)}$$

$$DS6/(DS2+DS3+DS6) \geq 0.315 \quad \text{(IV)}$$

wherein DS2 represents a substitution degree of the acyl group for a 2-position hydroxyl group of the glucose unit, DS3 a substitution degree of the acyl group for a 3-position hydroxyl group of the glucose unit, and DS6 a substitution degree of the acyl group for a 6-position hydroxyl group of the glucose unit.

(16) The cellulose acylate film as described in any one of (1) to (15), which comprises a retardation developer.

(17) The cellulose acylate film as described in any one of (1) to (16), which comprises a retardation developer in an amount of 10 parts by weight or less with respect to 100 parts by weight of cellulose acylate.

(18) The cellulose acylate film as described in any one of (1) to (17), which comprises at least one of a plasticizer, an ultraviolet absorber and a release accelerator.

(19) A optical compensation film comprising: a cellulose acylate film as described in any one of (1) to (18); and all optically anisotropic layer.

(20) A polarizing plate comprising: a polarizer; and a cellulose acylate film as described in any one of (1) to (18) or an optical compensation film as described in (19), wherein the cellulose acylate film or the optical compensation film is disposed between the polarizer and a liquid crystal cell.

(21) A polarizing plate comprising: a polarizer; and a cellulose acylate film as described in any one of (1) to (18) or an optical compensation film as described in (19), wherein the polarizer is disposed between the cellulose acylate film or the optical compensation film and a liquid crystal cell.

(22) The polarizing plate as described in (20) or (21), which comprises a protective film positioned on the side opposite to the liquid crystal cell, wherein the protective film is at least one of a hard coating layer, an antiglare layer or an antireflection layer.

(23) A liquid crystal display comprises a cellulose acylate film as described in any one of (1) to (18) or a polarizing plate as described in any one of (19) to (21).

(24) The liquid crystal display as described in (23), which is of VA mode.

The invention can provide a cellulose acylate film having a high elasticity modulus.

Further, the invention can provide a liquid crystal display which does not cause light leaks from its edge part by changes in temperature and humidity, and besides, which is reduced in viewing angle characteristic change as well as optical characteristic and hue changes according to variations in ambient humidity.

DETAILED DESCRIPTION OF THE INVENTION

Figure 1:
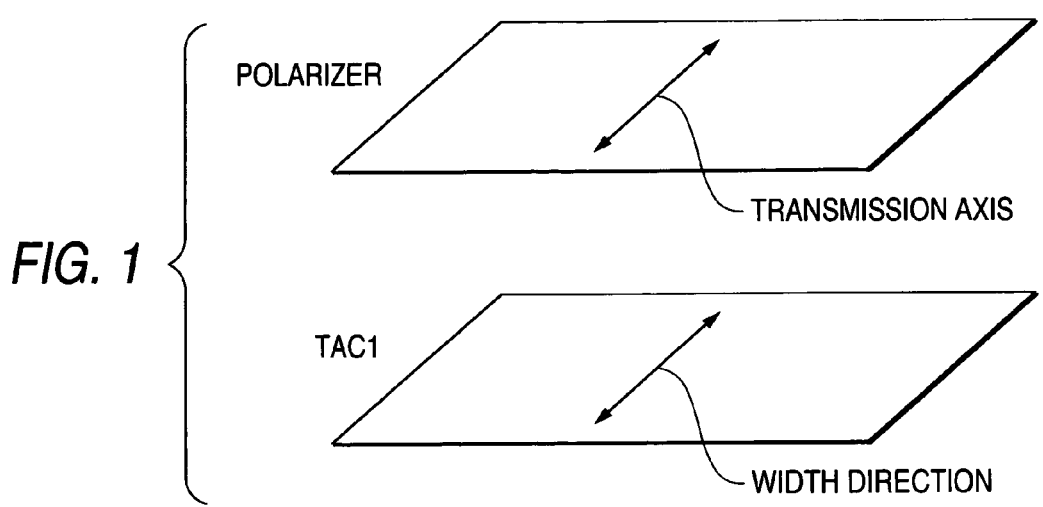
FIG. 1 is a schematic view showing an example of a way of stacking a cellulose acylate film at the time of making a polarizing plate in accordance with an exemplary embodiment of the invention.

The invention is described below in detail.

<Cellulose Acylate Film>

(Elasticity Modulus)

A cellulose acylate film according to an exemplary embodiment of the invention has an elasticity modulus of 4,800 MPa to 10,000 MPa in either a machine direction at film-formation time (in producing of the cellulose acylate film) or a direction perpendicular to the machine direction. The suitable elasticity modulus is from 5,000 MPa to 9,000 MPa, especially from 5,300 MPa to 8,500 MPa. In reducing changes in dimensions of a polarizing plate and causing no light leaks associated with warping of a glass cell, it is desirable that the elasticity modulus of the film be 4,800 MPa or above. Although it is essential only that the film has an elasticity modulus of 4,800 MPa to 10,000 MPa in either the machine direction or the direction perpendicular to the machine direction, it is preferable that the film has an elasticity modulus of 4,800 MPa to 10,000 MPa in both the machine direction and the direction perpendicular to the machine direction, and it is preferable by far that the elasticity modulus in both the machine direction and the direction perpendicular to the machine direction is from 5,300 MPa to 8,500 MPa.

In not causing light leaks by a photoelastic effect, it is especially desirable that the elasticity modulus in the machine direction (S(MD)) and the elasticity modulus in the direction perpendicular to the machine direction (S(TD)) conform to the following expression:

$$0.95 < S(MD)/S(TD) < 1.05$$

The elasticity modulus can be calculated from stress and elongation in the early stage of stretch, which are measured under conditions that a specimen measuring 10 mm×200 mm in size is allowed to stand for 2 hours in the 25° C.-60% RH atmosphere for a humidity-conditioning purpose and then extended with a tensile tester (Strography R2 made by Toyo Seiki Kogyo Co., Ltd.) wherein the setting of an initial specimen length is 100 nm and that of an extension speed is 10 mm/min.

In general, when nodes among cellulose acylate chains are greater in number, the elasticity modulus becomes the higher. This is because the stretching force propagates through cellulose acylate chains with efficiency when stretching is carried out in a node-rich condition to result in highly efficient alignment of cellulose acylate chains and acceleration of crystallization by alignment. The term "nodes" as used herein refers to the microcrystalline parts formed by gathering of cellulose acylate chains.

Examples of a method of increasing the number of nodes in a film include a method of performing a stretching operation in a condition that the amount of a solvent remaining in a film is relatively small, a method of introducing easy-to-crystallize sites into polymer chains, and a method of adopting a highly hydrophobic solvent composition. Of these methods, the method of performing a stretching operation in a region where the amount of residual solvent is relatively small has an advantage over the others in its fewer modifications to the current production formula. Stretching methods usable herein are described hereinafter.

In another method of enhancing the elasticity modulus of a film, additives are utilized. While additives having weak interactions with polymer chains lower elasticity moduli of films, the addition of compounds having strong interactions, notably a compound having a plurality of interaction sites, enhances elasticity moduli of films because the compounds act as pseudocross-linking sites to link polymer chains together. In the cellulose acylate film's case, groups capable of forming, say, hydrogen bonds are effective as interaction sites. In producing the present film, it is therefore preferable that a compound having two or more groups capable of forming hydrogen bonds is added as an elasticity-modulus improver, and it is especially preferable to add a compound having two or more aromatic rings as well as two or more groups capable of forming hydrogen bonds.

When such an elasticity-modulus improver is unevenly distributed in only one surface area of a film, it becomes a cause of curling in some cases. In addition, there may be cases where an excessive rise in concentration of an elasticity-modulus improver occurs locally because of an uneven distribution and thereby bleedout, crystallization and an increase in haze by cohesion are caused. Therefore, it is preferable that the elasticity-modulus improver is present evenly in a film. The present film is generally formed using a solution casting method as described hereinafter. At the initial stage of film formation, the film is dried on a support for use in solution casting. So the drying proceeds from the film's surface on the air-contact side. An unduly progress in drying tends to cause uneven distribution of an elasticity-modulus improver to the support side. For prevention of such an uneven distribution, it is preferable that the film is stripped off the support when the solvent remains in the film in a large amount.

(Stretching)

Methods of producing the present cellulose acylate film are hereinafter described in detail. Although stretching of cellulose acylate film may be performed in the course of film formation or it may be performed after the whole film formed in the form of web is wound into a roll, the stretching performed in the course of film formation is preferable. In the case of performing a stretch operation in the course of film formation, the stretch operation may be carried out as the film formed still contains a residual solvent. It is possible to control the amount of a residual solvent by adjustment of process conditions during the period from just after flow casting to just before stretching, namely a drying temperature and a volume of drying air. As mentioned above, it is possible to adopt the method of performing a stretching operation in a region where the amount of a residual solvent is relatively small. In this case, stretching can be performed favorably in a condition that the content of a solvent remaining in the film at the start of a stretching operation is from 0 to 20% by mass, preferably from 0 to 15% by mass, particularly preferably from 0 to 10% by mass.

The stretching may be uniaxial stretching in a vertical or lateral direction alone, or simultaneous or sequential biaxial stretching. Since the present cellulose acylate film has its elasticity modulus in the specified range, it is appropriate that the film undergo 1.01- to 3-times stretching (i.e., a stretching ration of 1.01 to 3). Further, in order to develop certain favorable retardation, the film is subjected to 1.15- to 2.8-times stretching, particularly preferably 1.30- to 2.6-times stretching. In point of a risk of film rupture, at most 3-times stretching is appropriate. Further, from the viewpoint of permitting roll-to-roll processing of polarizing plates, it is preferable that the film is stretched to a greater extent in the width direction.

In order to stretch the film by a factor in the foregoing range even in a condition that the amount of solvent remaining is small, it is appropriate that the temperature of the film at stretch-time be adjusted to a range of 70° C. to 250° C., preferably 80° C. to 200° C., particularly preferably 100° C. to 150° C. In point of great elongation at break and stretch of a high magnification, it is preferable that the film temperature at stretch-time is 70° C. or above. On the other hand, it is preferable in point of protection of cellulose acylate and additives from decomposition that the film temperature at stretch-time is 250° C. or below.

When an elasticity-modulus improver is used, as described in the previous paragraph headed "Elasticity Modulus", there may be cases where an unduly progress in drying causes uneven distribution of the elasticity-modulus improver to the side of a support used for solution casting since the drying of the film on the support used for solution casting proceeds from the film's surface on the air-contact side; as a result, there occur troubles, such as curing, bleedout and increase in haze. For prevention of such troubles, it is appropriate that the film be stripped off the support when the solvent remains in the film in a large amount.

Moreover, it is preferable that the film undergoes biaxial stretching for the purposes of enhancing its elasticity modulus and controlling elasticity-modulus anisotropy. Although the biaxial stretching may be simultaneous biaxial stretching or sequential biaxial stretching, sequential biaxial stretching which enables continuous production is preferable from the viewpoint of productivity. In general the stretching in the MD is performed by means of a difference between rotation speeds of conveying rollers and the stretching in the TD is performed with a tenter. In the stretching with conveying rollers, it is difficult to give a great stress to the film, so it is appropriate that the stretching in the MD be carried out in a condition of a large amount of residual solvent so as to enable great stretching by a small stress. On the other hand, the stretching with a tenter can impart a great stress, so it is preferable that the stretching is carried out in a condition of a small amount of residual solvent so as to achieve a great increase in elasticity modulus even by a small stretching ratio.

For these reasons, in a production method using as a cellulose acylate solution a dope containing an alcohol solvent as a poor solvent in a proportion of 15% or above, it is preferable to start the stretching in the MD in conditions that the residual solvent content is 40% by mass or above, especially from 60% to 80% by mass. On the other hand, it is preferable to start the stretching in the TD in conditions that the residual solvent content is below 80% by mass, especially from 5% to 75% by mass. The dope containing an alcohol solvent in a proportion of 15% or above can be favorably used, e.g., in a production method using a drum-shaped metal support as mentioned hereinafter.

In a production method using as a cellulose acylate solution a dope containing an alcohol solvent as a poor solvent in a proportion lower than 15%, it is preferable to start the stretching in the MD in conditions that the residual solvent content is 25% by mass or above, especially from 25% to 50% by mass. On the other hand, it is preferable to start the stretching in the TD in conditions that the residual solvent content is below 25% by mass, especially from 1% to 20% by mass. The dope containing an alcohol solvent in a proportion lower than 15% can be favorably used, e.g., in a production method using a band-shaped metal support as mentioned hereinafter.

Additionally, in the case of using an elasticity-modulus improver, it is appropriate to perform a 1.01- to 2-times stretching, preferably a 1.01- to 1.6-times stretching, far preferably a 1.01- to 1.4-times stretching.

(Elasticity-Modulus Improver)

Elasticity-modulus improvers relating to the invention are described below.

The compound suitable as an elasticity-modulus improver is a compound containing at least two groups capable of forming hydrogen bonds so as to form pseudocross-linking sites among cellulose acylate chains and having a structure producing a slight plasticization effect. However, when the compound used is too hydrophilic because its groups capable of forming hydrogen bonds are large in number, the water permeability of the film becomes great, and so there occur troubles that durability of a polarizing plate under humid and hot conditions deteriorates and the elasticity-modulus improver added is eluted from the film by a water-based treatment, such as saponification treatment. Therefore, it is especially preferable that the compound added has 2 to 4 groups capable of forming hydrogen bonds and two or more aromatic rings for enhancing hydrophobicity, and it is best to add a compound having 2 to 4 groups capable of forming hydrogen atoms and 3 to 7 aromatic rings.

The term "group capable of forming a hydrogen bond" as used in the invention refers to the functional group having a hydrogen atom and capable of forming a hydrogen bond between the hydrogen atom and another functional group having high electronegativity. As groups capable of forming hydrogen bonds, an amino group, an acylamino group, an alkoxycarbonylamino group, an aryloxycarbonylamino group, a sulfonylamino group, a hydroxyl group, a mercapto group, a carboxyl group are suitably used in the invention. Of these functional groups, hydroxyl, acylamino and sulfonylamino groups in particular are preferred.

In the invention, the suitable content of the elasticity-modulus improver in a cellulose acylate film is from 1% to 30%, preferably from 5% to 20%, particularly preferably from 7% to 16%.

Since the elasticity-modulus improvers have a plurality of groups capable of forming hydrogen bonds per molecule and form pseudocross-linking sites among cellulose acylate chains, they have effects on not only enhancement of elasticity modulus but also reduction in linear thermal expansion coefficient.

Each of the elasticity-modulus improvers has moderate hydrophobicity because aromatic rings are present therein, and further contains a plurality of groups capable of forming hydrogen bonds and thereby binds cellulose acylate chains together. Therefore, it is difficult to open up the space between main chains in the case of using the compound containing groups capable of forming hydrogen bonds, compared with the case of using compounds containing no groups capable of forming hydrogen bonds; as a result, it becomes hard to enlarge free volume regions in the film and an effect of lowering water permeability of the film is produced. When the cellulose acylate film is used as protective film of a polarizing plate, the film with low water permeability is preferable because the durability of the polarizer is enhanced, but too low water permeability is undesirable because water absorbed by a polarizer at the time of production is hard to get rid of. In the case of a cellulose acylate film formed in a thickness of 80 μm, it is appropriate that the water permeability of the film in the 60° C.-95% RH atmosphere be from 100 to 1,300 g/m²·24 hours, preferably from 150 to 1,200 g/m²·24 hours, particularly preferably from 200 to 1,000 g/m²·24 hours.

On the other hand, phosphoric acid ester compounds used generally as plasticizers are unfavorable in point of the foregoing low plasticity requirement, so it is preferable that their contents are low. In the present cellulose acylate film, the proportion of phosphoric acid compounds to cellulose acylate is preferably lower than 5% by weight, far preferably lower than 2% by weight, particularly preferably zero in a substantial sense.

Such phosphoric acid compounds include phosphoric acid ester compounds, notably triphenyl phosphate (TPP) and tricresyl phosphate (TCP). Representatives of carboxylic acid esters are phthalic acid esters and citric acid esters. Examples of phthalic acid esters include dimethyl phthalate (DMP), diethyl phthalate (DEP), dibutyl phthalate (DBP), dioctyl phthalate (DOP), diphenyl phthalate (DPP) and diethylhexyl phthalate (DEHP).

The suitable molecular weight of an elasticity-modulus improver relating to the invention is from 250 to 2,000. In addition, the suitable boiling point of the improver is 260° C. or above. The boiling point can be determined with a commercially available measuring apparatus (e.g., TG/DTA 100, made by Seiko Instruments Inc.).

Although various compounds are usable as the elasticity-modulus improvers according to the invention, compounds represented by the following formulae (A) and (B) can be used to particular advantage.

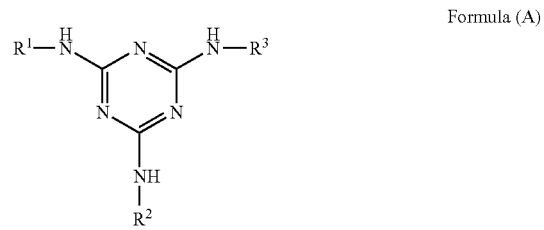

Formula (A)

In formula (A), $R^1$, $R^2$ and $R^3$ independently represent an alkyl group, an alkenyl group, an aromatic ring group or a heterocyclic group.

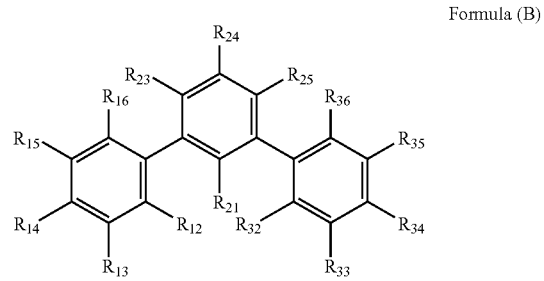

Formula (B)

In formula (B), $R^{12}$, $R^{13}$, $R^{14}$, $R^{15}$, $R^{16}$, $R^{21}$, $R^{23}$, $R^{24}$, $R^{25}$, $R^{32}$, $R^{33}$, $R^{34}$, $R^{35}$ and $R^{36}$ each represent a hydrogen atom or a substituent to which Substituent T recited hereinafter can be applied.

In the first place, compounds represented by formula (A) are described in detail.

Although $R^1$, $R^2$ and $R^3$ independently represent an alkyl group, an alkenyl group, an aromatic ring group or a heterocyclic group, it is preferable that each of them represents an aromatic ring group or a heterocyclic group. As the aromatic ring group represented by $R^1$, $R^2$ and $R^3$ each, a phenyl group or a naphthyl group is suitable, and a phenyl group is especially preferable. $R^1$, $R^2$ and $R^3$ each may have a substituent on its aromatic ring or heterocyclic ring. Examples of such a substituent include a halogen atom, a hydroxyl group, a cyano group, a nitro group, a carboxyl group, an alkyl group, an alkenyl group, an aryl group, an alkoxy group, an alkenyloxy group, an aryloxy group, an acyloxy group, an alkoxycarbonyl group, an alkenyloxycarbonyl group, an aryloxycarbonyl group, a sulfamoyl group, an alkyl-substituted sulfamoyl group, an alkenyl-substituted sulfamoyl group, an aryl-substituted sulfamoyl group, a sulfonamido group, a carbamoyl group, an alkyl-substituted carbamoyl group, an alkenyl-substituted carbamoyl group, an aryl-substituted carbamoyl group, an amido group, an alkylthio group, an alkenylthio group, an arylthio group and an acyl group.

When $R^1$, $R^2$ and $R^3$ each represent a heterocyclic group, the heterocyclic ring preferably has aromaticity. A heterocyclic ring having aromaticity is generally an unsaturated heterocyclic ring, preferably a heterocyclic ring having the greatest possible number of double bonds. Such a heterocyclic ring is preferably a 5-, 6- or 7-membered ring, far preferably a 5- or 6-membered ring, especially preferably a 6-membered ring. Suitable examples of hetero atoms in those heterocyclic rings include nitrogen, sulfur and oxygen atoms. Of these atoms, nitrogen is preferred over the others. As the heterocyclic ring having aromaticity, a pyridine ring (the group derived from which is 2-pyridyl or 4-pyridyl) in particular is suitable. The heterocyclic group may have a substituent. Examples of a substituent the heterocyclic group may have are the same substituents as recited above. These substituents may further be substituted with the substituents as recited above.

Suitable examples of a compound represented by formula (A) according to the invention are illustrated below, but the invention should not be construed as being limited to these examples.

I-(1)
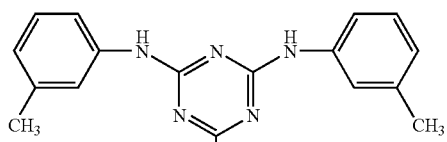

I-(2)
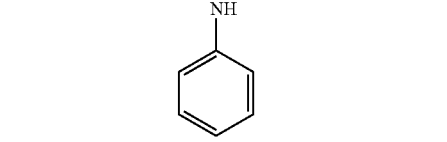

I-(3)
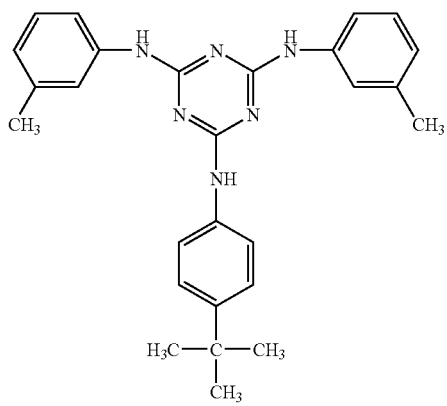

-continued

I-(4)
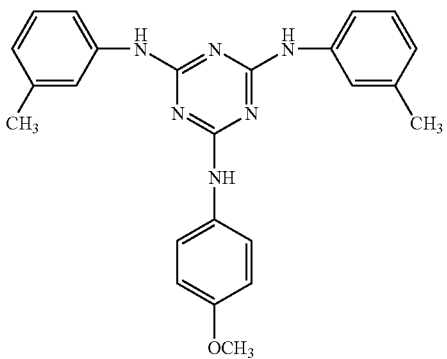

I-(5)
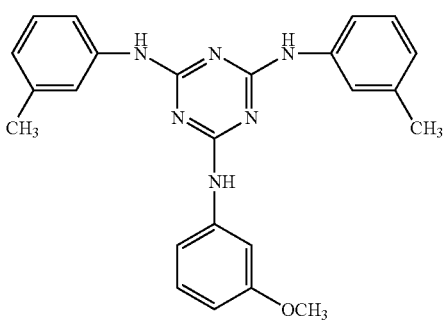

I-(6)
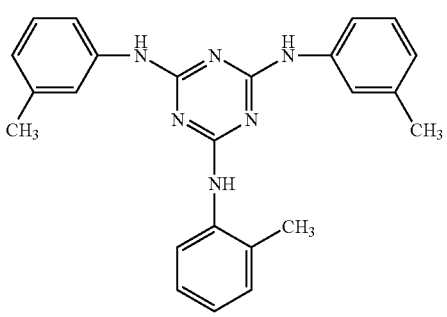

I-(7)
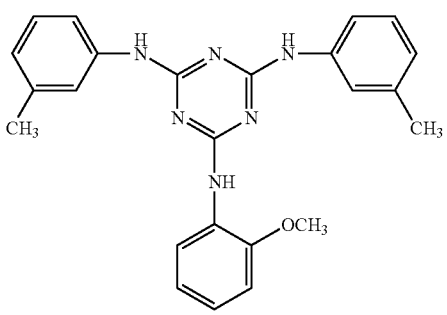

-continued
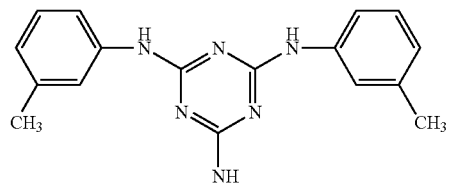
I-(8)
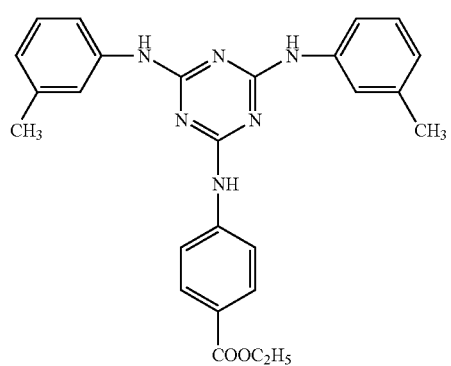
I-(9)
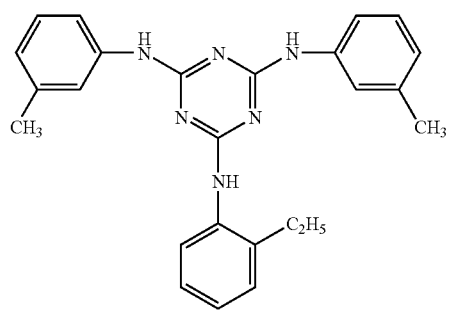
I-(10)
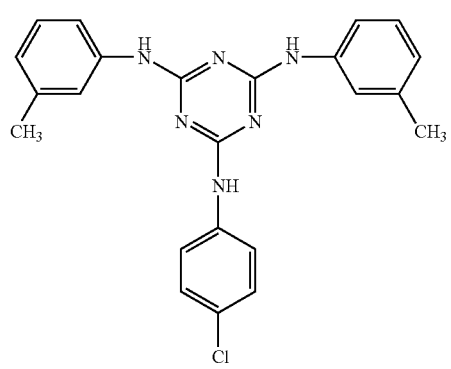
I-(11)
-continued
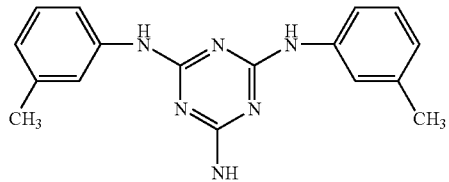
I-(12)
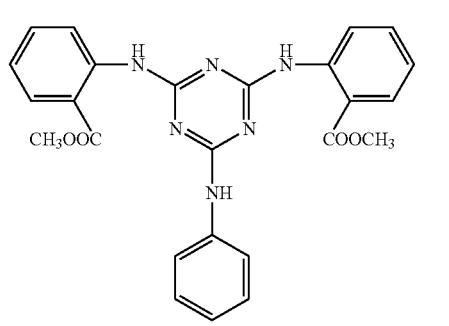
I-(13)
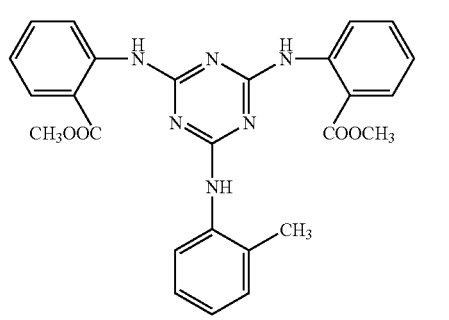
I-(14)
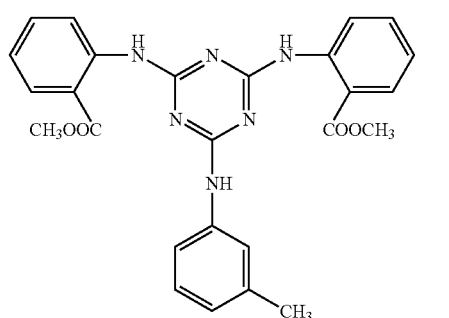
I-(15)
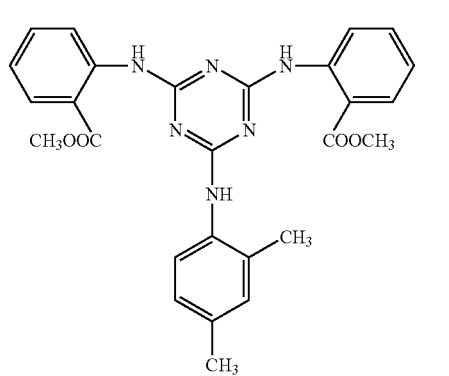
I-(16)

-continued
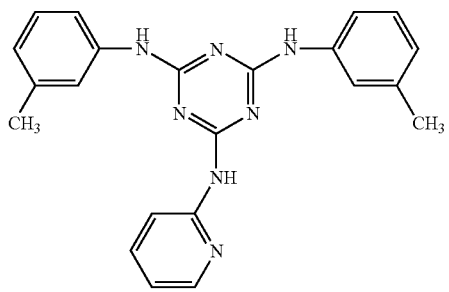
I-(17)
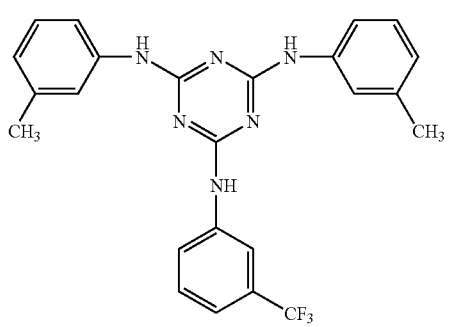
I-(18)
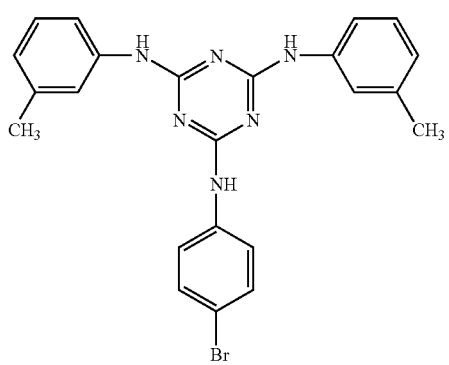
I-(19)
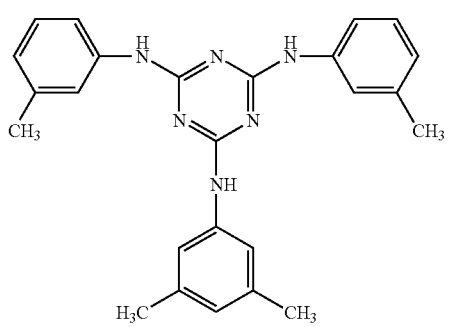
I-(20)
-continued
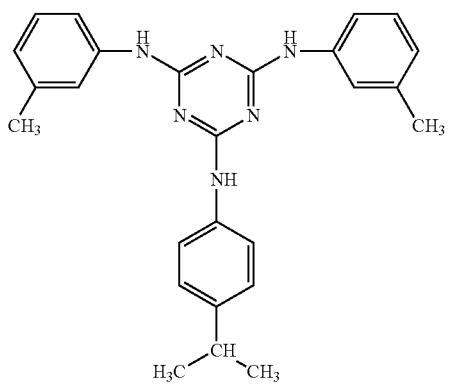
I-(21)
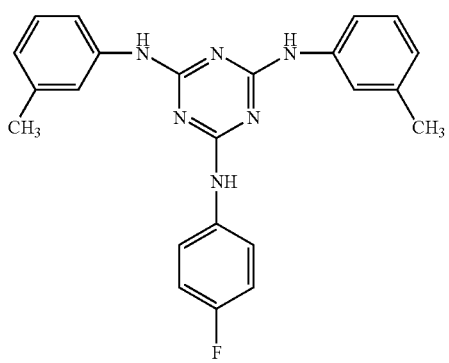
I-(22)
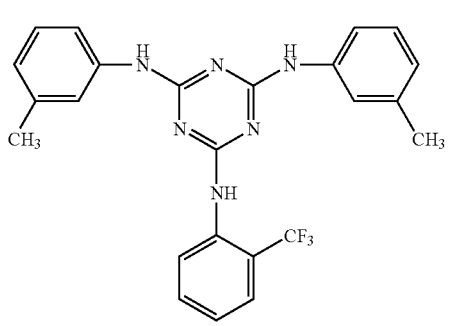
I-(23)
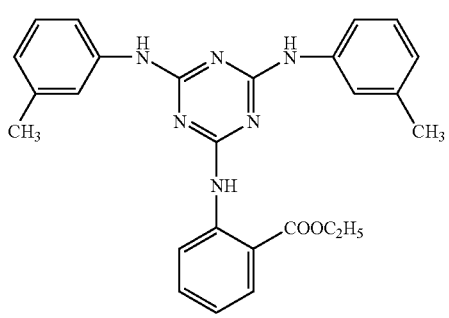
I-(24)

-continued
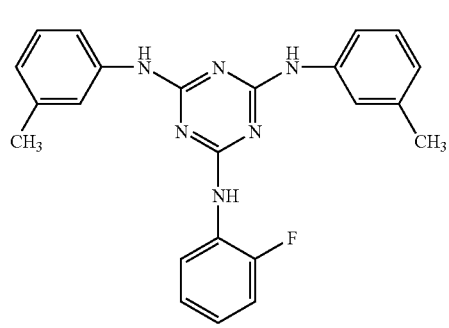
I-(25)
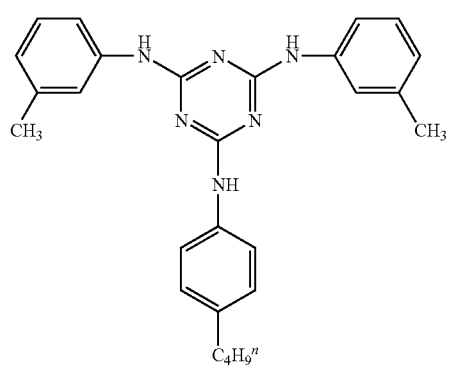
I-(26)
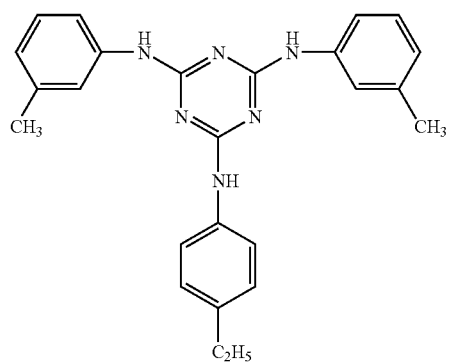
I-(27)
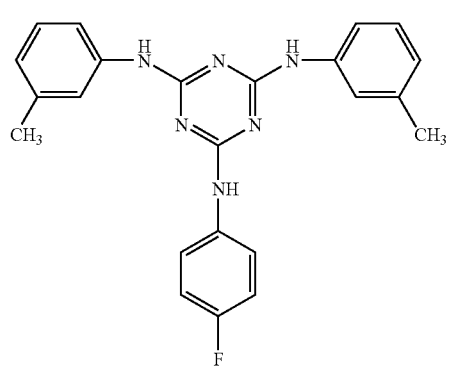
I-(28)
-continued
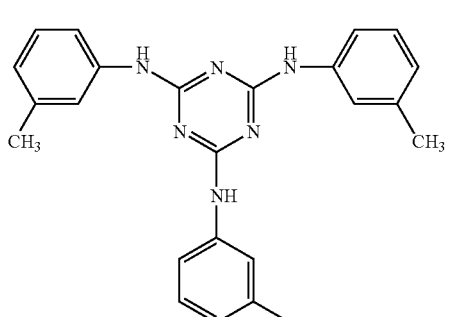
I-(29)
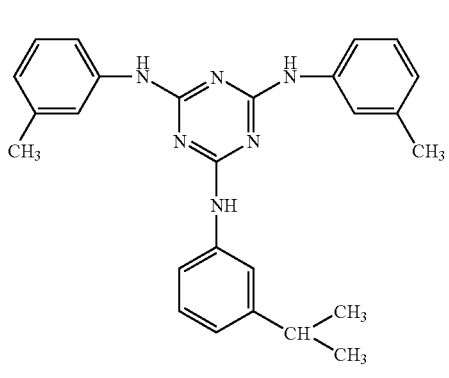
I-(30)
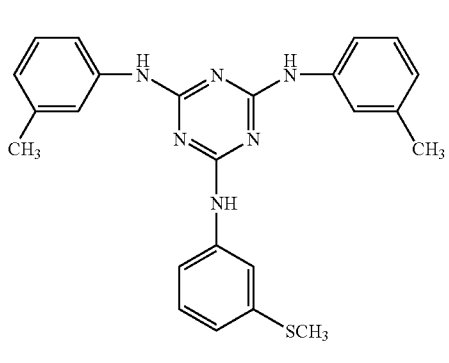
I-(31)
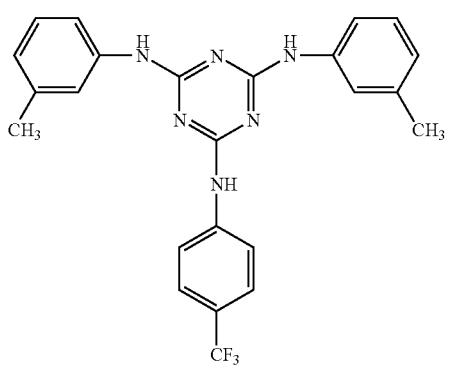
I-(32)

-continued
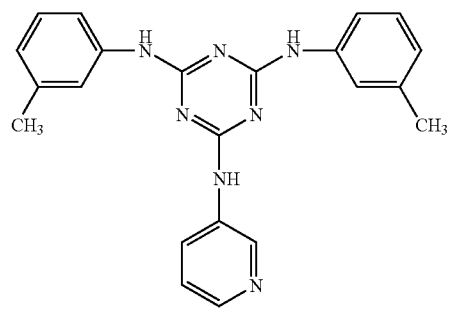
I-(33)
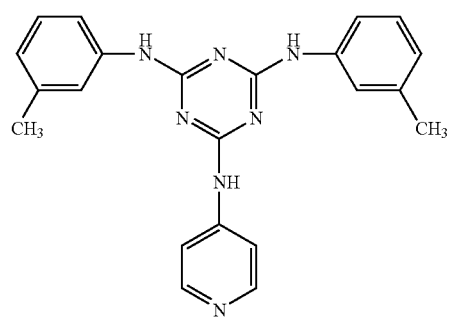
I-(34)
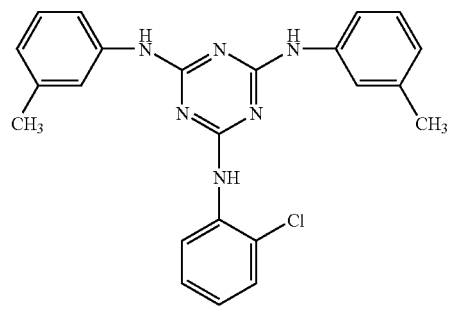
I-(35)
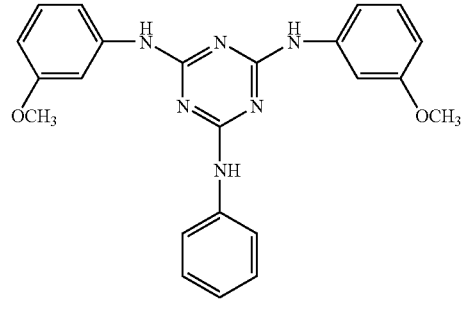
I-(36)
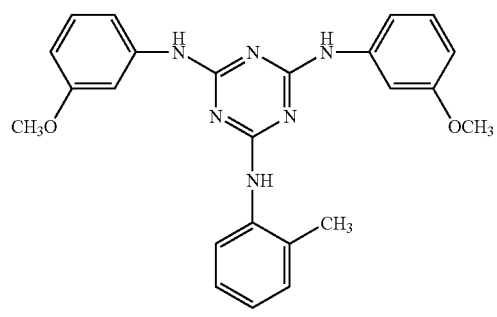
I-(37)
-continued
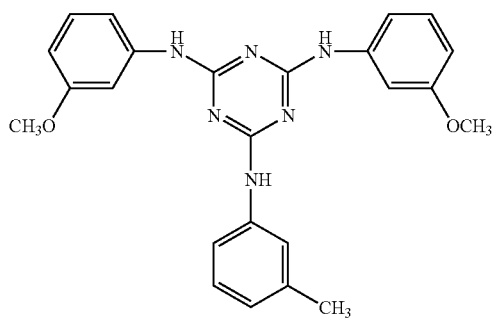
I-(38)
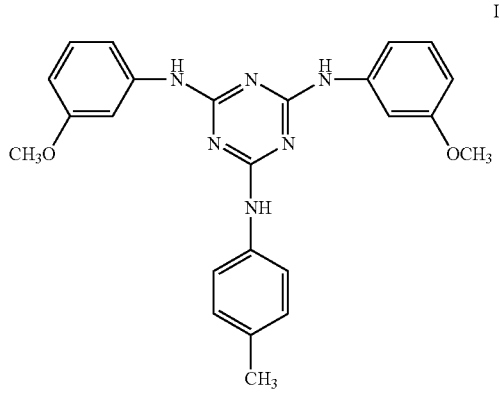
I-(39)
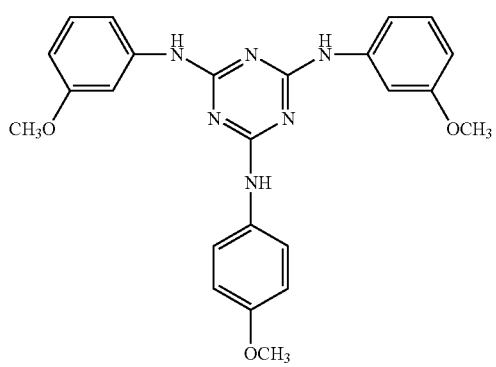
I-(40)
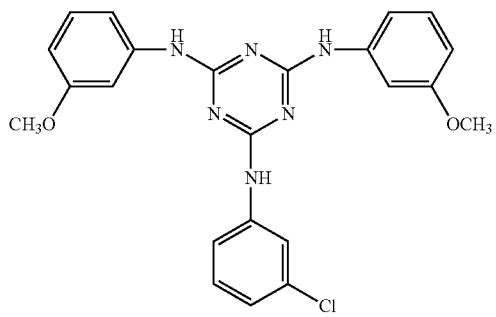
I-(41)

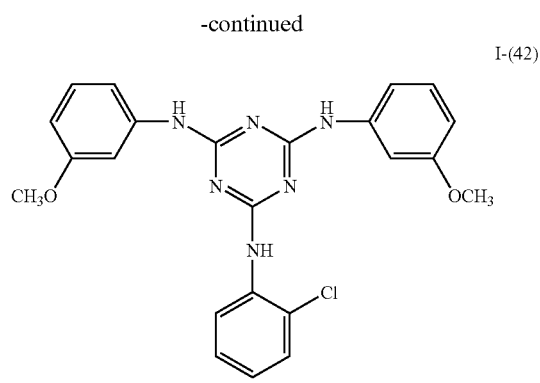
I-(42)
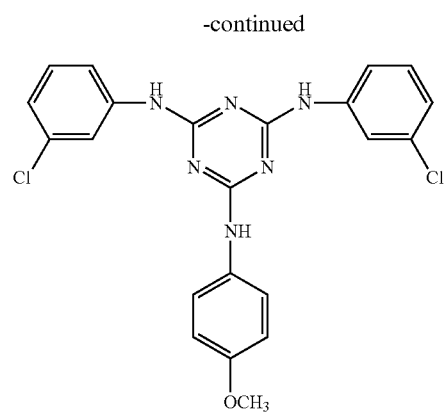
I-(46)
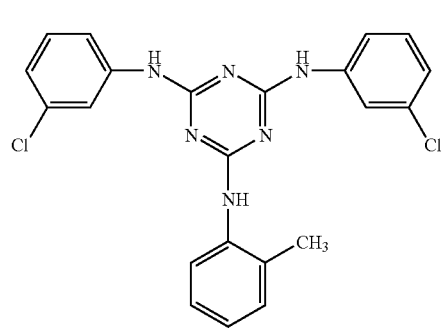
I-(43)
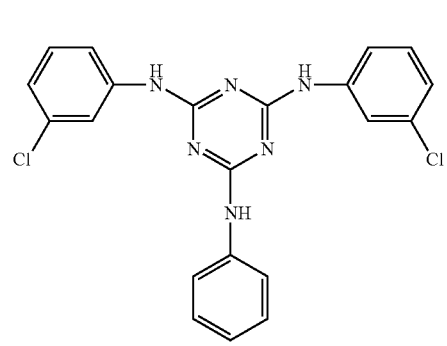
I-(47)
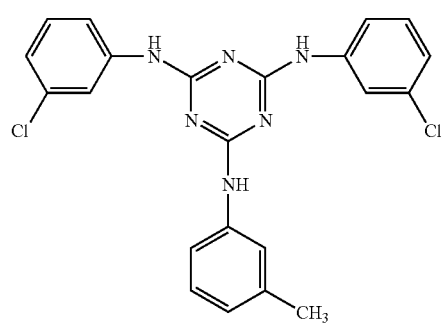
I-(44)
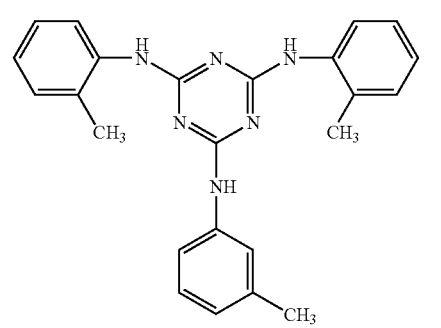
I-(48)
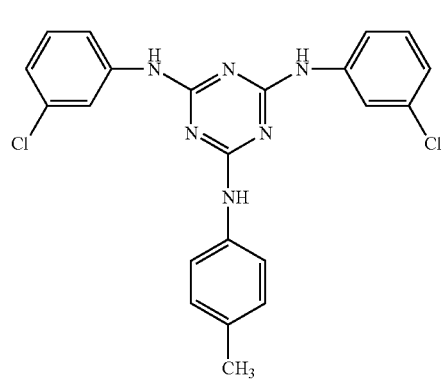
I-(45)
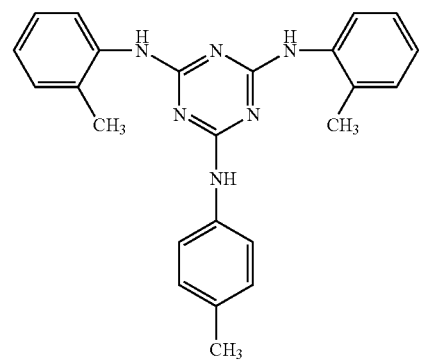
I-(49)

-continued
I-(50)
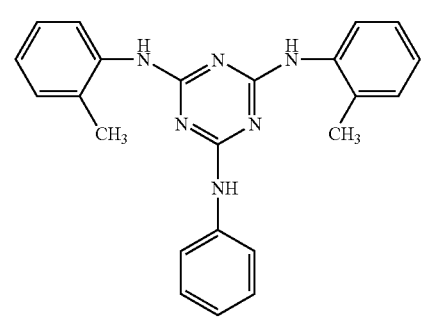
II-(1)
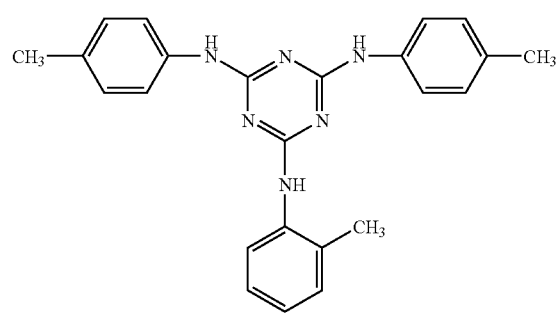
II-(2)
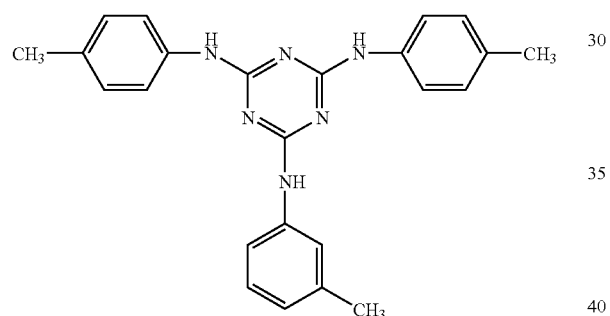
II-(3)
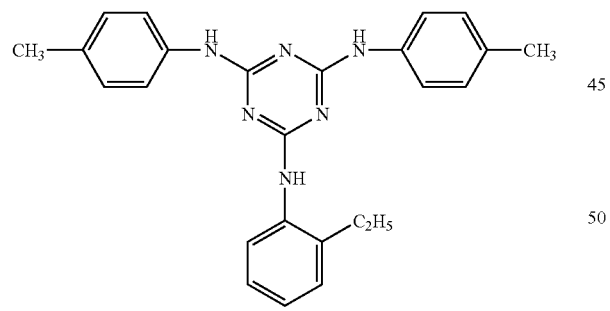
II-(4)
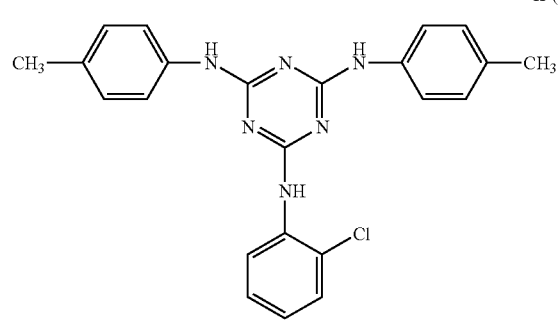
-continued
II-(5)
II-(6)
II-(7)
II-(8)
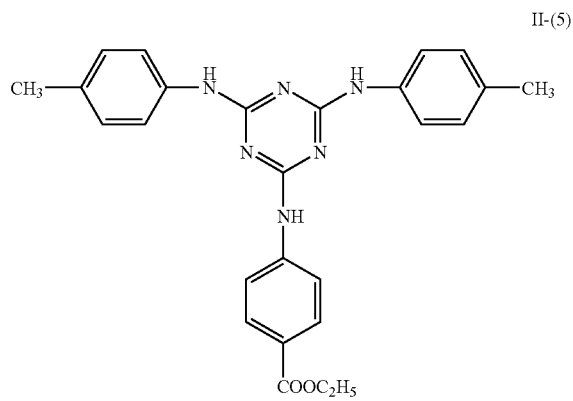

-continued
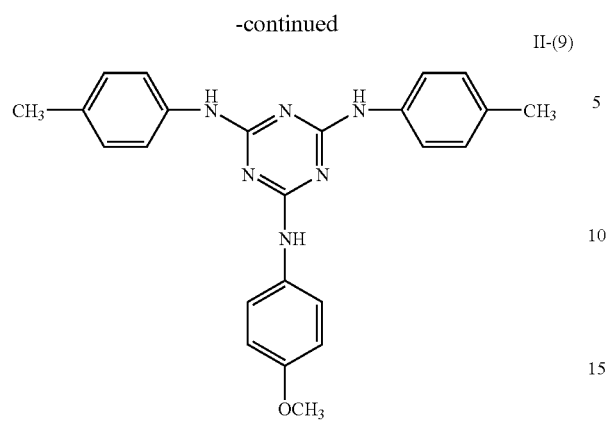
II-(9)
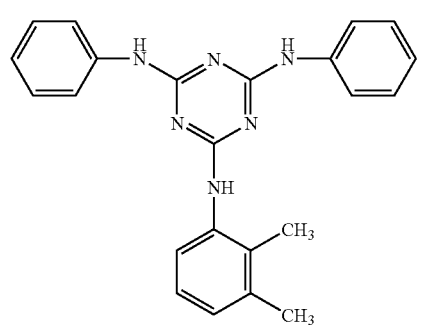
III-(1)
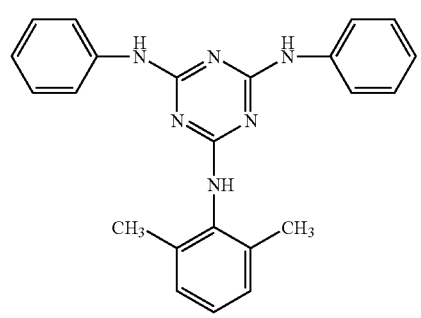
III-(2)
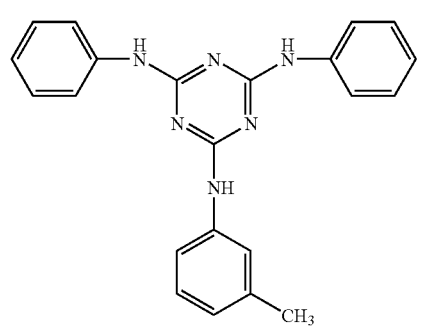
III-(3)
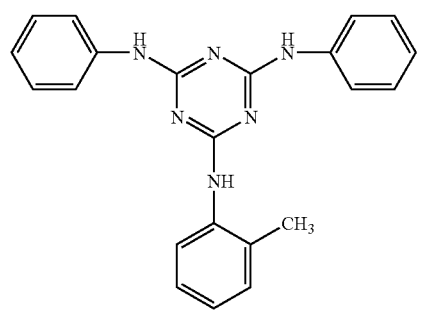
III-(4)
-continued
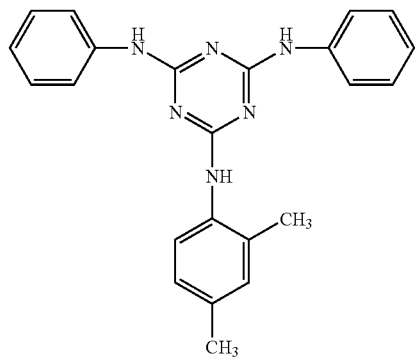
III-(5)
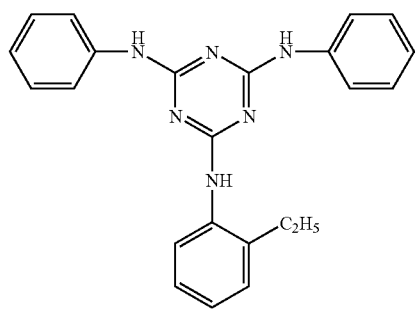
III-(6)
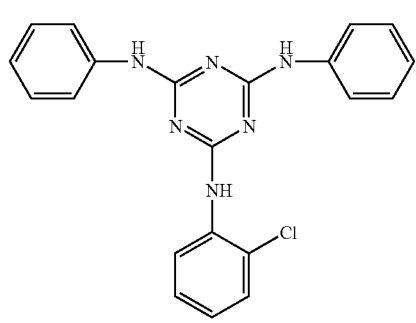
III-(7)
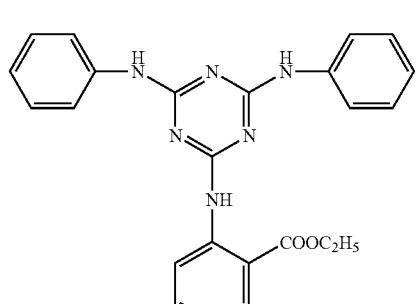
III-(8)
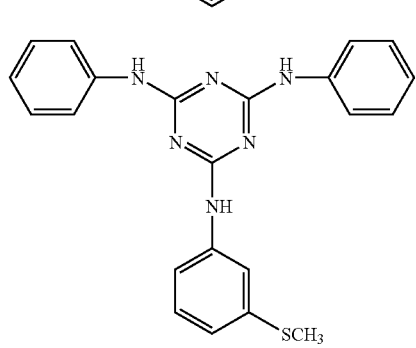
III-(9)

-continued
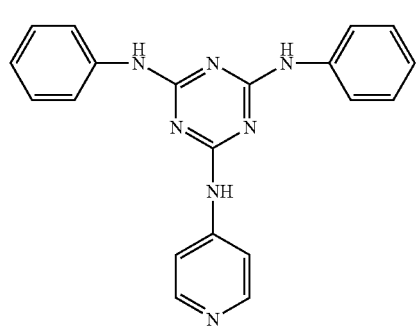
III-(10)
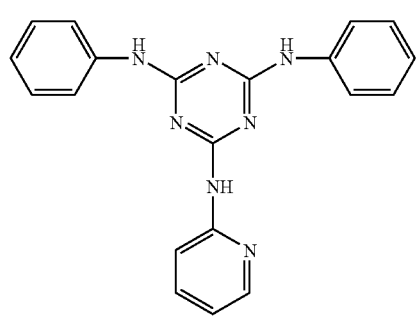
III-(11)
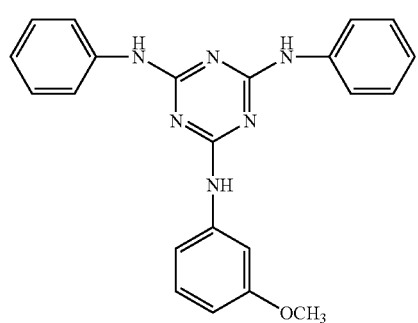
III-(12)
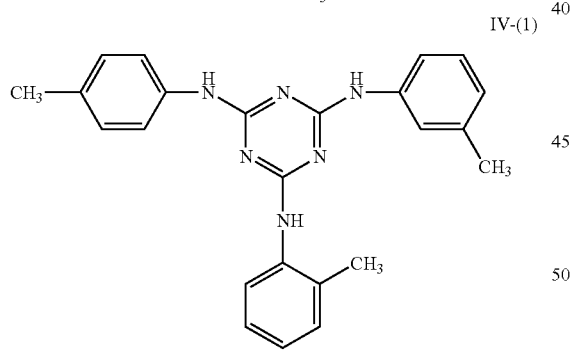
IV-(1)
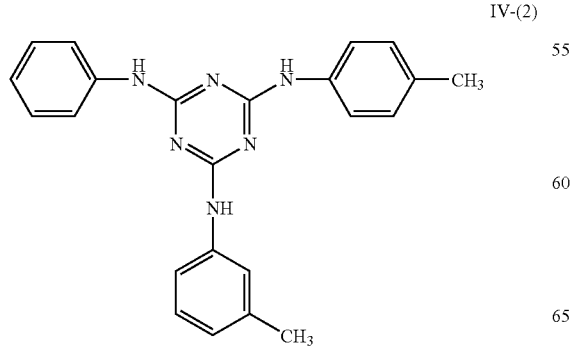
IV-(2)
-continued
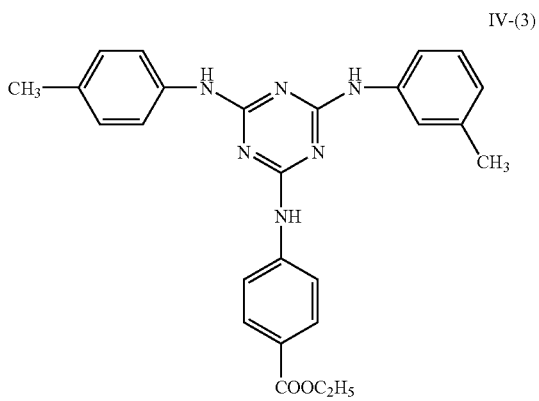
IV-(3)
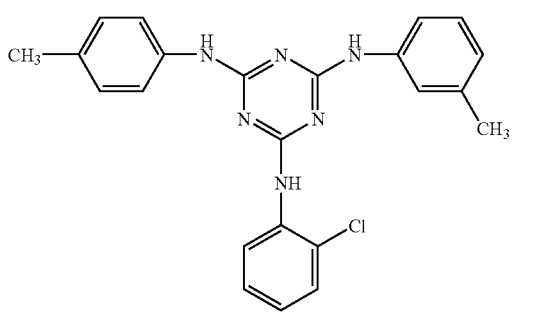
IV-(4)
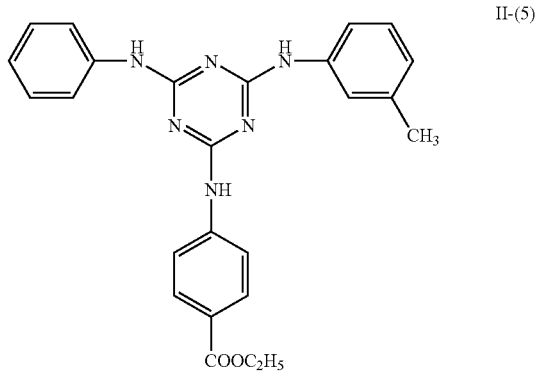
II-(5)
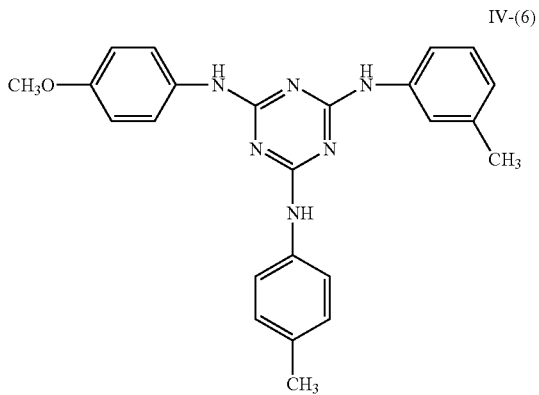
IV-(6)

-continued

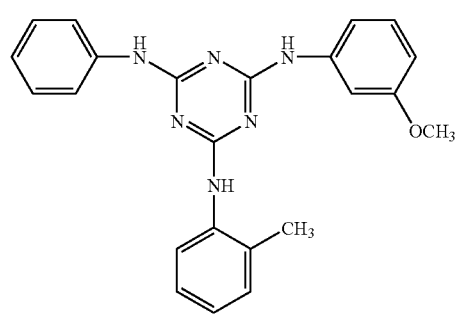
IV-(7)

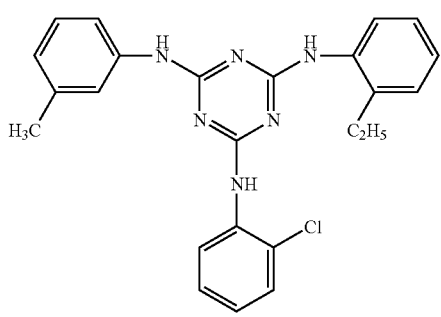
IV-(8)

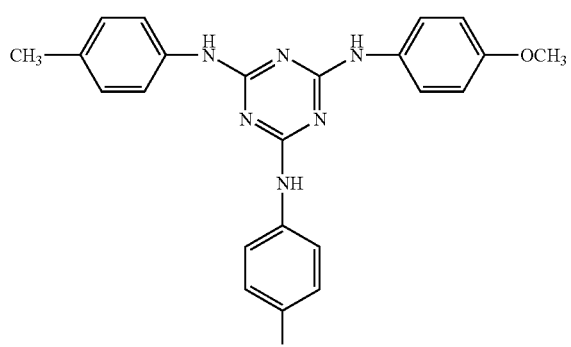
IV-(9)

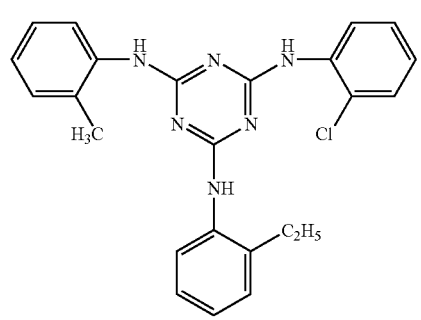
IV-(10)

In the next place, compounds represented by formula (B) are described in detail. In formula (B), $R^{12}$, $R^{13}$, $R^{14}$, $R^{15}$, $R^{16}$, $R^{21}$, $R^{23}$, $R^{24}$, $R^{25}$, $R^{32}$, $R^{33}$, $R^{34}$, $R^{35}$ and $R^{36}$ each represent a hydrogen atom or a substituent. To this substituent, Substituent T recited below can be applied.

Examples of Substituent T include an alkyl group (containing preferably 1 to 20 carbon atoms, far preferably 1 to 12 carbon atoms, especially preferably 1 to 8 carbon atoms, with examples including methyl, ethyl, iso-propyl, tert-butyl, n-octyl, n-decyl, n-hexadecyl, cyclopropyl, cyclopentyl and cyclohexyl), an alkenyl group (containing preferably 2 to 20 carbon atoms, far preferably 2 to 12 carbon atoms, especially preferably 2 to 8 carbon atoms, with examples including vinyl, allyl, 2-butenyl and 3-pentenyl), an alkynyl group (containing preferably 2 to 20 carbon atoms, far preferably 2 to 12 carbon atoms, especially preferably 2 to 8 carbon atoms, with examples including propargyl and 3-pentynyl), an aryl group (containing preferably 6 to 30 carbon atoms, far preferably 6 to 20 carbon atoms, especially preferably 6 to 12 carbon atoms, with examples including phenyl, p-methylphenyl and naphthyl), a substituted or unsubstituted amino group (containing preferably 0 to 20 carbon atoms, far preferably 0 to 10 carbon atoms, especially preferably 0 to 6 carbon atoms, with examples including amino, methylamino, dimethylamino, diethylamino and dibenzylamino), an alkoxy group (containing preferably 1 to 20 carbon atoms, far preferably 1 to 12 carbon atoms, especially preferably 1 to 8 carbon atoms, with examples including methoxy, ethoxy and butoxy), an aryloxy group (containing preferably 6 to 20 carbon atoms, far preferably 6 to 16 carbon atoms, especially preferably 6 to 12 carbon atoms, with examples including phenyloxy and 2-naphthyloxy), an acyl group (containing preferably 1 to 20 carbon atoms, far preferably 1 to 16 carbon atoms, especially preferably 1 to 12 carbon atoms, with examples including acetyl, benzoyl, formyl and pivaloyl), an alkoxycarbonyl group (containing preferably 2 to 20 carbon atoms, far preferably 2 to 16 carbon atoms, especially preferably 2 to 12 carbon atoms, with examples including methoxycarbonyl and ethoxycarbonyl), an aryloxycarbonyl group (containing preferably 7 to 20 carbon atoms, far preferably 7 to 16 carbon atoms, especially preferably 7 to 10 carbon atoms, such as phenyloxycarbonyl), an acyloxy group (containing preferably 2 to 20 carbon atoms, far preferably 2 to 16 carbon atoms, especially preferably 2 to 10 carbon atoms, with examples including acetoxy and benzoyloxy), an acylamino group (containing preferably 2 to 20 carbon atoms, far preferably 2 to 16 carbon atoms, especially preferably 2 to 10 carbon atoms, with examples including acetylamino and benzoylamino), an alkoxycarbonylamino group (containing preferably 2 to 20 carbon atoms, far preferably 2 to 16 carbon atoms, especially preferably 2 to 12 carbon atoms, such as methoxycarbonylamino), an aryloxycarbonylamino group (containing preferably 7 to 20 carbon atoms, far preferably 7 to 16 carbon atoms, especially preferably 7 to 12 carbon atoms, such as phenyloxycarbonylamino), a sulfonylamino group (containing preferably 1 to 20 carbon atoms, far preferably 1 to 16 carbon atoms, especially preferably 1 to 12 carbon atoms, with examples including methanesulfonylamino and benzenesulfonylamino), a sulfamoyl group (containing preferably 0 to 20 carbon atoms, far preferably 0 to 16 carbon atoms, especially preferably 0 to 12 carbon atoms, with examples including sulfamoyl, methylsulfamoyl, dimethylsulfamoyl and phenylsulfamoyl), a carbamoyl group (containing preferably 1 to 20 carbon atoms, far preferably 1 to 16 carbon atoms, especially preferably 1 to 12 carbon atoms, with examples including carbamoyl, methylcarbamoyl, diethylcarbamoyl and phenylcarbamoyl), an alkylthio group (containing preferably 1 to 20 carbon atoms, far preferably 1 to 16 carbon atoms, especially preferably 1 to 12 carbon atoms, with examples including methylthio and ethylthio), an arylthio group (containing preferably 6 to 20 carbon atoms, far preferably 6 to 16 carbon atoms, especially preferably 6 to 12 carbon atoms, such as phenylthio), a sulfonyl group (containing preferably 1 to 20 carbon atoms, far preferably 1 to 16 carbon atoms, especially preferably 1 to 12 carbon atoms, with examples including mesyl and tosyl), a sulfinyl group (containing preferably 1 to 20 carbon atoms, far preferably 1 to 16 carbon atoms, especially preferably 1 to 12 carbon atoms, with examples including methanesulfinyl and benzenesulfinyl), an ureido group (containing preferably 1 to 20 carbon atoms, far preferably 1 to 16 carbon atoms, especially preferably 1 to 12 carbon atoms, with examples including ureido, methylureido and phenylureido), a phosphoryl amide group (containing preferably 1 to 20 carbon atoms, far preferably 1 to 16 carbon atoms, especially preferably 1 to 12 carbon atoms, with examples including diethylphosphoryl amide and phenylphosphoryl amide), a hydroxyl group, a mercapto group, a halogen atom (such as fluorine, chlorine, bromine or iodine), a cyano group, a sulfo group, a carboxyl group, a nitro group, a hydroxamic acid group, a sulfino group, a hydrazino group, an imino group, a heterocyclic group (containing preferably 1 to 30 carbon atoms, far preferably 1 to 12 carbon atoms, and as a hetero atom a nitrogen atom, an oxygen atom or a sulfur atom, with examples including imidazolyl, pyridyl, quinolyl, furyl, piperidyl, morpholino, benzoxazolyl, benzimidazolyl and benzothiazolyl), and a silyl group (containing preferably 3 to 40 carbon atoms, far preferably 3 to 30 carbon atoms, especially preferably 3 to 24 carbon atoms, with examples including trimethylsilyl and triphenylsilyl). Of these groups, alkyl, aryl, substituted or unsubstituted amino, alkoxy and aryloxy groups, especially alkyl, aryl and alkoxy groups, are preferred over the others.

These substituents each may further be substituted with Substituent T. When two or more substituents are present, they may be the same or different. Further, if possible, they may combine with each other to form a ring.

In addition, at least two among the substituents $R^{12}$, $R^{13}$, $R^{14}$, $R^{16}$, $R^{21}$, $R^{23}$, $R^{24}$, $R^{25}$, $R^{32}$, $R^{33}$, $R^{34}$, $R^{35}$ and $R^{36}$ are groups chosen from among substituted or unsubstituted amino groups, acylamino groups, alkoxycaronylamino groups, aryloxycarbonylamino groups, sulfonylamino groups, a hydroxyl group, a mercapto group and a carboxyl group, preferably those chosen from among amino groups and a hydroxyl group, especially preferably hydroxyl groups. Herein, the groups chosen may be the same or different.

Suitable examples of a compound represented by formula (B) according to the invention are illustrated below, but the invention should not be construed as being limited to these examples.

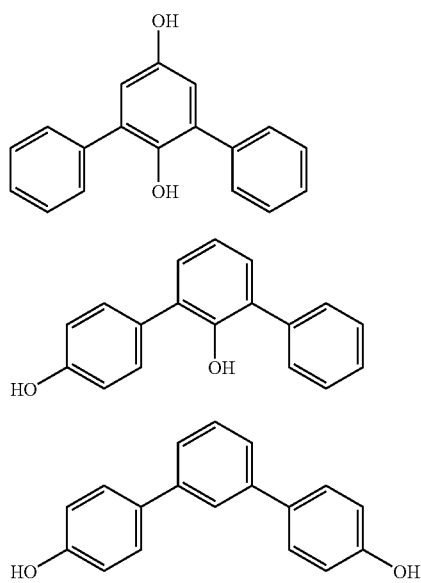

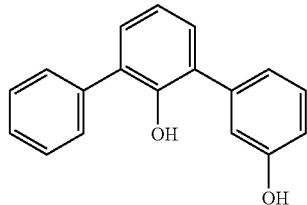

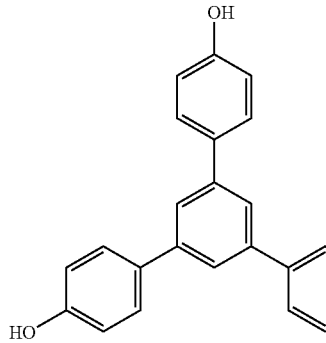

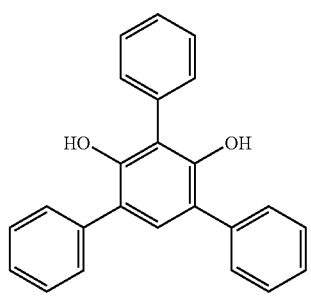

(Optical Characteristics of Cellulose Acylate Film)

It is preferable that optical characteristics, or an Re retardation value and an Rth retardation value, of the present cellulose acylate film satisfy the following expressions (V) and (VI), respectively;

$$20 \text{ nm} \leq Re(590) \leq 200 \text{ nm} \quad (V)$$

$$70 \text{ nm} \leq Rth(590) \leq 350 \text{ nm} \quad (VI)$$

[In the above expressions, Re(λ) is an in-plane retardation value (unit: nm) at a wavelength λ nm and Rth(λ) is a thickness-direction retardation value (unit: nm) at a wavelength λ nm.]

The retardation value Re(λ) can be measured with KOBRA 21ADH (made by Oji Scientific Instruments) wherein light with a wavelength of λ nm is made to strike upon a film in the direction of the normal to the film surface. In addition, KOBRA 21ADH calculates the retardation value Rth(λ) on the basis of three retardation values measured in three different directions, namely the retardation value Re(λ), a retardation value measured under conditions that the in-plane slow axis is taken as an axis of tilt (rotation axis) and light with a wavelength of λ nm is made to strike from a direction tilting to +40° with respect to the direction of the normal to the film and a retardation value measured under conditions that the in-plane slow axis is taken as an axis of tilt and light with a wavelength of λ nm is made to strike from a direction tilting to −40° with respect to the direction of the normal to the film. Re(λ) and Rth(λ) are determined by inputting the value 1.48 assumed as the average refractive index and a film thickness.

It is preferable by far that the retardation values satisfy the following expressions (VII) and (VIII);

$$50 \text{ nm} \leq Re(590) \leq 100 \text{ nm} \quad \text{(VII)}$$

$$160 \text{ nm} \leq Rth(590) \leq 300 \text{ nm} \quad \text{(VIII)}$$

By forming a cellulose acylate film so as to have Re(590) and Rth(590) in the foregoing ranges, respectively, the film formed can be adopted suitably as an optical compensation film for use in liquid crystal displays.

The dispersion in the Re values throughout the width is preferably ±5 nm, far preferably ±3 nm, and the dispersion in the Rth values is preferably ±10 nm, far preferably ±5 nm. Further, it is preferable that the dispersions in the Re values and the Rth values in the length direction are respectively within the same ranges as the dispersions in the width direction.

(Film Thickness)

In the invention, the thickness of a finished (post-drying) cellulose acylate film, though varies depending on the use intended, is preferably from 40 μm to 150 μm, far preferably from 70 μm to 140 μm, particularly preferably from 80 μm to 130 μm. The film thickness of 40 μm or above is favorable due to the fact that the film is not too thin and can keep stiffness. In addition, the film thickness is preferably 150 μm or below because there is a panel makers' demand to minimize the thickness of film members.

(Cellulose Acylate)

Cellulose acylates used in the invention are described in detail. In the invention, two or more different cellulose acylates may be used as a mixture.

The cellulose acylates are mixed fatty acid esters of cellulose prepared by substituting acetyl groups and acyl groups containing 3 or more carbon atoms for hydroxyl groups of cellulose, preferably cellulose acylates satisfying the following expressions (I) and (II) regarding the degrees of substitution on cellulose's hydroxyl groups;

$$2.0 \leq A + B \leq 3.0 \quad \text{Expression (I)}$$

$$0 \leq B \quad \text{Expression (II)}$$

Herein, A and B are degrees of substitution of acyl groups for cellulose's hydroxyl groups. More specifically, A is a substitution degree of acetyl groups and B is a substitution degree of acyl groups having 3 or more carbon atoms per group.

β-1,4-bonded glucose units constituting cellulose have free hydroxyl groups at the 2-, 3- and 6-positions. The cellulose acylate is a polymer produced by partial or total esterification of those hydroxyl groups into acyl groups. The acyl substitution degree means the proportions of esterification of cellulose in the 2-, 3- and 6-positions, respectively (in other words, the substitution degree of 1 means 100% esterification in each position).

In the invention, the sum of substitution degrees A and B (A+B) on the hydroxyl groups is from 2.0 to 3.0 as shown by the expression (I), preferably from 2.2 to 2.9, particularly preferably from 2.40 to 2.85. The substitution degree B is a value of 0 or above as shown by the expression (II), preferably 0.6 or above.

When A+B is lower than 2.0, the hydrophilicity becomes strong, so the retardation values are susceptible to ambient humidity. Therefore, cellulose acylate having A+B in such a range is unsuitable as a member for liquid crystal displays having potential for uses under various circumstances.

In the case of B>0, it is appropriate that the sum of the substitution degrees A and B on the 6-position hydroxyl groups in cellulose acylate be 0.6 or above, preferably 0.75 or above, particularly preferably 0.85 or above. Further, it is favorable that the substitution degree on the 6-position hydroxyl groups constitutes at least 28%, preferably at least 31%, particularly preferably at least 32%, of the substitution degree B.

The acyl groups containing 3 or more carbon atoms per group may be aliphatic acyl groups or aromatic acyl groups, and they have no particular restrictions. Examples of a cellulose acylate used in the invention include alkylcarbonyl esters of cellulose, alkenylcarbonyl esters of cellulose, arylcarbonyl esters of cellulose and arylalkylcarbonyl esters of cellulose, which each may further have substituents. Suitable examples of such acyl groups include propionyl, butanoyl, heptanoyl, hexanoyl, octanoyl, decanoyl, dodecanoyl, tridecanoyl, tetradecanoyl, hexadecanoyl, octadecanoyl, iso-butanoyl, t-butanoyl, cyclohexanecarbonyl, oleoyl, benzoyl, naphthylcarbonyl and cinnamoyl. Of these groups, propionyl, butanoyl, dodecanoyl, octadecanoyl, t-butanoyl, oleoyl, benzoyl, naphthylcarbonyl and cinnamoyl groups are preferred over the others, and propionyl and butanoyl groups in particular are favorable.

When the acyl groups are propionyl groups, the substitution degree B is preferably 0.6 or above, far preferably 0.7 or above, particularly preferably 0.75 or above. Although these cellulose acylates can have higher elasticity moduli the lower the substitution degrees thereof become, it becomes impossible to make the intended retardations develop therein. By adjustment of the substitution degree to such a range, an optical compensation sheet having compatibility between elasticity modulus and retardation value can be prepared.

In the case of B=0, on the other hand, it is appropriate that DS6/(DS2+DS3+DS6) be 0.315 or above, especially preferably 0.320 or above. Herein, DS2 stands for a degree of substitutions of the acyl groups for the 2-position hydroxyl groups of glucose units (hereinafter referred to as "2-position acyl substitution degree"), DS3 a substitution degree of the acyl groups for the 3-position hydroxyl groups of glucose units (hereinafter referred to as "3-position acyl substitution degree"), and DS6 a substitution degree of the acyl groups for the 6-position hydroxyl groups of glucose units (hereinafter referred to as "6-position acyl substitution degree"). In addition, DS2+DS3+DS6 is preferably from 2.00 to 2.85, far preferably from 2.22 to 2.82, especially preferably from 2.40 to 2.80.

(Synthesis Method of Cellulose Acylate)

The basic principles of cellulose acylate synthesis methods are described in Migita et al., *Mokuzai Kagaku* (Wood Chemistry), pages 180-190, Kyoritsu Shuppan Co., Ltd. (1968). A typical synthesis method is the liquid-phase acetylation method using a carboxylic anhydride, acetic acid and a sulfuric acid catalyst. More specifically, a cellulose raw material, such as cotton linters or wood pulp, is pretreated with an appropriate amount of acetic acid, and then esterified by its being charged into a precooled carboxylation mixture. Thus, fully acylated cellulose (the sum of acyl substitution degrees on the 2-, 3- and 6-position hydroxyl groups is close to 3.00) is synthesized. In general the carboxylation mixture contains acetic acid as a solvent, carboxylic anhydride as an esterification agent and sulfuric acid as a catalyst. The carboxylic anhydride is generally used in an amount stoichiometrically in excess of the sum of the amount of cellulose to react therewith and the water content in the reaction system. After the conclusion of the acylation reaction, an aqueous solution of neutralizing agent (e.g., a carbonate, acetate or oxide of calcium, magnesium, iron, aluminum or zinc) is added in order to hydrolyze excessive carboxylic anhydride remaining in the reaction system and neutralize part of the esterification catalyst. In the next place, the fully acylated cellulose is kept at a temperature of 50° C. to 90° C. in the present of a small amount of acetylation reaction catalyst (generally a sulfuric acid residue), thereby undergoing saponification ripening and being converted into a cellulose acylate having the intended acyl substitution degree and polymerization degree. At the time when the intended cellulose acylate is produced, the catalyst remaining in the reaction system is completely neutralized with the neutralizing agent as recited above, or the cellulose acylate solution is poured into water or dilute sulfuric acid without undergoing neutralization (or water or dilute sulfuric acid is charged in the cellulose acylate solution); as a result, the cellulose acylate is isolated by flocculation. The cellulose acylate isolated is subjected to rinsing and stabilizing treatment. Thus, the intended cellulose acylate is obtained.

It is preferable that the film-forming polymer component of the present cellulose acylate film is in a substantial sense the cellulose acylate according to the definitions mentioned above. The expression "in a substantial sense" as used herein implies that the cellulose acylate defined above constitutes 55% by mass or more of the polymer component (preferably 70% by mass or more, far preferably 80% by mass or more, of the polymer component). As a starting material for film formation, cellulose acylate particles are suitably used. It is preferable that 90% by mass or more of the particles used are particles having their sizes in the 0.5- to 5-mm range. In addition, it is preferable that 50% by mass or more of the particles used are particles having their sizes in the 1- to 4-mm range. Further, it is favorable that the cellulose acylate particles have a shape as close as possible to a sphere. The suitable bulk specific gravity (apparent density) of the thus prepared particles is from 0.3 to 0.8 kg/L. When the bulk specific gravity is small, bridging tends to occur in charging the particles into a dissolution tank from a silo. When the bulk specific gravity is great, on the other hand, the solubility becomes poor. Therefore, the more suitable bulk specific gravity is from 0.4 to 0.6. The adjustments of the particle size and bulk specific gravity can be made by controlling the agitating speed and the flocculating speed during the precipitation of particles by flocculation.

The polymerization degree of cellulose acylate used advantageously in the invention is from 200 to 700, preferably from 250 to 550, far preferably from 250 to 400, especially preferably from 264 to 380, expressed in terms of viscosity-average polymerization degree. The average polymerization degree can be determined by a limit viscosity method by Uda et al. (Kazuo Uda and Hideo Saito, *Seni Gakkai-Shi* (Bulletin of The Society of Fiber Science and Technology, Japan), vol. 18, No. 1, pp. 105-120 (1962)). This method is also described in detail in JP-A-9-95538. The viscosity-average polymerization degree is determined from an intrinsic viscosity [η] of cellulose acylate measured with an Ostwald's viscometer and the following equation:

Viscosity-average polymerization degree $DP=[\eta]/Km$

In the above equation, [η] is an intrinsic viscosity of cellulose acylate, and Km is a constant the value of which is $6\times10^{-4}$.

It is advantageous for the present art to employ a cellulose acylate narrow in molecular-weight distribution which is expressed in terms of Mw/Mn (wherein Mw is a mass-average molecular weight and Mn is a number-average molecular weight) and determined by gel permeation chromatography. Specifically, the suitable value of Mw/Mn is from 0.8 to 2, preferably from 1 to 1.8. Removal of low-molecular components is beneficial because the resultant cellulose acylate can have lower viscosity than usual one although an increase in average molecular weight (polymerization degree) is caused. The cellulose acylate reduced in low-molecular components can be obtained by removing low-molecular components from cellulose acylate synthesized in a usual way. The removal of low-molecular components can be achieved by rinsing a cellulose acylate with an appropriate organic solvent. In the case of producing a cellulose acylate reduced in low-molecular components, it is preferable that the amount of sulfuric acid catalyst in acetylation reaction is controlled to the range of 0.5 to 25 parts by mass per 100 parts by mass of cellulose. The control of the amount of sulfuric acid catalyst to the foregoing range permits synthesis of cellulose acylate having an advantage in molecular-weight distribution (uniform in molecular-weight distribution) also. The water content in a cellulose acylate used in the invention is preferably 2% by mass or below, far preferably 1% by mass or below, especially preferably 0.7% by mass or below. Cellulose acylates are generally known to have their water contents in the range of 2.5% to 5% by mass. For adjustment of the water content in a cellulose acylate used in the invention to the preferred range, a drying operation is required. The drying operation has no particular restriction as to its method so long as the intended water content is attained.

Raw cotton materials and synthesis methods for those cellulose acylates according to the invention are described in detail in *JIII Journal of Technical Disclosure* No. 2001-1745, pages 7 to 12, Japan Institute of Invention and Innovation (Mar. 15, 2001).

(Additives)

To a cellulose acylate solution relating to the invention, a wide variety of additives (e.g., a plasticizer, a ultraviolet absorber, a deterioration inhibitor, a retardation (optical anisotropy) modifier, fine particles, a stripping accelerator, an infrared absorber) can be added according to their uses in various steps in preparation process. Such additives may be solid matter or oily matter. In other words, they have no particular restrictions as to their melting or boiling points. For instance, ultraviolet absorbing materials having melting points higher and lower than 20° C., respectively, may be mixed, and plasticizers may be mixed as in the case of the ultraviolet absorbing materials. These cases are described, e.g., in JP-A-2001-151901. Examples of a stripping accelerator include ethyl esters of citric acid. In addition, descriptions of infrared absorbing dyes can be found, e.g., in JP-A-2001-194522. Although addition timing of additives may be set at any stages in the process of dope preparation, the process for addition of additives may be appended to the end of dope preparation process. Further, each additive has no particular limitations to its addition amount so far as its function develops. When the cellulose acylate film formed has a multilayer structure, the kinds and the amounts of additives added may be different from one layer to another. Examples of such a case are described, e.g., in JP-A-2001-151902. These are the arts hitherto known. Furthermore, it is preferable that the glass transition temperature Tg of the present cellulose acylate film is adjusted to the range of 80° C. to 180° C. by appropriately choosing the kinds and addition amounts of additives.

As to details of those additives, materials described in detail in *JIII Journal of Technical Disclosure* No. 2001-1745, pages 16 and afterward, Japan Institute of Invention and Innovation (Mar. 15, 2001) can be used to advantage.

(Plasticizer)

The present film can contain a plasticizer. Compounds usable as the plasticizer have no particular restrictions, but they are preferably more hydrophobic than cellulose acylate and used alone or as combinations, with examples including phosphoric acid esters, such as triphenyl phosphate, tricresyl phosphate, cresyldiphenyl phosphate, octyldiphenyl phosphate, diphenylbiphenyl phosphate, trioctyl phosphate and tributyl phospahte; phthalic acid esters, such as diethyl phthalate, dimethoxyethyl phthalate, dimethyl phthalate, dioctyl phthalate, dibutyl phthalate and di-2-ethylhexyl phthalate; and glycolic acid esters, such as triacetin, tributyrin, butylphthalylbutyl glycolate, ethylphthalylethyl glycolate, methylphthalylethyl glycolate and butylphthalylbutyl glycolate. These plasticizers may be used alone or as combinations of two or more thereof, if needed. By using two or more kinds of plasticizers, the cellulose acylate film can undergo stretching of a high magnification. In addition, the use of compounds more hydrophobic than cellulose acylate makes it possible to suppress Re and Rth variations associated with humidity changes.

(Retardation Developer)

For making high retardation values develop, a retardation developer can be preferably used in the invention. The compounds usable as such a retardation developer are compound having at least two aromatic rings per molecule. The amount of a retardation developer used is preferably from 0 to 10 parts by mass, far preferably from 0 to 7 parts by mass, further preferably from 0.2 to 5 parts by mass, particularly preferably from 0.1 to 4 parts by mass, per 100 parts by mass of polymer. In accordance with the invention, the usage of a retardation developer can be reduced, so a cost reduction becomes possible. In point of protection of a retardation developer from deposition during film formation, it is preferable that the amount of retardation developer added to cellulose acylate is 10 parts by mass or below. Two or more of retardation developers may be used in combination. Moreover, it is favorable that the retardation developer used has its maximum absorption in a wavelength region of 250 nm to 400 nm and substantially no absorption in the visible region.

The term "aromatic rings" as used in the present specification is intended to include not only aromatic hydrocarbon rings but also aromatic heterocyclic rings.

It is especially preferable that the aromatic hydrocarbon rings are 6-membered rings (namely benzene rings).

The aromatic heterocyclic rings are generally unsaturated heterocyclic rings. They are preferably 5-, 6- or 7-membered rings, far preferably 5- or 6-membered rings. The aromatic heterocyclic rings each generally have the greatest possible number of double bonds. The hetero-atoms containable therein are preferably nitrogen, oxygen and sulfur atoms, notably nitrogen atom. Examples of an aromatic heterocyclic ring include a furan ring, a thiophene ring, a pyrrole ring, an oxazole ring, an isooxazole ring, a thiazole ring, an isothiazole ring, an imidazole ring, a pyrazole ring, a furazane ring, a trizole ring, a pyran ring, a pyridine ring, a pyridazine ring, a pyrimidine ring, a pyrazine ring and a 1,3,5-triazine ring.

Suitable aromatic rings are a benzene ring, a fused benzene ring and biphenyls. Of these rings, a 1,3,5-triazine ring is especially preferred. More specifically, the compounds disclosed in JP-A-2001-166144 can be used to advantage.

The number of carbon atoms in each of the aromatic rings the retardation developer has is preferably from 2 to 20, far preferably from 2 to 12, further preferably from 2 to 8, particularly preferably from 2 to 6.

The bonding relation between two aromatic rings can fall into (a) a case where the rings form a fused ring, (b) a case where the rings are directly bound by a single bond, or (c) a case where the rings are bonded via a linkage group (wherein it is impossible to form a spiro-bonding because the two rings are aromatic ones). The bonding relation herein may be any of (a) to (c).

Examples of a fused ring (formed from two or more aromatic rings) in the case (a) include an indene ring, a naphthalene ring, an azulene ring, a fluorene ring, a phenanthrene ring, an anthracene ring, an acenaphthylene ring, a biphenylene ring, a naphthacene ring, a pyrene ring, an indole ring, an isoindole ring, a benzofuran ring, a benzothiophene ring, an indolizine ring, a benzoxazole ring, a benzothiazole ring, a benzoimidazole ring, a benzotriazole ring, a purine ring, an indazole ring, a chromene ring, a quinoline ring, an isoquinoline ring, a quinolizine ring, a quinazoline ring, a cinnoline ring, a quinoxaline ring, a phthalazine ring, a pteridine ring, a carbazole ring, acridine ring, a phenanthridine ring, a xanthene ring, a phenazine ring, a phenothiazine ring, a phenoxthine ring, a phenoxazine ring and a thianthrene ring. Of these rings, a naphthalene ring, an azulene ring, an indole ring, a benzoxazole ring, a benzothiazole ring, a benzoimidazole ring, a benzotriazole ring and a quinoline ring are preferred over the others.

The single bond in the case (b) is preferably a carbon-carbon bond between two aromatic rings. The two aromatic rings may be bound by two or more single bonds to form an aliphatic ring or a non-aromatic heterocyclic ring between them.

It is preferable that the linkage group in the case (c) is also attached to carbon atoms of two aromatic rings. The linkage group is preferably an alkylene group, an alkenylene group, an alkynylene group, —CO—, —O—, —NH—, —S— or a combination of two or more thereof. Examples of a linkage group formed by combining any two or more of the above-recited ones are shown below. Additionally, each of the linkage groups recited below may be reversed left to right.

c1: —CO—O—
c2: —CO—NH—
c3: -alkylene-O—
c4: —NH—CO—NH—
c5: —NH—CO—O—
c6: —O—CO—O—
c7: —O-alkylene-O—
c8: —CO-alkenylene-
c9: —CO-alkenylene-NH—
c10: —CO-alkenylene-O—
c11: -alkylene-CO—O-alkylene-O—CO-alkylene-
c12: —O-alkylene-CO—O-alkylene-O—CO-alkylene-O—
c13: —O—CO-alkylene-CO—O—
c14: —NH—CO-alkenylene-
c15: —O—CO-alkenylene- The aromatic rings and the linkage groups may have substituents.

Examples of such substituents include halogen atoms (F, Cl, Br, I), a hydroxyl group, a carboxyl group, a cyano group, an amino group, a nitro group, a sulfo group, a carbamoyl group, a sulfamoyl group, a ureido group, an alkyl group, an alkenyl group, an alkynyl group, an aliphatic acyl group, an aliphatic acyloxy group, an alkoxy group, an alkoxycarbonyl group, an alkoxycarbonylamino group, an alkylthio group, an alkylsulfonyl group, an aliphatic amido group, an aliphatic sulfonamido group, an aliphatic substituted amino group, an aliphatic substituted carbamoyl group, an aliphatic substituted sulfamoyl group, an aliphatic substituted ureido group and non-aromatic heterocyclic group.

The number of carbon atoms in the alkyl group is preferably from 1 to 8. Linear alkyl groups are preferable to cycloalkyl groups, and straight-chain alkyl groups are especially preferred. These alkyl groups may further have substituents (such as hydroxyl, carboxyl, alkoxy and alkyl-substituted amino groups). Examples of such alkyl groups (including substituted alkyl groups) include methyl, ethyl, n-butyl, n-hexyl, 2-hydroxyethyl, 4-carboxybutyl, 2-methoxyethyl and 2-diethylaminoethyl groups.

The number of carbon atoms in the alkenyl group is preferably from 2 to 8. Linear alkenyl groups are preferable to cyclic alkenyl groups, and straight-chain alkenyl groups are especially preferred. These alkenyl groups may further have substituents. Examples of such alkenyl groups include vinyl, allyl and 1-hexenyl groups.

The number of carbon atoms in the alkynyl group is preferably from 2 to 8. Linear alkynyl groups are preferable to cyclic alkynyl groups, and straight-chain alkynyl groups are especially preferred. These alkynyl groups may further have substituents. Examples of such alkynyl groups include ethynyl, 1-butynyl and 1-hexynyl groups.

The number of carbon atoms in the aliphatic acyl group is preferably from 1 to 10. Examples of such an aliphatic acyl group include acetyl, propanoyl and butanoyl groups.

The number of carbon atoms in the aliphatic acyloxy group is preferably from 1 to 10. Examples of such an aliphatic acyloxy group include an acetoxy group.

The number of carbon atoms in the alkoxy group is preferably from 1 to 8. Such an alkoxy group may further have a substituent (such as an alkoxy group). Examples of the alkoxy group (including a substituted alkoxy group) include methoxy, ethoxy, butoxy and methoxyethoxy groups.

The number of carbon atoms in the alkoxycarbonyl group is preferably from 2 to 10. Examples of such an alkoxycarbonyl group include methoxycarbonyl and ethoxycarbonyl groups.

The number of carbon atoms in the alkoxycarbonylamino group is preferably from 2 to 10. Examples of such an alkoxycarbonylamino group include methoxycarbonylamino and ethoxycarbonylamino groups.

The number of carbon atoms in the alkylthio group is preferably from 1 to 12. Examples of such an alkylthio group include methylthio, ethylthio and octylthio groups.

The number of carbon atoms in the alkylsulfonyl group is preferably from 1 to 8. Examples of such an alkylsulfonyl group include methanesulfonyl and ethanesulfonyl groups.

The number of carbon atoms in the aliphatic amido group is preferably from 1 to 10. Examples of such an amido group include an acetamido group.

The number of carbon atoms in the aliphatic sulfonamido group is preferably from 1 to 8. Examples of such an aliphatic sulfonamido group include methanesulfonamido, butanesulfonamido and n-octanesulfonamido groups.

The number of carbon atoms in the aliphatic substituted amino group is preferably from 1 to 10. Examples of such an aliphatic substituted amino group include dimethylamino, diethylamino and 2-carboxyethylamino groups.

The number of carbon atoms in the aliphatic substituted carbamoyl group is preferably from 2 to 10. Examples of such an aliphatic substituted carbamoyl group include methylcarbamoyl and diethylcarbamoyl groups.

The number of carbon atoms in the aliphatic substituted sulfamoyl group is preferably from 1 to 8. Examples of such an aliphatic substituted sulfamoyl group include methylsulfamoyl and diethylsulfamoyl groups.

The number of carbon atoms in the aliphatic substituted ureido group is preferably from 2 to 10. Examples of such an aliphatic substituted ureido group include a methylureido group.

Examples of the non-aromatic heterocyclic group include piperidino and morpholino groups.

The molecular weight of retardation developer is preferably from 300 to 800.

In the invention, a rod-shaped compound having a linear molecular structure as well as a compound having a 1,3,5-triazine ring can be used to advantage. The term "linear molecular structure" means that the molecular structure of a rod-shaped compound in thermodynamically most stable conformation is linear. The thermodynamically most stable conformation can be determined by crystal structure analysis or molecular orbital calculation. For instance, the molecular orbital calculations can be made using a software program for molecular orbital calculations (e.g., WinMOPAC2000, produced by Fujitsu) and thereby the molecular structure capable of minimizing the heat for forming the intended compound can be determined. The expression "the molecular structure is linear" means that the main chain of molecular structure in the thermodynamically most stable conformation forms an angle of 140 degrees or above.

As a rod-shaped compound having at least two aromatic rings, those represented by the following formula (1) are suitable.

$$Ar^1-L^1-Ar^2 \hspace{2cm} \text{Formula (1)}$$

In the above formula (1), $Ar^1$ and $Ar^2$ each represent an aromatic group independently.

The term "aromatic group" as used herein is intended to include aryl groups (aromatic hydrocarbon groups), substituted aryl groups, aromatic heterocyclic groups and substituted aromatic heterocyclic groups.

Aryl groups and substituted aryl groups are preferable to aromatic heterocyclic groups and substituted aromatic heterocyclic groups. The heterocyclic rings of aromatic heterocyclic groups are generally unsaturated rings, and they are preferably 5-, 6- or 7-membered rings, far preferably 5- or 6-membered rings. The aromatic heterocyclic rings each generally have the greatest possible number of double bonds. The hetero-atom containable therein is preferably a nitrogen, oxygen or sulfur atom, far preferably a nitrogen or sulfur atom.

Examples of the aromatic ring in an aromatic group include a benzene ring, a furan ring, a thiophene ring, a pyrrole ring, an oxazole ring, a thiazole ring, an imidazole ring, a trizole ring, a pyridine ring, a pyrimidine ring and a pyrazine ring. Of these rings, a benzene ring is preferred over the others.

Examples of substituents present in the substituted aryl group and the substituted aromatic heterocyclic group include halogen atoms (F, Cl, Br, I), a hydroxyl group, a carboxyl group, a cyano group, an amino group, alkylamino groups (e.g., methylamino, ethylamino, butylamino, dimethylamino), a nitro group, a sulfo group, a carbamoyl group, alkylcarbamoyl groups (e.g., N-methylcarbamoyl, N-ethylcarbamoyl, N,N-dimethylcarbamoyl), a sulfamoyl group, alkylsulfamoyl groups (e.g., N-methylsulfamoyl, N-ethylsulfamoyl, N,N-dimethylsulfamoyl), an ureido group, alkylureido groups (e.g., N-methylureido, N,N-dimethylureido, N,N,N'-trimethylureido), alkyl groups (e.g., methyl, ethyl, propyl, butyl, pentyl, heptyl, octyl, isopropyl, s-butyl, t-amyl, cyclohexyl, cyclopentyl), alkenyl groups (e.g., vinyl, allyl, hexenyl), alkynyl groups (e.g., ethynyl, butynyl), acyl groups (e.g., formyl, acetyl, butyryl, hexanoyl, lauryl), acyloxy groups (e.g., acetoxy, butryloxy, hexanoyloxy, lauryloxy), alkoxy groups (e.g., methoxy, ethoxy, propoxy, butoxy, pentyloxy, heptyloxy, octyloxy), aryloxy groups (e.g., phenoxy), alkoxycarbonyl groups (e.g., methoxycarbonyl, ethoxycarbonyl, propoxycarbonyl, butoxycarbonyl, pentyloxycarbonyl, heptyloxycarbonyl), aryloxycarbonyl groups (e.g., phenoxycarbonyl), alkoxycarbonylamino groups (e.g., butoxycarbonylamino, hexyloxycarbonylamino), alkylthio groups (e.g., methylthio, ethylthio, propylthio, butylthio, pentylthio, heptylthio, octylthio), arylthio groups (e.g., phenylthio), alkylsulfonyl groups (e.g., methylsulfonyl, ethylsulfonyl, propylsulfonyl, butylsulfonyl, pentylsulfonyl, heptylsulfonyl, octylsulfonyl), amido groups (e.g., acetamido, butylamido, hexylamido, laurylamido), and non-aromatic heterocyclic groups (e.g., morpholino, pyrazinyl).

Of these substituents, halogen atoms, a cyano group, a carboxyl group, a hydroxyl group, an amino group, alkylamino groups, acyl groups, acyloxy groups, amido groups, alkoxycarbonyl groups, alkoxy groups, alkylthio groups and alkyl groups are preferred over the others.

The alkyl moieties of alkylamino, alkoxycarbonyl, alkoxy and alkylthio groups and the alkyl groups may further have substituents. Examples of substituents the alkyl moieties and alkyl groups may have include halogen atoms, a hydroxyl group, a carboxyl group, a cyano group, an amino group, alkylamino groups, a nitro group, a sulfo group, a carbamoyl group, alkylcarbamoyl groups, a sulfamoyl group, alkylsulfamoyl groups, a ureido group, alkylureido groups, alkenyl groups, alkynyl groups, acyl groups, acyloxy groups, alkoxy groups, aryloxy groups, alkoxycarbonyl groups, aryloxycarbonyl groups, alkoxycarbonylamino groups, alkylthio groups, arylthio groups, alkylsulfonyl groups, amido groups and non-aromatic heterocyclic groups. Of these substituents, halogen atoms, a hydroxyl group, an amino group, alkylamino groups, acyl groups, acyloxy groups, acylamino groups, alkoxycarbonyl groups and alkoxy groups are preferred over the others.

In formula (1), $L^1$ is a divalent linkage group selected from alkylene groups, alkenylene groups, alkynylene groups, —O—, —CO— or combinations of two or more of those groups. The alkylene groups may have cyclic structures. As cycloalkylene groups, cyclohexylene groups, especially 1,4-cyclohexylene, are suitable. As to open-chain alkylene groups, straight-chain alkylene groups are preferable to branched-chain alkylene groups.

The number of carbon atoms in such an alkylene group is preferably from 1 to 20, far preferably from 1 to 15, further preferably from 1 to 10, furthermore preferably from 1 to 8, especially preferably from 1 to 6.

The alkenylene and alkynylene groups having open-chain structures are preferable to those having cyclic structures, and further the alkenylene and alkynylene groups having straight-chain structures are preferable to those having branched-chain structures. It is appropriate that the number of carbon atoms in such an alkenylene group and that in such an alkynylene group be each from 2 to 10, preferably from 2 to 8, far preferably from 2 to 6, further preferably from 2 to 4, especially preferably 2 (vinylene and ethynylene).

The number of carbon atoms in such an arylene group is preferably from 6 to 20, far preferably from 6 to 16, further preferably from 6 to 12.

The angle that $Ar^1$ forms with $Ar^2$ in a state that they face each other across $L^1$ is preferably at least 140 degrees.

As the rod-shaped compound, compounds represented by the following formula (2) are more suitable.

$Ar^1$-$L^2$-X-$L^3$-$Ar^2$    Formula (2)

In the above formula (2), $Ar^1$ and $Ar^2$ are aromatic groups independently. The definition and examples of the aromatic groups as $Ar^1$ and $Ar^2$ are the same as those in formula (1).

In formula (2), $L^2$ and $L^3$ each represent a divalent linkage group selected from an alkylene group, —O—, —CO— or a combination of two or more thereof.

As to the alkylene group, an alkylene group having an open-chain structure is preferable to an alkylene group having a cyclic structure, and further a straight-chain alkylene group is preferable to a branched-chain alkylene group.

The number of carbon atoms in such an alkylene group is preferably from 1 to 10, far preferably from 1 to 8, further preferably from 1 to 6, and especially preferably from 1 to 4. However, the best number is 1 or 2 (corresponding to methylene or ethylene).

As $L^2$ and $L^3$ each, —O—CO— or —CO—O— is most suitable.

In formula (2), X is a 1,4-cyclohexylene, vinylene or ethynylene group.

Examples of a compound represented by formula (1) are illustrated below.

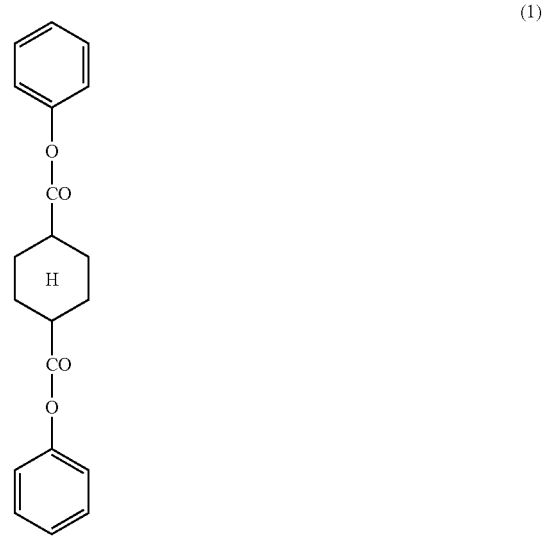

(1)

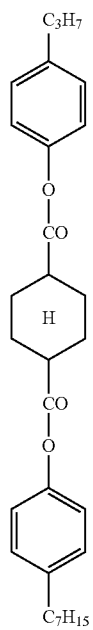
(2)
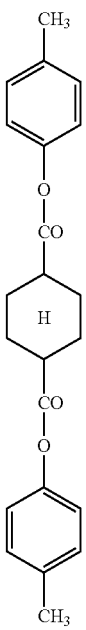
(4)
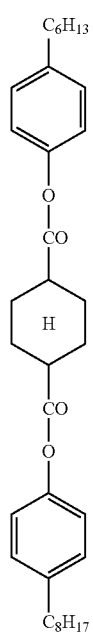
(3)
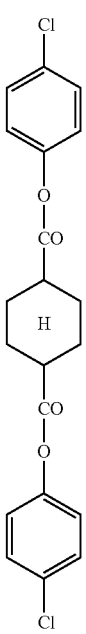
(5)

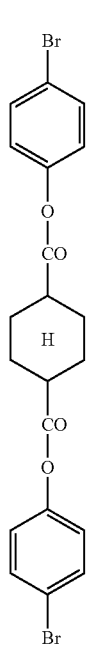
(6)
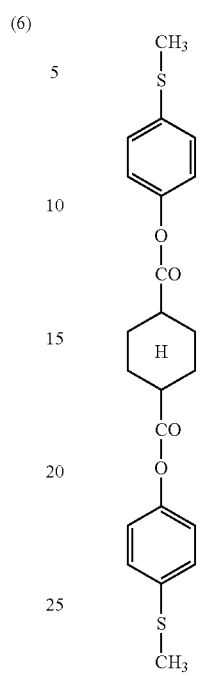
(7)
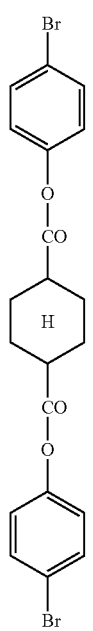
(6)
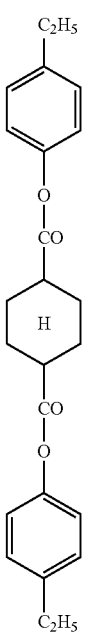
(8)

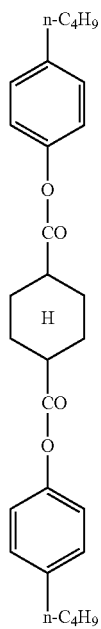
(9)
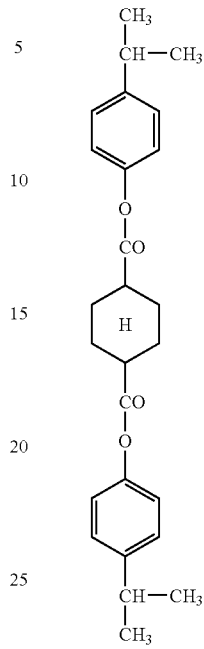
(11)
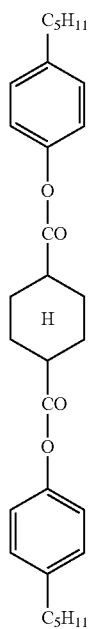
(10)
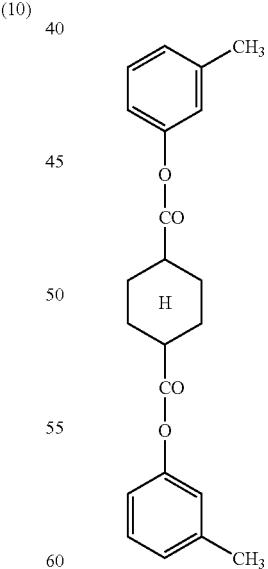
(12)

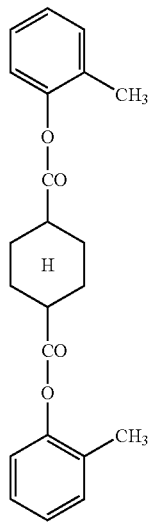
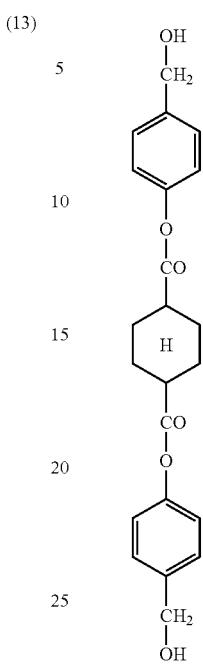

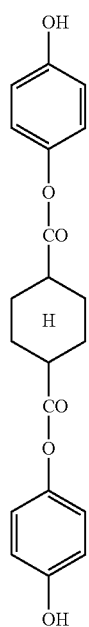
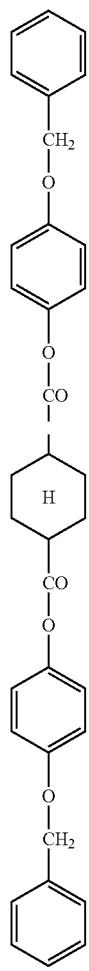
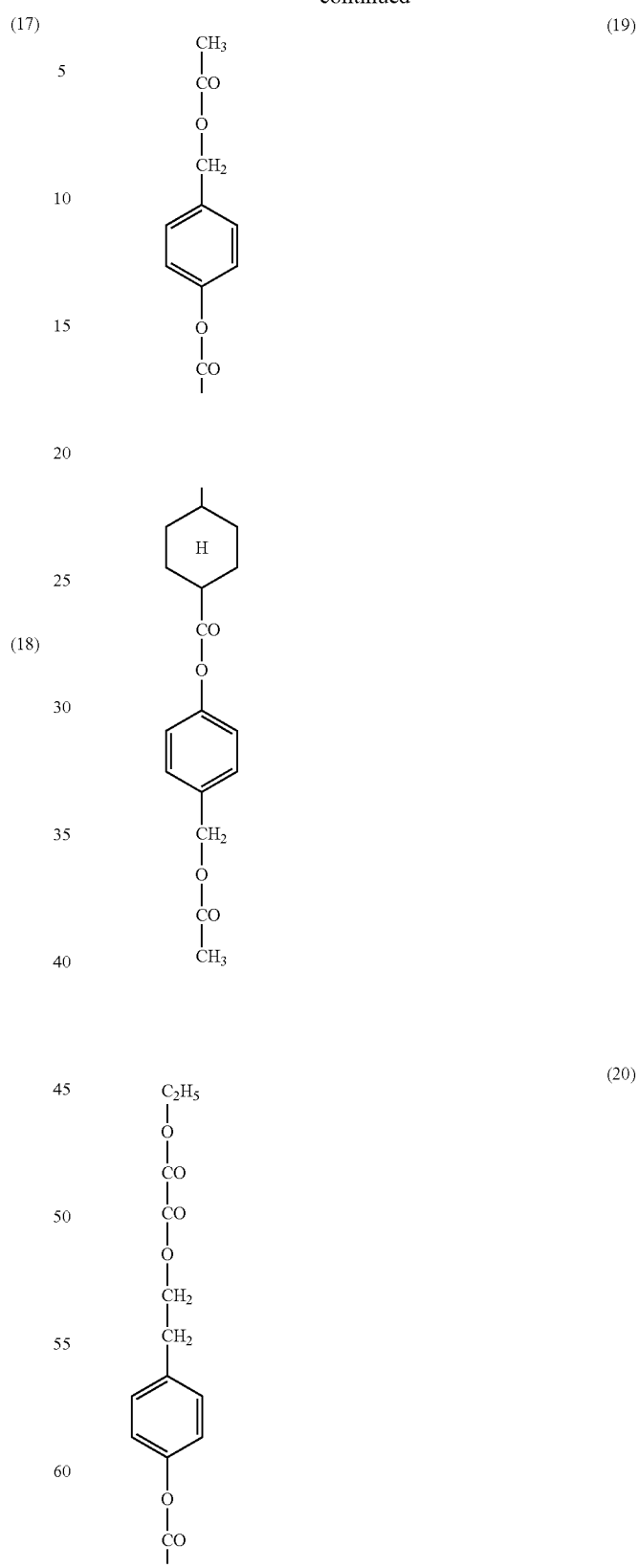

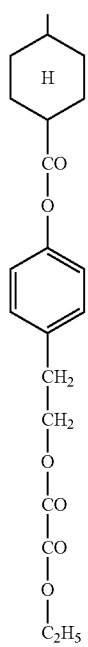
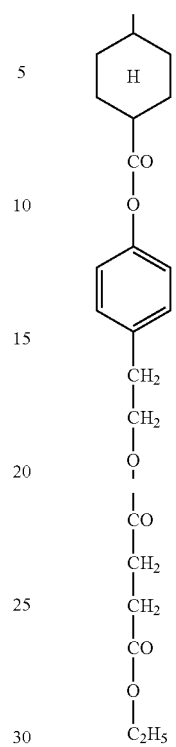
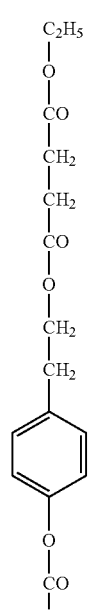
(21)
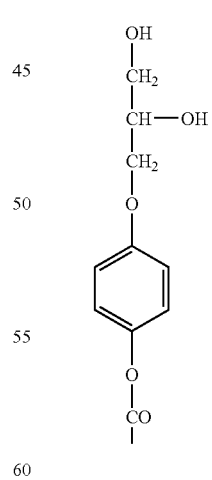
(22)

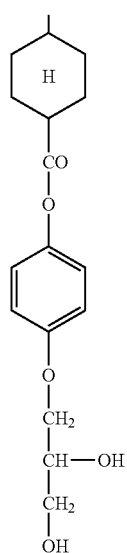
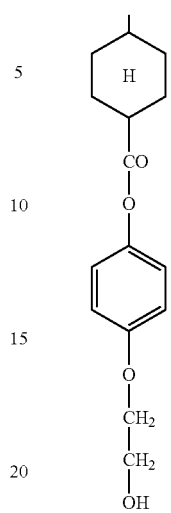
(23)
(25)
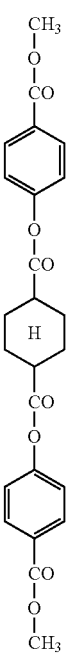

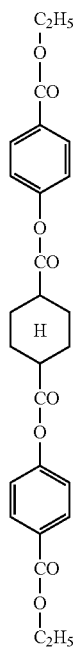
(26)
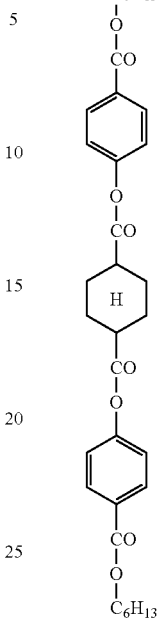
(28)
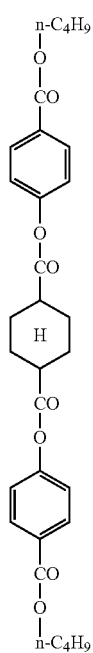
(27)
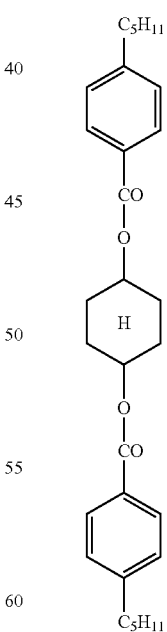
(29)

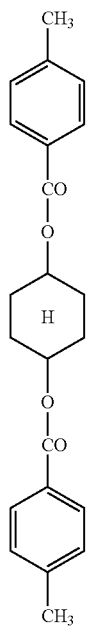 (30)
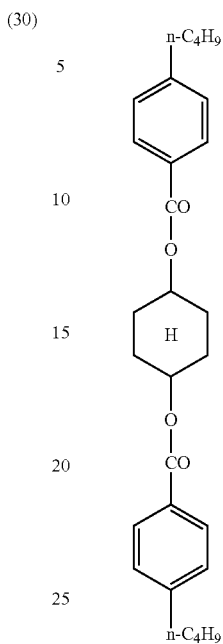 (32)
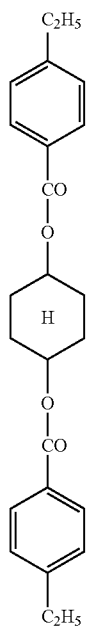 (31)
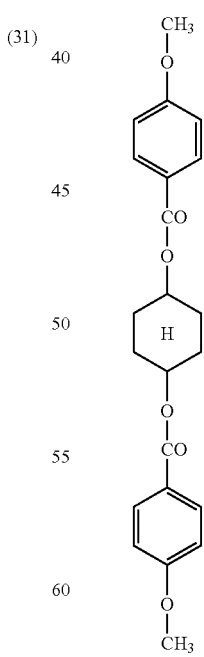 (33)

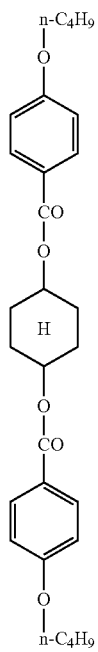
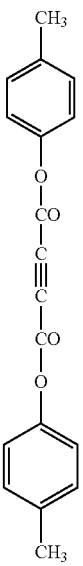

(38)
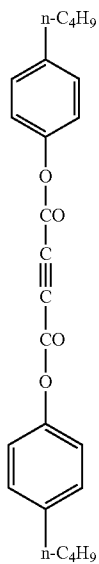
(40)
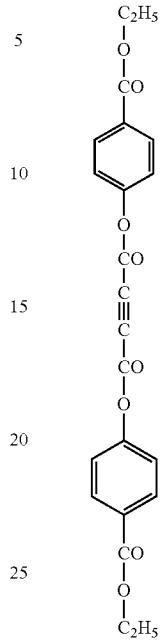
(39)
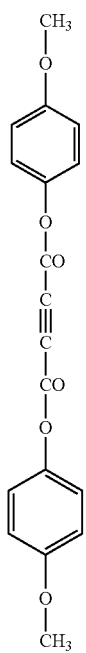
(41)
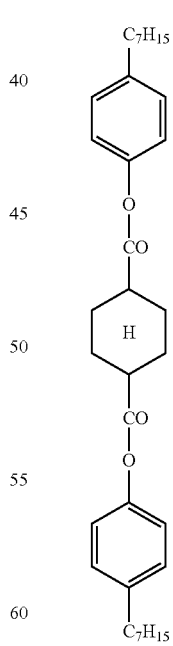

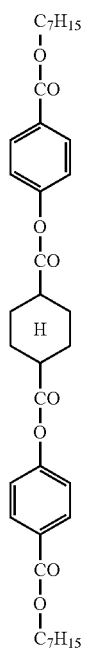
(42)

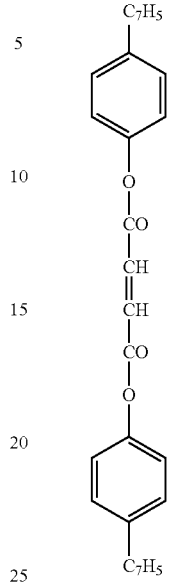
(44)

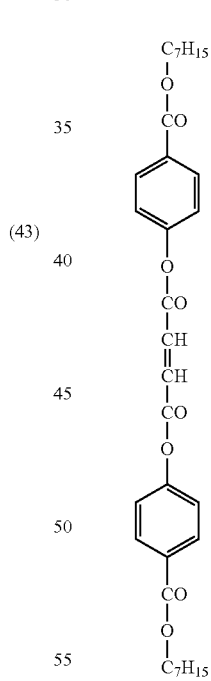
(45)

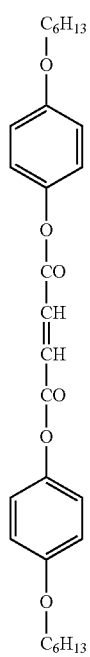
(43)

Exemplified Compounds (1) to (34), (41) and (42) each have two asymmetric carbon atoms at the 1- and 4-positions of the cyclohexane ring. However, the exemplified Compounds (1), (4) to (34), (41) and (42) have symmetric meso-form molecular structures, so none of them have optical isomers (optical activity) but each has only geometric isomers (trans-form and cis-form). The trans-form (1-trans) Exemplified Compound (1) and the cis-form (1-cis) Exemplified Compound (1) are illustrated below.

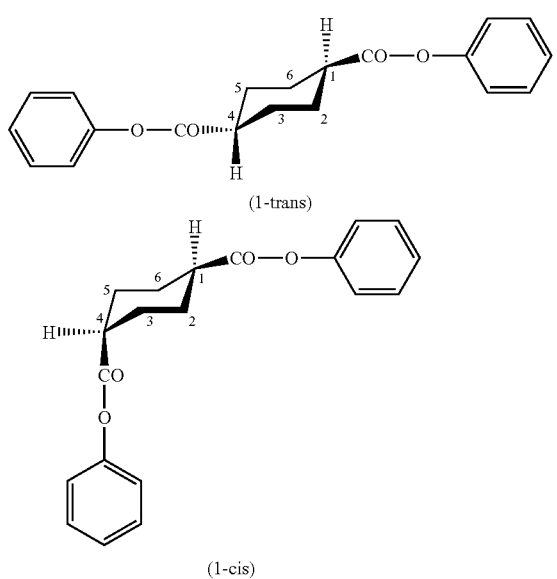

(1-trans)

(1-cis)

As mentioned above, it is preferable that rod-shaped compounds for use in the invention have linear structures. Therefore, the trans-form compounds are preferable to the cis-form compounds.

The exemplified Compounds (2) and (3) each have optical isomers in addition to geometric isomers (a total of 4 isomers). As to the geometric isomers also, the trans-form is preferable to the cis-form as mentioned above. As to the optical isomers, however, it is not worth to mention that one is better than the other. So they may have any of dextro (D), levo (L) and racemic forms.

In each of the exemplified Compounds (43) to (45), the vinylene linkage at the center, though may have either trans or cis form, preferably has the trans form for the same reason as mentioned above.

Compounds represented by the following formula (3) are also used preferably as a retardation developer.

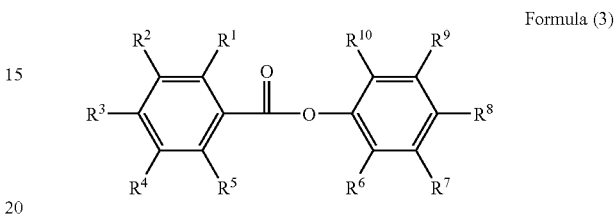

Formula (3)

In the above formula, $R^1$, $R^2$, $R^3$, $R^4$, R5, $R^6$, $R^7$, $R^9$ and $R^{10}$ each represent a hydrogen atom or a substituent independently, and at least one among the substituents $R^1$, $R^2$, $R^3$, $R^4$ and $R^5$ represents an electron-donating group. $R^8$ represents a hydrogen atom, a 1-4C alkyl group, a 2-6C alkenyl group, a 2-6C alkynyl group, a 6-12C aryl group, a 1-12C alkoxy group, a 6-12C aryloxy group, a 2-12C alkoxycarbonyl group, a 2-12C acylamino group, a cyano group or a halogen atom.

Examples of a compound represented by formula (3) are illustrated below.

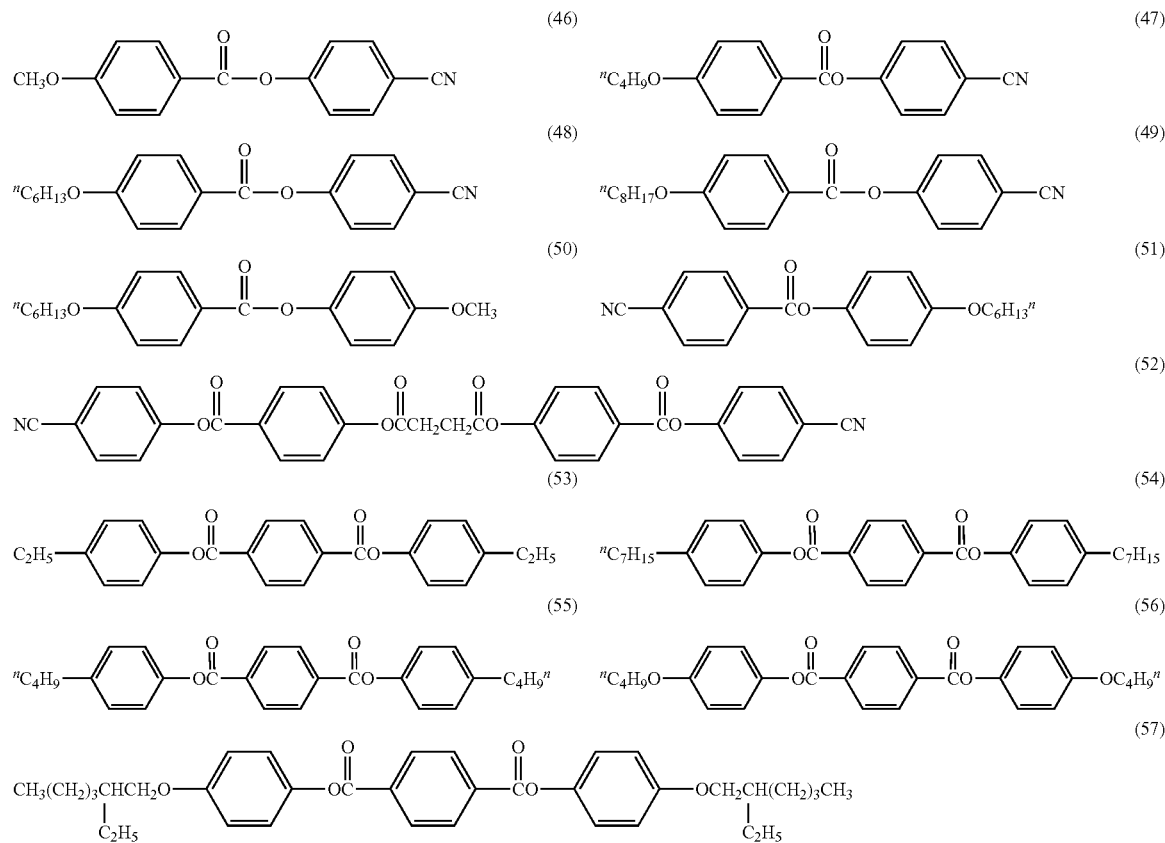

-continued
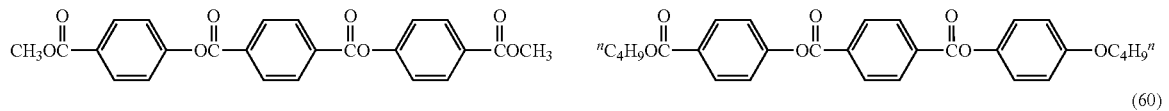
(58) (59)
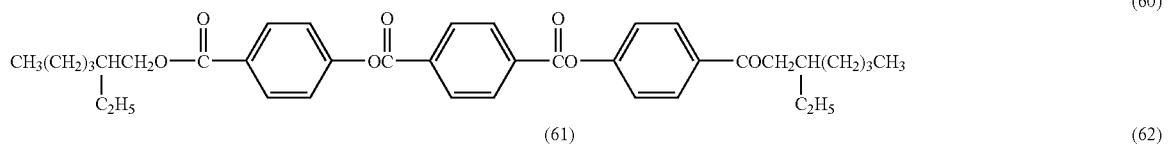
(60)
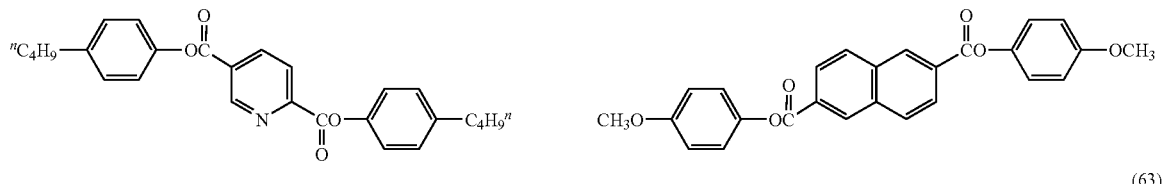
(61) (62)
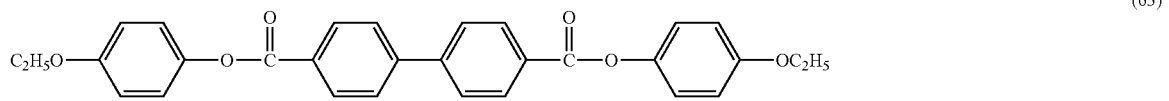
(63)
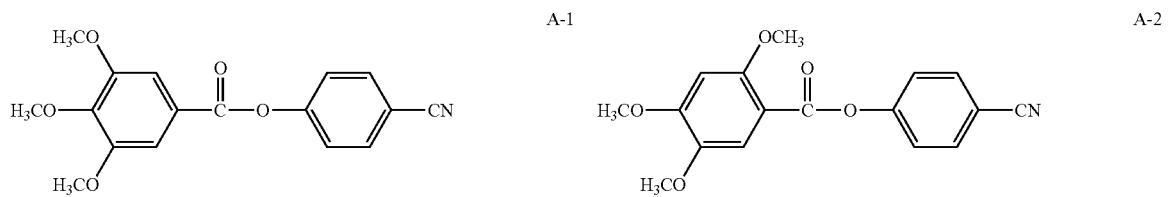
A-1    A-2
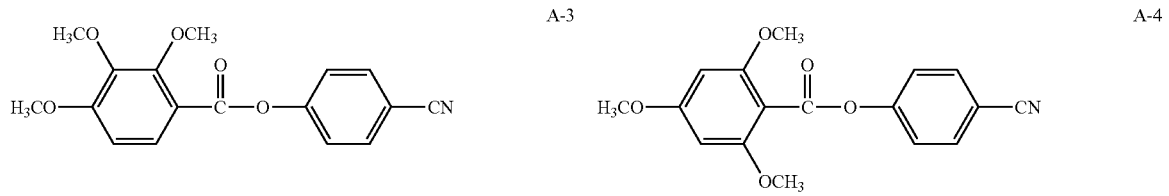
A-3    A-4
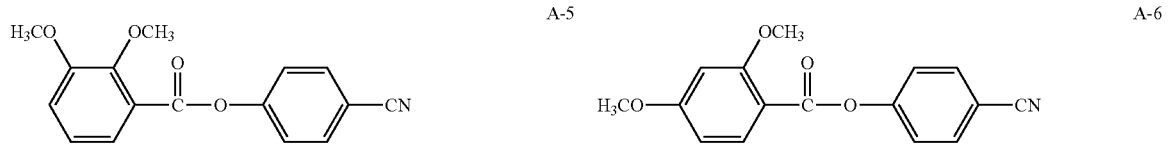
A-5    A-6
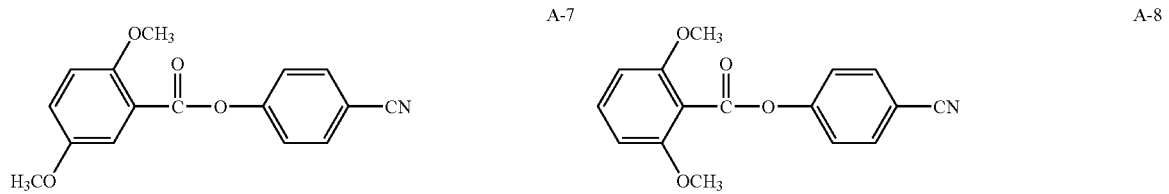
A-7    A-8
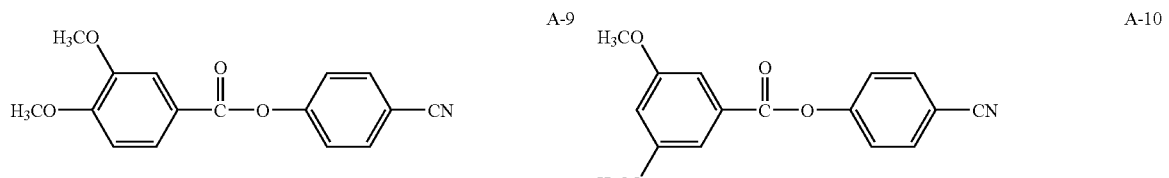
A-9    A-10
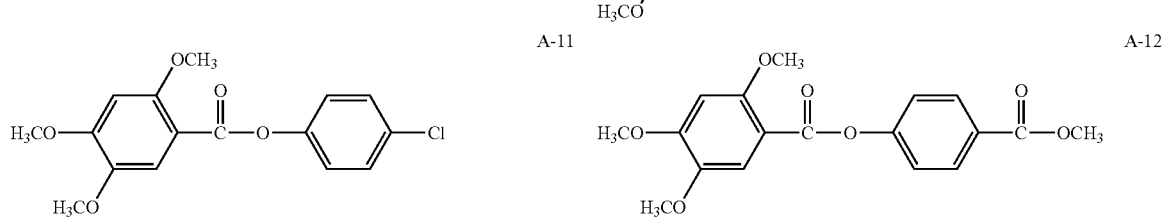
A-11   A-12

-continued
A-13
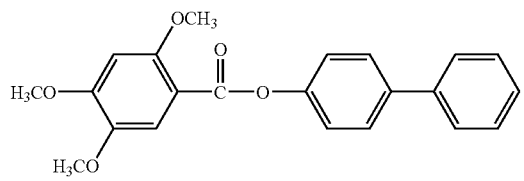
A-14
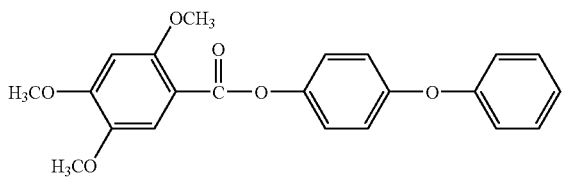
A-15
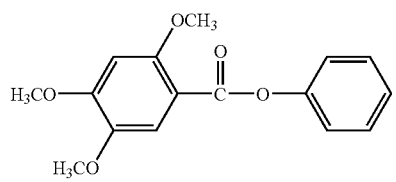
A-16
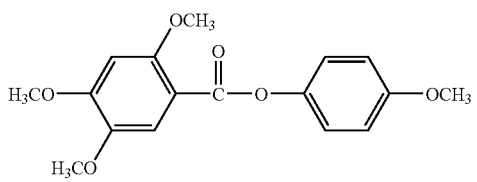
A-17
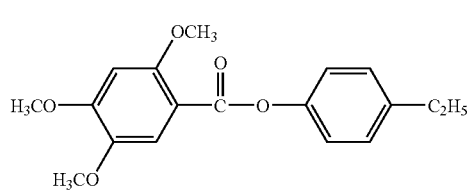
A-18
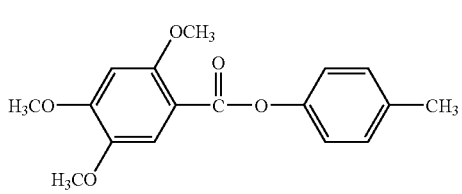
A-19
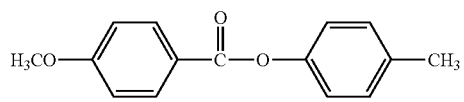
A-20
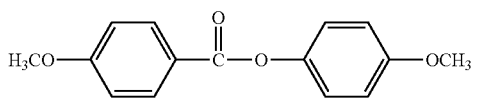
A-21
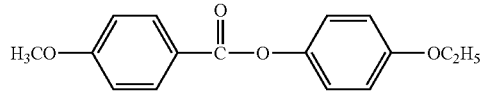
A-22
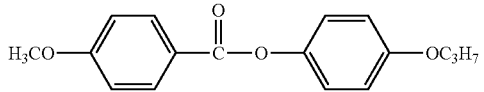
A-23
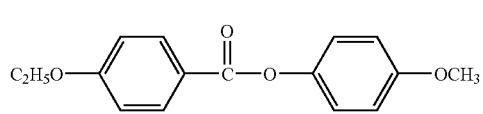
A-24
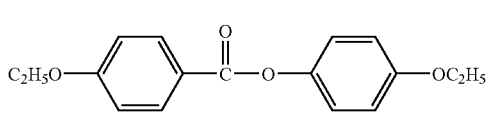
A-25
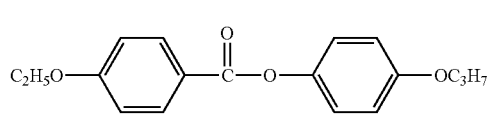
A-26
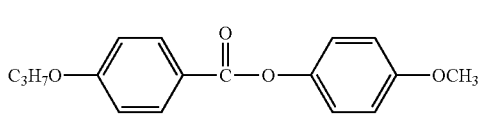
A-27
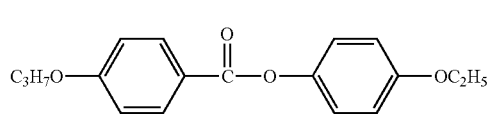
A-28
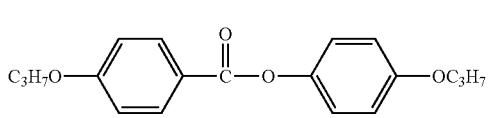
A-29
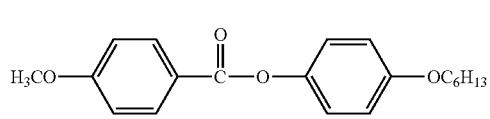
A-30
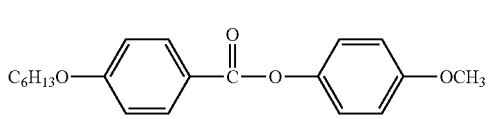
A-31
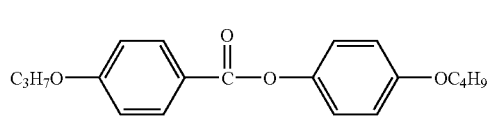
A-32
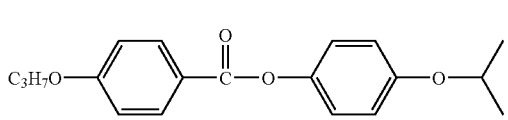
A-33
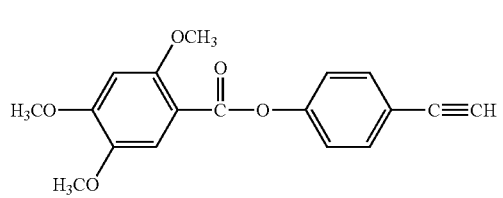
A-34
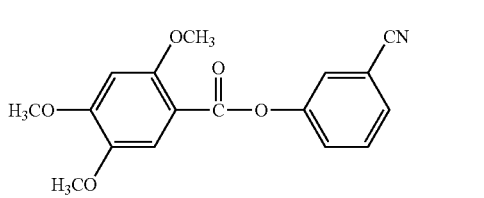

-continued

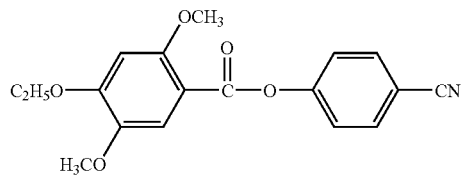
A-35

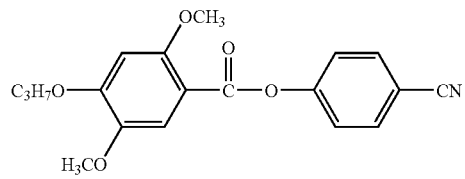
A-36

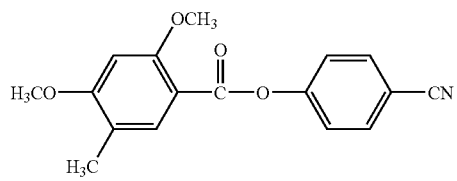
A-37

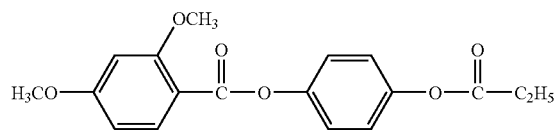
A-38

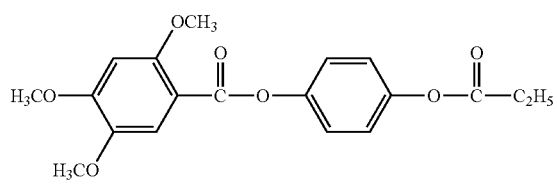
A-39

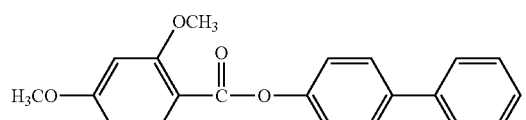
A-40

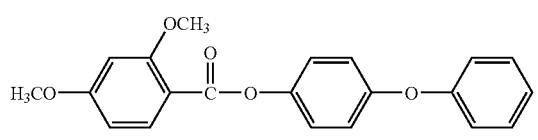
A-41

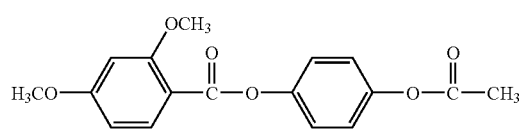
A-42

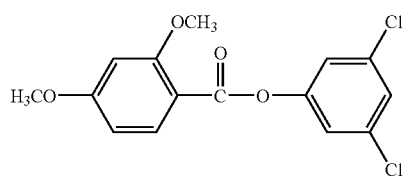
A-43

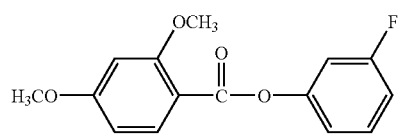
A-45

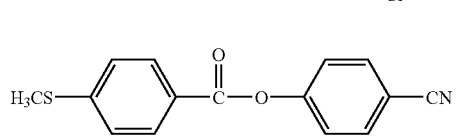
A-46

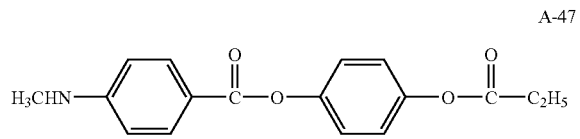
A-47

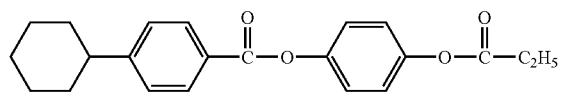
A-48

A-49

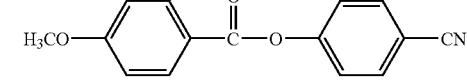
A-50

Two or more of rod-shaped compounds that show in the state of solutions ultraviolet absorption spectra wherein their maximum absorption wavelengths (λmax) are shorter than 250 nm may be used as a combination.

Rod-shaped compounds can be synthesized by reference to the methods described in documents. Examples of such documents include *Mol. Cryst. Liq. Cryst.*, volume 53, page 229 (1979), ibid., volume 89, page 93 (1982), ibid., volume 145, page 111 (1987), ibid., volume 170, page 43 (1989); *J. Am. Chem. Soc.*, volume 113, page 1349 (1991), ibid., volume 118, page 5346 (1996), ibid., volume 92, page 1582 (1970); *J. Org. Chem.*, volume 40, page 420 (1975); and *Tetrahedron*, volume 48, number 16, page 3437 (1992).

Then, organic solvents into which the cellulose acylate is dissolved are described.

(Chlorine-Containing Solvent)

In preparing a cellulose acylate solution, it is preferable to use as a main solvent a chlorine-containing organic solvent. In the invention, no restriction is placed on the type of a chlorine-containing organic solvent used so long as the solvent can dissolve cellulose acylate and permits flow casting and film formation, and what's more objects of the invention can be attained. Such a chlorine-containing organic solvent is preferably dichloromethane and chloroform, and dichloromethane in particular is favorable. In addition, chlorine-containing organic solvents can be mixed with other organic solvent without any particular problems. In using such a solvent mixture, it is required to use dichloromethane in a proportion of at least 50% by mass. Chlorine-free organic solvents usable in combination with chlorine-containing organic solvents in the invention are described below. Specifically, solvents selected from 3-12C esters, ketones, ethers, alcohol compounds or hydrocarbons are preferably used as the chlorine-free organic solvents. Such esters, ketones, ethers and alcohol compounds may have cyclic structures. Compounds having any two or more of functional groups in esters, ketones and ethers (namely —O—, —CO— and —COO—) can also be used as the solvent. These compounds may further contain the other functional groups, such as an alcoholic hydroxyl group. In the case of a solvent having two or more types of functional groups, the solvent is usable as far as the number of carbon atoms in the solvent is within specified limits to the number of carbon atoms in a compound having any one of the functional groups. Examples of esters having 3 to 12 carbon atoms include ethyl formate, propyl formate, pentyl formate, methyl acetate, ethyl acetate and pentyl acetate. Examples of ketones having 3 to 12 carbon atoms include acetone, methyl ethyl ketone, diethyl ketone, diisobutyl ketone, cyclopentanone, cyclohexanone and methylcyclohexanone. Examples of ethers having 3 to 12 carbon atoms include diisopropyl ether, dimethoxymethane, dimethoxyethane, 1,4-dioxane, 1,3-dioxolane, tetrahydrofuran, anisole and phenetole. Examples of organic solvents having two or more functional groups per molecule include 2-ethoxyethyl acetate, 2-methoxyethanol and 2-butoxyethanol.

Alcohol usable in combination with chlorine-containing organic solvents may have any of straight-chain, branched-chain and cyclic forms, and preferably includes a saturated aliphatic hydrocarbon moiety. The hydroxyl group of alcohol may be any of primary, secondary and tertiary hydroxyl groups. Examples of such alcohol include methanol, ethanol, 1-propanol, 2-propanol, 1-butanol, 2-butanol, t-butanol, 1-pentanol, 2-methyl-2-butanol and cyclohexanol. Additionally, fluorine-containing alcohol can also be used. Examples of such alcohol include 2-fluoroethanol, 2,2,2-trifluoroethanol and 2,2,3,3-tetrafluoro-1-propanol. Hydrocarbons usable in combination with chlorine-containing organic solvents may have any of straight-chain, branched-chain and cyclic forms, and they may be aromatic or aliphatic hydrocarbons. The aliphatic hydrocarbons may be saturated or unsaturated. Examples of hydrocarbons include cyclohexane, hexane, benzene, toluene and xylene.

Suitable examples of a combination of a chlorine-containing organic solvent as main solvent and other solvents are recited below, but these examples should not be construed as limiting the scope of the invention.

Dichloromethane/methanol/ethanol/butanol (75/10/5/5/5, parts by mass)
Dichloromethane/acetone/methanol/propanol (80/10/5/5, parts by mass
Dichloromethane/methanol/butanol/cyclohexane (80/10/5/5, parts by mass)
Dichloromethane/methyl ethyl ketone/methanol/butanol (80/10/5/5, parts by mass)
Dichloromethane/acetone/methyl ethyl ketone/ethanol/isopropanol (75/8/5/5/7, parts by mass)
Dichloromethane/cyclopentanone/methanol/isopropanol (80/7/5/8, parts by mass)
Dichloromethane/methyl acetate/butanol (80/10/10, parts by mass),
Dichloromethane/cyclohexanone/methanol/hexane (70/20/5/5, parts by mass)
Dichloromethane/methyl ethyl ketone/acetone/methanol/ethanol (50/20/20/5/5, parts by mass),
Dichloromethane/1,3-dioxolane/methanol/ethanol (70/20/5/5, parts by mass)
Dichloromethane/dioxane/acetone/methanol/ethanol (60/20/10/5/5, parts by mass)
Dichloromethane/acetone/cyclopentanone/ethanol/isobutanol/cyclohexane (65/10/10/5/5/5, parts by mass)
Dichloromethane/methyl ethyl ketone/acetone/methanol/ethanol (70/10/10/5/5, parts by mass)
Dichloromethane/acetone/ethyl acetate/ethanol/butanol/hexane (65/10/10/5/5/5, parts by mass)
Dichloromethane/methyl acetoacetate/methanol/ethanol (65/20/10/5 parts by mass)
Dichloromethane/cyclopentanone/ethanol/butanol (65/20/10/5, parts by mass)

(Chlorine-Free Solvent)

Chlorine-free solvents used suitably in preparing cellulose acylate solutions are described below. In the invention, no restriction is placed on the type of a chlorine-free organic solvent used so long as the solvent can dissolve cellulose acylate and permits flow casting and film formation, and what's more objects of the invention can be attained. As the chlorine-free organic solvents used in the invention, solvents selected from 3-12C esters, ketones or ethers are suitable. Such esters, ketones and ethers may have cyclic structures. Compounds having any two or more of functional groups in esters, ketones and ethers (namely —COO—, —CO— and —O—) can also be used as main solvent. These compounds may further contain the other functional groups, such as an alcoholic hydroxyl group. In the case of a main solvent having two or more types of functional groups, the solvent is usable as far as the number of carbon atoms in the solvent is within specified limits to the number of carbon atoms in a compound having any one of the functional groups. Examples of esters having 3 to 12 carbon atoms include ethyl formate, propyl formate, pentyl formate, methyl acetate, ethyl acetate and pentyl acetate. Examples of ketones having 3 to 12 carbon atoms include acetone, methyl ethyl ketone, diethyl ketone, diisobutyl ketone, cyclopentanone, cyclohexanone and methylcyclohexanone. Examples of ethers having 3 to 12 carbon atoms include diisopropyl ether, dimethoxymethane, dimethoxyethane, 1,4-dioxane, 1,3-dioxolane, tetrahydrofuran, anisole and phenetole. Examples of organic solvents having two or more functional groups per molecule include 2-ethoxyethyl acetate, 2-methoxyethanol and 2-butoxyethanol.

A chlorine-free solvent used suitably for cellulose acylate, though chosen from various viewpoints as mentioned above, is as follows. The solvent suitable for the cellulose acylate according to the invention is a mixture of at least three different types of solvents. A first solvent is a single solvent or a mixture of solvents chosen from methyl acetate, ethyl acetate, methyl formate, ethyl formate, acetone, dioxolane or dioxane, a second solvent is chosen from ketones having 4 to 7 carbon atoms or acetoacetates, and a third solvent is chosen from 1-10C alcohol or hydrocarbons, preferably from 1-8C alcohol. When the first solvent is a mixture of two or more different types of solvent, the second solvent may be omitted. The first solvent is preferably methyl acetate, acetone, methyl formate, ethyl formate or a mixture of two or more thereof, and the second solvent is preferably methyl ethyl ketone, cyclopentanone, cyclohexanone or methyl acetoacetate, or it may be a mixture of two or more thereof.

The alcohol as the third solvent may have any of straight-chain, branched-chain and cyclic forms, and preferably includes a saturated aliphatic hydrocarbon moiety. The hydroxyl group of alcohol may be any of primary, secondary and tertiary hydroxyl groups. Examples of such alcohol include methanol, ethanol, 1-propanol, 2-propanol, 1-butanol, 2-butanol, t-butanol, 1-pentanol, 2-methyl-2-butanol and cyclohexanol. Additionally, fluorine-containing alcohol can also be used as alcohol. Examples of such alcohol include 2-fluoroethanol, 2,2,2-trifluoroethanol and 2,2,3,3-tetrafluoro-1-propanol. Further, the hydrocarbons may have any of straight-chain, branched-chain and cyclic forms, and they may be aromatic or aliphatic hydrocarbons. The aliphatic hydrocarbons may be saturated or unsaturated. Examples of hydrocarbons include cyclohexane, hexane, benzene, toluene and xylene. These alcohol compounds and hydrocarbons as the third solvent may be used alone or as mixtures of two or more thereof, and have no particular restrictions. Examples of an alcohol compound suitable as the third solvent include methanol, ethanol, 1-propanol, 2-propanol, 1-butanol, 2-butanol, cyclohexanol, cyclohexane and hexane. Of these alcohol compounds, methanol, ethanol, 1-propanol, 2-propanol and 1-butanol are especially preferred.

In the mixture of three types of solvents, it is preferable that the proportion of the first solvent is from 20% to 95% by mass, that of the second solvent from 2% to 60% by mass and that of the third solvent from 2% to 30% by mass. It is preferable by far that the mixture contains the first solvent in a proportion of 30% to 90% by mass, the second solvent in a proportion of 3% to 50% by mass and alcohol as the third solvent in a proportion of 3% to 25% by mass. Moreover, it is particularly favorable that the first solvent is contained in a proportion of 30% to 90% by mass, the second solvent is contained in a proportion of 3% to 30% by mass and the third solvent is alcohol and contained in a proportion of 3% to 15% by mass. In the case where the first solvent is a mixture and the second solvent is not used, it is preferable that the first solvent is contained in a proportion of 20% to 90% by mass and the third solvent in a proportion of 5% to 30% by mass, and it is preferable by far that the first solvent is contained in a proportion of 30% to 86% by mass and the third solvent in a proportion of 7% to 25% by mass. Those chlorine-free organic solvents usable in the invention are described in detail in JIII Journal of Technical Disclosure No. 2001-1745, pages 12 to 16, Japan Institute of Invention and Innovation (Mar. 15, 2001). Suitable examples of a combination of chlorine-free organic solvents are recited below, but these examples should not be construed as limiting the scope of the invention.

Methyl acetate/acetone/methanol/ethanol/butanol (75/10/5/5/5, parts by mass)
Methyl acetate/acetone/methanol/ethanol/propanol (75/10/5/5/5, parts by mass)
Methyl acetate/acetone/methanol/butanol/cyclohexane (75/10/5/5/5, parts by mass)
Methyl acetate/acetone/ethanol/butanol (81/8/7/4, parts by mass)
Methyl acetate/acetone/ethanol/butanol (82/10/4/4, parts by mass)
Methyl acetate/acetone/ethanol/butanol (80/10/4/6, parts by mass)
Methyl acetate/methyl ethyl ketone/methanol/butanol (80/10/5/5, parts by mass)
Methyl acetate/acetone/methyl ethyl ketone/ethanol/isopropanol (75/8/5/5/7, parts by mass)
Methyl acetate/cyclopentanone/methanol/isopropanol (80/7/5/8, parts by mass)
Methyl acetate/acetone/butanol (85/10/5, parts by mass),
Methyl acetate/cyclopentanone/acetone/methanol/butanol (60/15/14/5/6, parts by mass)
Methyl acetate/cyclohexanone/methanol/hexane (70/20/5/5, parts by mass)
Methyl acetate/methyl ethyl ketone/acetone/methanol/ethanol (50/20/20/5/5, parts by mass),
Methyl acetate/1,3-dioxolane/methanol/ethanol (70/20/5/5, parts by mass)
Methyl acetate/dioxane/acetone/methanol/ethanol (60/20/10/5/5, parts by mass)
Methyl acetate/acetone/cyclopentanone/ethanol/isobutanol/cyclohexane (65/10/10/5/5/5, parts by mass)
Methyl formate/methyl ethyl ketone/acetone/methanol/ethanol (50/20/20/5/5, parts by mass)
Methyl formate/acetone/ethyl acetate/ethanol/butanol/hexane (65/10/10/5/5/5, parts by mass)
Acetone/methyl acetoacetate/methanol/ethanol (65/20/10/5 parts by mass)
Acetone/cyclopentanone/ethanol/butanol (65/20/10/5, parts by mass)
Acetone/1,3-dioxolane/ethanol/butanol (65/20/10/5, parts by mass)
1,3-Dioxolane/cyclohexanone/methyl ethyl ketone/methanol/butanol (55/20/10/5/5/5, parts by mass)

Cellulose acylate solutions prepared in the following manners can also be used.

A cellulose acylate solution is prepared using a methyl acetate/acetone/ethanol/butanol (81/8/7/4, parts by mass) mixture as a solvent, filtrated and concentrated, and thereto 2 parts by mass of butanol is further added.

A cellulose acylate solution is prepared using a methyl acetate/acetone/ethanol/butanol (84/10/4/2, parts by mass) mixture as a solvent, filtrated and concentrated, and thereto 4 parts by mass of butanol is further added.

A cellulose acylate solution is prepared using a methyl acetate/acetone/ethanol (84/10/6, parts by mass) mixture as a solvent, filtrated and concentrated, and thereto 5 parts by mass of butanol is further added.

(Cellulose Acylate Solution Characteristics)

As to the cellulose acylate solution according to the invention, it is preferable that the cellulose acylate dissolves in an organic solvent in a concentration of 10% to 30% by mass, preferably 13% to 27% by mass, particularly preferably 15% to 25% by mass. With respect to a method of preparing a cellulose acylate solution having its concentration in the range as mentioned above, the intended concentration may be attained at the stage of cellulose acylate dissolution, or a cellulose acylate solution prepared in advance in a low concentration (e.g., 9 to 15% by mass) may be concentrated so as to have the intended high concentration by a concentration operation as described below. Alternatively, a cellulose acylate solution may be prepared in advance in a high concentration and the concentration thereof may be reduced to the intended low concentration by addition of various additives. There occurs no particular problem so far as the solution of cellulose acylate according to the invention is prepared so as to have its concentration in the range as specified above no matter what method is used for.

Further, it is preferable that the cluster molecular weight of cellulose acylate in a dilute solution obtained by diluting the cellulose acylate solution according to the invention with an organic solvent having the same composition to 0.1 to 5% by mass is within a range of one hundred fifty thousand to fifteen million. And it is preferable by far that the cluster molecular weight ranges from one hundred eighty thousand to nine million. The cluster molecular weight can be determined by a static light-scattering method. For this measurement, it is appropriate to dissolve cellulose acylate in a condition that the inertial square radii determined at the same time ranges from 10 to 200 nm, preferably from 20 to 200 nm. Moreover, it is preferable to dissolve cellulose acylate so that the second virial coefficient is from $-2\times10^{-4}$ to $4\times10^{-4}$, especially from $-2\times10^{-4}$ to $2\times10^{-4}$.

Now, definitions of the foregoing cluster molecular weight, inertial square radius and second virial coefficient are mentioned. These values are determined using a static light-scattering method under the following procedure. Although measurements are made in a dilute concentration range on account of the apparatus used, the measured values reflect behaviors of dope in a high concentration range according to the invention. First, cellulose acylate is dissolved in a solvent for dope use to prepare solutions having concentrations of 0.1%, 0.2%, 0.3% and 0.4% by weight, respectively. In order to avoid taking up moisture, cellulose acylate dried at 120° C. for 2 hours is used, and the weighting thereof is made under a 25° C.-10% RH condition. The thus dried cellulose acylate is dissolved in accordance with the method adopted in dope dissolution (a room-temperature dissolution method, a cooling dissolution method or a high-temperature dissolution method). Successively thereto, the solutions obtained and the same solvent as used therein are filtered through a 0.2-µm filter made of Teflon (registered trademark). The solutions thus filtered are examined for static light scattering at 10-degree intervals from 30 degrees to 140 degrees under a temperature of 25° C. by use of a light-scattering measurement device (DLS-700, made by Otsuka Electronics Co., Ltd.). The data thus obtained are analyzed in accordance with Berry plot method. As a refractive index required for this analysis, the solvent's value determined with an Abbe refractometer is used. And the concentration gradient (dn/dc) of refractive index is determined using the solvent and the solutions used in the light-scattering measurement and a differential refractometer (DRM-1021, made by Otsuka Electronics Co., Ltd.).

(Dope Preparation)

Preparation of a cellulose acylate solution (dope) in the invention is not particularly restricted as to the method of dissolving cellulose acylate, so the dissolution of cellulose acylate may be carried out at room temperature, or performed using a cooling dissolution method, a high-temperature dissolution method or a combination of these methods. More specifically, the methods for preparation of cellulose acylate solutions are disclosed, e.g., in JP-A-5-163301, JP-A-61-106628, JP-A-58-127737, JP-A-9-95544, JP-A-10-95854, JP-A-10-45950, JP-A-2000-53784, JP-A-11-322946, JP-A-11-322947, JP-A-2-276830, JP-A-2000-273239, JP-A-11-71463, JP-A-4-259511, JP-A-2000-273184, JP-A-11-323017 and JP-A-11-302388. These methods for dissolution of cellulose acylates in organic solvents can be applied appropriately to the invention as far as those techniques are within the scope of the invention. Ddetails thereof, especially details of methods for using chlorine-free solvents, can be found in *JIII Journal of Technical Disclosure* No. 2001-1745, pages 22 to 25, Japan Institute of Invention and Innovation (Mar. 15, 2001). Further, although the dope solution of cellulose acylate used in the invention is generally concentrated and filtered, methods for these operations are also described in detail in *JIII Journal of Technical Disclosure* No. 2001-1745, page 25, Japan Institute of Invention and Innovation (Mar. 15, 2001). Additionally, in most of the cases where the dissolution is carried out at a high temperature, the temperature required is higher than the boiling point of an organic solvent used. So the dissolution is performed under a pressurized condition.

With respect to the concentration of a cellulose acylate solution, as mentioned above, the dope obtained is characterized by its high concentration and a cellulose acylate solution of high concentration and high stability can be obtained without recourse to concentration. For easier dissolution, cellulose acylate may be dissolved firstly in a low concentration, and then concentrated in a certain way. The concentration is not particularly restricted as to the method applied therefor, but the following methods can be adopted. For instance, the method in which a low concentration of solution is introduced into a space between a cylinder and a rotation trajectory of the perimeter of blades installed in the cylinder and rotating in the peripheral direction of the cylinder, and the solvent thereof is evaporated as a temperature difference is given between the solution and the space, thereby preparing a high concentration of solution (as disclosed, e.g., in JP-A-4-259511), or methods in which a heated solution of a low concentration is blown into a vessel from a nozzle, the solvent therein is flash-evaporated while the solution travels from the nozzle to the inner wall of the vessel and at the same time the solvent vapor is purged from the vessel and a high concentration of solution is drawn from the bottom of the vessel (as disclosed, e.g., in U.S. Pat. Nos. 2,541,012, 2,858,229, 4,414,341 and 4,504,355) can be adopted.

Prior to flow casting, it is preferable that the solution is filtered with an appropriate filter material, such as gauze or flannel to eliminate extraneous matter, including undissolved matter, dirt and impurities. For filtration of the cellulose acylate solution, it is advantageous to use a filter with an absolute filtration accuracy of 0.1 to 100 µm, preferably 0.5 to 25 µm. The thickness of a filter used is preferably from 0.1 to 10 mm, far preferably from 0.2 to 2 mm. Herein, it is appropriate that the filtration be performed under a pressure of 1.6 MPa or below, preferably 1.2 MPa or below, far preferably 1.0 MPa or below, particularly preferably 0.2 MPa or below. Suitable examples of a filter material used herein include hitherto known materials, such as glass fiber, cellulose fiber, filter paper, fluoropolymers including tetrafluoroethylene resin. Of these materials, ceramics and metals can be used to particular advantage.

The cellulose acylate solution used in the invention preferably has a viscosity adjusted to a specified range. The viscosity is measured by use of about 1 mL of a sample solution and a stress rheometer (CVO 120) made by Bohlin Instruments Ltd. Herein, the viscosity (units: Pas) is determined under conditions that the dope temperature is set at 33° C. and a 1% displacement is loaded at a frequency of 1 Hz.

The suitable viscosity of the dope is from 10 to 70 Pas (as measured at a temperature of 33° C.). When the viscosity is higher than that range, the dope is poor in flowability and difficult to filter and flow-cast; while, when the viscosity is lower than that range, the inner pressure of a casting die becomes low, so the dope cannot be flow-cast evenly in the width direction and tends to cause a big thickness variation in the width direction. The dope viscosity is preferably from 15 to 45 Pas, especially preferably from 20 to 35 Pas.

When the viscosity of the solution is within the foregoing range, the load of filtering can be reduced and thereby it becomes possible to use a filter material with a finer pore diameter and higher accuracy than usual. As a result, the present cellulose acylate film becomes slight in extraneous matter, and the so-called bright extraneous spots shining by light leaks especially when a liquid crystal display in which the present film is incorporated is in a black-display state can be reduced more greatly than usual.

(Film Formation)

Film formation methods using a cellulose acylate solution are described below. As a method and apparatus for forming the present cellulose acylate film, the solution-casting film formation method and apparatus currently in use for formation of cellulose triacetate film can be employed. Specifically, a dope (cellulose acylate solution) prepared in a dissolving machine (boiler) is once stored in a storage pot in order to eliminate foams in the dope, and thereby the dope preparation is finished. The dope is fed from a dope port into a pressure die through a pressure metering gear pump ensuring a quantitative feed of high accuracy by its number of revolutions, and flow-cast evenly onto a metal support in a flow casting section which endlessly runs from a mouthpiece (slit) of the pressure die. At the strip-off point where the metal support makes a nearly one circuit, half-dried dope film (referred to as web, too) is stripped off the metal support. The web obtained is dried as it is conveyed with a tenter in a condition that the width of the web is kept by both web edges being pinched with clips, and then the web is conveyed with a group of rolls installed in a drier and thereby the drying thereof is completed. The completely dried web is wound in a desired length with a winder. The combination of a tenter and a group of rolls in a drier varies depending on its intended use. In the solution-casting film formation method applied to functional films for electronic displays, coating apparatus for surface processing of film, such as formation of a subbing layer, an antistatic layer, an antihalation layer and a protective film, is added in many cases besides the solution-casting film formation apparatus. Further, the stretching may be performed during the film-formation process or after winding of the film formed. Production processes each are briefly described below, but the scope of the invention is not limited to these processes.

In making a cellulose acylate film by a solvent cast method, the cellulose acylate solution (dope) is flow-cast onto a drum or a band and the solvent is made to evaporate, thereby forming a film. As to the dope before flow casting, it is preferable that the dope concentration is adjusted to the range of 5 to 40% by mass on a solids basis. The drum surface or the band surface is preferably polished to a mirror-smooth surface. Further, the dope is preferably flow-cast onto a drum or band having a surface temperature of 30° C. or below, and it is especially favorable that the metal support temperature is in the range of −10° C. to 20° C.

Moreover, the techniques disclosed in JP-A-2000-301555, JP-A-2000-301558, JP-A-7-032391, JP-A-3-193316, JP-A-5-086212, JP-A-62-037113, JP-A-2-276607, JP-A-55-014201, JP-A-2-111511 and JP-A-2-208650 can be applied to the invention.

(Multilayer Flow Casting)

The cellulose acylate solution may be flow-cast as a single-layer solution onto a smooth band or drum as a metal support, or a plurality of cellulose acylate solutions may be flow-cast in a multilayer form. In the case of flow-casting a plurality of cellulose acylate solutions, film may be formed as the solutions are flow-cast respectively from a plurality of casting ports provided at intervals along the traveling direction of the metal support and one solution layer is superimposed on another solution layer. To this case, the methods disclosed, e.g., in JP-61-158414, JP-A-1-122419 and JP-A-11-198285 are applicable.

In addition, the cellulose acylate solution may be formed into a film by flow casting from two casting ports. This film formation can be performed, e.g., according to the methods disclosed in JP-B-60-27562, JP-A-61-94724, JP-A-61-947245, JP-A-61-104813, JP-A-61-158413 and JP-A-6-134933. In accordance with another flow casting method disclosed in JP-A-56-162617, a cellulose acylate film may be formed by a flow of high-viscosity cellulose acylate solution being wrapped up in a low-viscosity cellulose acylate solution and both the high- and low-viscosity cellulose acylate solutions being extruded at the same time. As disclosed in JP-A-61-94724 and JP-A-61-94725, it is also a preferred mode that the outside solution contains an alcohol component as a poor solvent in a greater amount than the inside solution. In still another mode, it is possible to make a film by using two casting ports, forming a film on a metal support by use of a solution from the first casting port and stripping the film off the support, and flow-casting a solution from the second casting port onto the support-contact surface of the film. This mode accords with, e.g., the method disclosed in JP-B-44-20235f. The cellulose acylate solutions used for the flow casting may be the same or different, and there is no particular limitations thereto. In order to impart functions to a plurality of cellulose acylate layers, it is enough to extrude cellulose acylate solutions having the corresponding functions from their respective casting ports. Additionally, the cellulose acylate solution can be flow-cast simultaneously with solutions for other functional layers (e.g., an adhesive layer, a dye layer, an antistatic layer, an antihalation layer, a UV absorbing layer, a polarization layer).

For achieving the required film thickness by a single-layer solution currently in use, it is necessary to extrude a cellulose acylate solution of high concentration and high viscosity. Since such a cellulose acylate solution is poor in stability, solid matter tends to develop therein and often causes a problem that the film formed has pimple trouble or poor planarity. An answer to such a problem consists in flow-casting a plurality of cellulose acylate solutions from casting ports, and thereby not only solutions of high viscosity can be extruded onto a metal support at the same time to result in formation of film with improved planarity and excellent surface quality, but also thick cellulose acylate solutions can be used to result in reduction in drying load and speedup in film production.

In the case of co-casting, the inner thickness and the outer thickness have no particular limitations, but it is appropriate that the outer thickness constitute 1 to 50%, preferably 2 to 30%, of the total film thickness. Herein, the outer thickness is defined as the sum total of the thickness of the layer brought into contact with a metal support and the thickness of the layer brought into contact with the air. In the co-casting, cellulose acylate solutions different in concentration of each additive, such as a plasticizer, a ultraviolet absorbent or a matting agent, can also be cast together, thereby forming a cellulose acylate film having a multilayer structure. For instance, it is possible to make a cellulose acylate film having a skin layer/core layer/skin layer structure. Herein, a matting agent, for example, can be added in a greater amount to the skin layers, or added only to the skin layers. On the other hand, a plasticizer and an ultraviolet absorbent can be added in greater amounts to the core layer than the skin layers, or added to the core layer alone. Further, the plasticizers added to the core layer and the skin layer may be different in type and the ultraviolet absorbent added thereto may also be different in type. For instance, a low-volatility plasticizer and/or ultraviolet absorbent can be incorporated into the skin layers, while a highly plastic plasticizer or a highly efficient ultraviolet absorbent can be added to the core layer. It is also a preferred embodiment that a stripping accelerator is incorporated in only the skin layer on the metal support side. For gelling the solution by cooling the metal support in a cooled drum method, it is also favorable to add alcohol as a poor solvent in a greater amount to the skin layer. The skin layer and the core layer may have different Tg values, and it is preferable that the Tg of the core layer is lower than that of the skin layer. In addition, the viscosity of the cellulose acylate solution at casting-time may differ between the skin layer and the core layer, and it is preferable that the viscosity of the skin layer is lower than that of the core layer, but the viscosity of the core layer may be lower than that of the skin layer.

(Flow Casting)

Examples of a solution casting method include the method of extruding a prepared dope evenly onto a metal support from a pressure die, the method of using a doctor blade in which the thickness of a dope once cast onto a metal support is adjusted with the blade, and a method of using a reverse roll coater in which adjustment is made with a roll rotating reversely. Of these methods, the method of using a pressure die is preferable. The pressure die includes a coat hanger type and a T-die type, and both types are favorably used. In addition to those methods, various known methods for flow-casting cellulose triacetate solutions to make films can be applied, and the same effects as described in documents can be achieved by setting conditions with consideration given to differences, e.g., in boiling points of solvents used. An endlessly-traveling metal support used in forming the present cellulose acylate film is a drum whose surface is mirror-finished by chromium plating, or a stainless belt (which may be referred to as "band") whose surface is mirror-finished by surface polishing. As to the pressure die used in forming the present cellulose acylate film, only one or more than one pressure die may be placed above the metal support. Specifically, it is appropriate that one or two pressure dies be placed. When two or more pressure dies are placed, the dope may be allocated in different proportions to the respective dies, and fed to the pressure dies from a plurality of high-precision metering gear pumps in their respective proportions. The temperature of a cellulose acylate solution used for flow casting is preferably from −10° C. to 55° C., far preferably from 25° C. to 50° C. In the flow casting process, the temperature may be the same throughout the process, or different from one point to another in the process. In the case of differing in temperature, it is adequate for the intended purpose that the dope just before flow casting has the desired temperature.

(Drying)

Examples of a general method for drying a dope on a metal support in making a cellulose acylate film include a method of giving a hot air to the front side of the metal support (a drum or a belt), or exposing the surface of web on a metal support to a hot air; a method of giving a hot air to the back of a drum or a belt; and a liquid-heat transfer method in which a temperature-controlled liquid is brought into contact with the back of a belt or a drum, which is the side opposite to the dope-cast side of the drum or the belt, and heats the drum or the belt through heat transfer and thereby controls the surface temperature. Of these methods, the back liquid-heat transfer method is preferred. The metal support surface temperature before flow casting, though may be set at any value as far as it is below the boiling points of all solvents used for the dope, is preferably set at a temperature lower by 1 to 10 degrees than the lowest boiling point among those of all solvents used. Incidentally, the case of cooling a flow-cast dope and stripping it off without drying is free from such a restriction.

The film thickness may be adjusted to the desired one by controlling the concentration of solid component in the dope, the gap in the slit of a die mouthpiece, the pressure of extrusion from a die and the traveling speed of a metal support as appropriate. The width of the thus obtained cellulose acylate film is preferably from 0.5 to 3 m, far preferably from 0.6 to 2.5 m, further preferably from 0.8 to 2.2 m. When the film is wound into a roll, the length thereof is preferably from 100 to 10,000 m, far preferably from 500 to 7,000 m, further preferably from 1,000 to 6,000 m. Prior to winding, it is favorable to knurl at least one edge of the film. The width of the knurled edge is from 3 to 50 mm, preferably from 5 to 30 mm, and the height is from 1 to 50 μm, preferably from 2 to 20 μm, far preferably from 3 to 10 μm. This knurling may be made by one-sided embossment or both sided-embossment.

For keeping lucidity, the haze is preferably from 0.01% to 2%. In order to reduce the haze, fine particles of matting agent added are fully dispersed to reduce the number of coagulated particles and the amount of matting agent added is reduced by use in the skin layers alone.

The optical characteristic values Re and Rth vary as the mass and dimensions are changed by a humidity change and a lapse of time under high temperatures. The smaller the changes in Re and Rth values are, the more suitable the film is for use. For reduction of optical characteristic changes caused by humidity, cellulose acylate having a high degree of acyl substitution at the 6-position is used, and besides, the moisture permeability and equilibrium moisture content of the film are lowered by use of hydrophobic additives (including a plasticizer, a retardation developer and an ultraviolet absorbent). The suitable moisture permeability is from 400 $g/m^2$ to 2,300 $g/m^2$ as measured under conditions of 60° C., 95% RH and 24 hours. As to the equilibrium moisture content, the suitable value, as measured at 25° C. and 80% RH, is 3.4% or below. The suitable amount of additives used is from 10% to 30%, preferably from 12% to 25%, particularly preferably from 14.5% to 20%, of the amount of cellulose acylate used. When the film causes changes in mass and dimensions because of volatility or decomposibility of additives incorporated therein, optical characteristic changes occur. Accordingly, it is preferable that the amount of the mass change caused in the film after a lapse of 48 hours at 80° C. and 90% RH is 5% or below. Similarly thereto, the amount of the dimensional change caused in the film after a lapse of 24 hours at 60° C. and 90% RH, or that after a lapse of 24 hours at 90° C. and 3% RH is preferably within ±2%. Even when there are a little dimensional change and a little mass change, the amount of the changes in optical characteristics becomes small so far as the photo-elastic modulus of the film is small. Therefore, it is preferable that the photo-elastic modulus of the film is $50 \times 10^{-13}$ $cm^2/dyne$ or below.

(Polarizing Plate)

The polarizing plate generally has a polarizer and two transparent protective films arranged on both sides of the polarizer. As at least one of the protective films, the present cellulose acylate film can be used. As the other protective film, a currently used cellulose acetate film may be used. Examples of the polarizer include an iodine polarizer, a dye polarizer using a dichroic dye, and a polyene polarizer. The iodine polarizer and the dye polarizer are generally produced using polyvinyl alcohol films. When the present cellulose acylate film is used as a protective film of the polarizing plate, the polarizing plate has no particular restrictions as to its production method, but it can be produced by general methods. For instance, the cellulose acylate film obtained is treated with an alkali and stacked on either side of a polarizer, which is made by immersing a polyvinyl alcohol film in an iodide solution and then stretching the resultant film, with the aid of an aqueous solution of completely saponified polyvinyl alcohol. In place of the alkali treatment, the cellulose acylate film may undergo the processing for easy adhesion as disclosed in JP-A-6-94915 or JP-A-6-118232. Examples of an adhesive used for laminating a polarizer on the processed surface of the protective film include adhesives of alcohol type, such as a polyvinyl alcohol adhesive or polyvinyl butyral adhesive, and vinyl latices, such as butyl acrylate. The polarizing plate is made up of a polarizer and protective films for protection of the both sides of the polarizer, and further has a protect film on one side and a separate film on the other side in a stacked state. The protect film and the separate film are stacked for the purpose of protecting the polarizing plate at shipment time and production inspection time. Herein, the protect film is stacked for the purpose of protecting the surface of the polarizing plate, so it is arranged opposite to the side on which the polarizing plate is bonded to a liquid crystal plate. On the other hand, the separate film is used for the purpose of covering the adhesive layer for bonding to a liquid crystal plate and so it is arranged on the side where the polarizing plate is bonded to the liquid crystal plate.

As to the way to stacking the present cellulose acylate film on the polarizer, it is preferable to bond them together so that the transmission axis of the polarizer accords with the slow axis of the present cellulose acylate film. In evaluating the thus made polarizing plate under the condition of a crossed Nicol arrangement, it has been found that the polarization degree of the polarizing plate in a crossed Nicol arrangement was reduced and light leaks occur when the accuracy with which the slow axis of the present cellulose acylate film and the absorption axis (the axis orthogonal to the transmission axis) of the polarizer cross each other at right angles was 1° or above. Under such a condition, the combination of the polarizing plate and a liquid crystal cell cannot deliver a satisfactory black level and contrast. Therefore, the disparity between the stretching direction of the present cellulose acylate film and the transmission axis of the polarizing plate is preferably within 1°, far preferably within 0.5°

The polarizing plate is examined for total transmittance TT, parallel transmittance PT and cross transmittance CT by means of a spectrophotometer UV3100PC (made by Shimadzu Corporation). These total, parallel and cross transmittance values are measured 10 times within the wavelength region of 380 nm to 780 nm, and the average values thereof are calculated. The polarizing plate durability test is performed on two samples in different forms, (1) a polarizing plate alone and (2) a polarizing plate stacked on glass via an adhesive. In the measurement made on a polarizing plate alone, two samples are each prepared by combining an optical compensation film and two polarizers in the orthogonal state or the same state so that the film is sandwiched between the polarizers. In the case of a glass-stacked polarizing plate, two samples measuring about 5 cm×5 cm in size are prepared by laminating the polarizing plate on glass so that the optical compensation film is situated on the glass side. The total transmittance measurements are made on such samples in a state that they faces a light source on the film side. The mean of measured values of the two samples is taken as the total transmittance. The suitable ranges of polarization performance on the total transmittance TT, the parallel transmittance PT and the cross transmittance CT are as follows: $40.0 \leq TT \leq 45.0$, $30.0 \leq PT \leq 40.0$ and $CT \leq 2.0$, preferably $41.0 \leq TT \leq 44.5$, $34 \leq PT \leq 39.0$ and $CT \leq 1.3$ (wherein all the units are %). The smaller the amounts of changes in those values in durability tests, the better the polarizing plate performance.

In the durability test by 500-hour standing under conditions of 60° C. and 95% RH, it is preferable that polarizing plates according to the invention have at least either an amount of change in a cross transmittance $\Delta CT$ or an amount of change in a polarization degree $\Delta P$ satisfying the following expression (j) or (k), respectively:

$$-6.0 \leq \Delta CT \leq 6.0 \quad \quad (j)$$

$$-10.0 \leq \Delta P \leq 0.0 \quad \quad (k)$$

Herein, the amount of change is defined as a value obtained by subtracting a measured value before testing from a measured value after testing.

By satisfying those requirements, the stability of polarizing plate in use or upon storage can be retained.

(Moisture-Proof Bag)

The term "moisture-proof bag" as used in the invention is specified by the moisture permeation degree determined on the basis of a cup method (JIS-Z208). In general a cellulose acylate film vary in retardation value according to change in humidity. So minimization of the influence of humidity change on the film is required. For the purpose of avoiding the influence of ambient humidity outside a bag in which a polarizing plate made is packaged, it is preferable that the material used for bag making has a moisture permeation degree of 30 g/(m²·day) or below as measured under a 40° C.-90% RH condition. When the moisture permeation degree is increased beyond 30 g/(m²·day), it becomes impossible to avoid the influence of ambient humidity outside the bag. The more suitable range of moisture permeation degree of a bag used is 10 g/(m²·day) or below, and the most suitable is 5 g/(m²·day) or below.

The material of a moisture-proof bag has no other particular restrictions so far as it satisfies the foregoing requirement for moisture permeation degree, but they may be any of known materials (See *Hoso Zairyo Binran* (Handbook on Packaging Materials), Japan Packaging Institute (1995); *Hoso Zairyo no Kiso Tishiki* (Basic Knowledge of Packaging Materials), Japan Packaging Institute (November 2001); and Kinosei Hoso Nyumon (Introduction to Functional Packaging), 21 Seiki Hoso Kenkyu Kyokai (1st Ed., Feb. 28, 2002)). In the invention, it is preferable to use a material low in moisture permeation degree, light in weight and easy to handle, so a composite material, such as a film prepared by evaporating silica, alumina or a ceramic material onto a plastic film, or a plastic film stacked with an aluminum foil, can be used to particular advantage. The thickness of a packaging material is not particularly limited so far as the humidity inside the bag is not influenced by ambient humidity, but it is preferably from several μm to several hundred μm, far preferably from 10 μm to 500 μm. The present cellulose acylate film has high retardation values, so large amounts of changes are caused in retardation values of the film by a change in humidity. When there is a large difference between the humidity-controlled state of the polarizing plate and ambient temperature and humidity at stacking time, the retardation values after stacking vary greatly. Therefore, the smaller the difference is, the better the result obtained. It is preferable that the humidity inside a moisture-proof bag used in the invention satisfies either of the following requirements.

The humidity inside the bag in a polarizing plate-packed state is from 43% RH to 70% RH, preferably from 45% RH to 65% RH, far preferably from 45% RH to 63% RH, at 25° C.

A difference between the humidity inside the bag in a polarizing plate-packed state and ambient humidity at the time of stacking of the polarizing plate on a liquid crystal panel is within the range of 15% RH or below.

(Optically Anisotropic Layer)

The protective film that can be used in the present invention further includes a polymer film having an optically anisotropic layer. The optically anisotropic layer is preferably composed of a transparent polymer film, an alignment layer, and an optically anisotropic layer in that order.

The alignment layer can be provided by rubbing a layer formed of an organic compound (preferably a polymer), depositing an inorganic compound by oblique vacuum deposition, or forming a layer with microgrooves. An alignment layer that develops an aligning function on electric or magnetic field application or irradiation with light is also known. An alignment layer formed by rubbing a polymer layer is particularly preferred. The rubbing treatment is preferably carried out by rubbing the surface of a polymer layer with paper or cloth several times in a given direction. The rubbing direction is preferably substantially parallel to the absorption axis of the polarizer. Preferred polymers for preparing the alignment layer include polyimide, polyvinyl alcohol, and polymers described in JP-A-9-152509. The alignment layer preferably has a thickness of 0.01 to 5 mm, still preferably 0.05 to 2 mm.

The optically isotropic layer preferably contains a liquid crystal compound, particularly preferably a discotic liquid crystal compound. A discotic liquid crystal compound has a discotic core from which side chains extend radially as typically exemplified by triphenylene derivatives shown below.

Triphenylene derivatives:

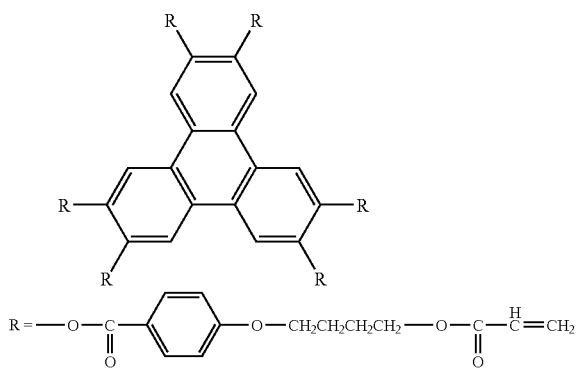

Substituents that react on heat or light application may be incorporated. Preferred examples of the discotic liquid crystal compounds are given in JP-A-8-50206.

The discotic liquid crystal molecules near the alignment layer are aligned substantially in parallel with the rubbing direction of the alignment layer with a pretilt angle. The discotic liquid crystal molecules on the atmosphere-facing side are aligned almost vertically. Thus, the discotic liquid crystal layer as a whole shows hybrid alignment, whereby to realize broadening of viewing angle in TN mode TFT-LCDs.

The optically anisotropic layer is usually obtained by applying a solution of the discotic compound and others (e.g., a polymerizable monomer and a photopolymerization initiator) in a solvent to the alignment layer, drying the coating film, heating the coating film to a temperature of discotic nematic phase formation, polymerizing the monomer by, for example, UV irradiation, followed by cooling. The discotic liquid crystal compound to be used in the invention preferably has a discotic nematic liquid crystal phase-solid phase transition temperature of 70° to 300° C., still preferably 70° to 170° C.

The compounds that are added to the optically anisotropic layer in addition to the discotic compound are not particularly limited as long as they are compatible with the discotic compound and do not hinder the alignment of the discotic compound and include, for example, a compound helping the discotic compound molecules change the tilt angle. Useful compounds preferably include polymerizable monomers (e.g., compounds having a vinyl group, a vinyloxy group, an acryloyl group or a methacryloyl group), fluorine-containing triazine compounds serving for alignment control on the air-facing side, and polymers such as cellulose acetate, cellulose acetate propionate, hydroxypropyl cellulose, and cellulose acetate butyrate. These compounds are usually added in an amount of 0.1% to 50% by weight, still preferably 0.1% to 30% by weight, based on the discotic compound.

The thickness of the optically anisotropic layer is preferably 0.1 to 10 mm, still preferably 0.5 to 5 mm.

The optically anisotropic layer may be a layer of non-liquid crystal polymer that is prepared by applying a solution of a non-liquid crystal compound in a solvent to a substrate followed by heat drying. Useful non-liquid crystal compounds include polymers such as polyamide, polyimide, polyester, polyether ketone, polyaryl ether ketone, polyamide-imide, and polyester-imide. These polymers can be used either individually or as a mixture of two or more thereof having different functional groups, such as a mixture of polyaryl ether ketone and polyamide. Preferred of these polymers is polyimide for high transparency, high alignment properties, and high stretchability. The substrate is preferably a triacetyl cellulose (TAC) film.

The layered product of the non-crystal liquid layer and the substrate may preferably be stretched 1.05 times in the transverse direction by means of a tenter. The resulting stretched layered product is applied to the polarizer with its substrate side facing the polarizer.

The optically anisotropic layer may also be a cholesteric liquid crystal layer as aligned and fixed which selectively reflects light in a wavelength region of 350 nm or shorter. The cholesteric liquid crystal compound is selected from those described in JP-A-3-67219, JP-A-3-140921, JP-A-5-61039, JP-A-6-186534, and JP-A-9-133810 which show the above-specified selective reflection. From the standpoint of stability of the alignment fixed layer, the cholesteric liquid crystal layer is preferably made of a cholesteric liquid crystal polymer, a nematic liquid crystal polymer containing a chiral agent, or a compound capable of polymerizing on light or heat application to form such a liquid crystal polymer.

The cholesteric liquid crystal layer as the optically anisotropic layer is formed by, for example, coating a cholesteric liquid crystal compound to a substrate. For the purpose of phase difference control, etc., a cholesteric liquid crystal compound may be applied in layers, or different cholesteric liquid crystal compounds may be applied in layers. Application is effected by an appropriate coating method, such as gravure coating, die coating, or dipping. The substrate is preferably a TAC film or any other polymer film.

In preparing the liquid crystal-containing optically anisotropic layer, any means for liquid crystal orientation can be taken. Among the means is a method in which the liquid crystal compound is applied on an alignment layer and thereby aligned. The alignment layer includes a rubbed layer of an organic compound (e.g., a polymer), an obliquely deposited layer of an inorganic compound, a layer with microgrooves, and a layer formed by accumulating Langmuir-Blodgett (LB) membranes of organic compounds (for example, w-tricosanoic acid, dioctadecylmethylammonium chloride, and methyl stearate). An alignment layer that develops an aligning function on irradiation with light is also included. Furthermore, an alignment technique in which liquid crystal molecules are applied to a stretched film and thereby aligned (see JP-A-3-9325) or a technique in which liquid crystal molecules are aligned in an applied electric field or magnetic field can be used. The liquid crystal alignment is preferably as uniform as possible, and the liquid crystal molecules in the layer are preferably fixed in the aligned state.

(Surface Treatment)

In some cases, the present cellulose acylate film can improve its adhesion to various functional layers (e.g., an undercoat layer and a backing layer) by undergoing surface treatment. As the surface treatment, glow discharge treatment, ultraviolet irradiation treatment, corona treatment, flame treatment, acid treatment or alkali treatment can be used. In the glow discharge treatment, not only low temperature plasma generating under low-pressure gas of $10^{-3}$ to 20 Torr but also plasma generating under atmospheric pressure may be utilized. The plasma excitation gas is a gas that is plasma-excited under the conditions as mentioned above, with examples including argon, helium, neon, krypton, xenon, nitrogen, carbon dioxide, flons, such as tetrafluoromethane, and mixtures of two or more thereof. Details of such treatment are described in *JIII Journal of Technical Disclosure* No. 2001-1745, pages 30 to 32, Japan Institute of Invention and Innovation (Mar. 15, 2001). Additionally, in the plasma treatment under atmospheric pressure, on which attention has focused in recent years, irradiation energy of 20 to 500 Kgy under 10 to 1,000 KeV, preferably irradiation energy of 20 to 300 Kgy under 30 to 500 KeV, is used. Of those surface treatments, alkali saponification treatment is preferred over the others and exceedingly effective as surface treatinent of the cellulose acylate film.

The alkali saponification treatment is preferably carried out using a method of immersing the cellulose acylate film directly in a saponifying solution tank or a method of coating the cellulose acylate film with a saponifying solution. Examples of a coating method usable herein include a dip coating method, a curtain coating method, an extrusion coating method, a bar coating method and an E-type coating method. As a solvent used in a coating solution for alkali saponification treatment, it is preferable to choose a solvent having a good ability to wet a transparent support since the saponification solution is applied to the transparent support and ensuring a good surface condition to the transparent support without roughening the transparent support surface. Specifically, alcohol solvents, notably isopropyl alcohol, are used to advantage. Alternatively, an aqueous solution of surfactant can also be used as a solvent. As the alkali used in a coating solution for alkali saponification, alkali soluble in the solvents cited above are suitable, and KOH and NaOH are more suitable. The pH of a coating solution for saponification is preferably 10 or higher, far preferably 12 or higher. The reaction time for alkali saponification is preferably from 1 second to 5 minutes, far preferably from 5 seconds to 5 minutes, particularly preferably from 20 seconds to 3 minutes, at room temperature. After the alkali saponification reaction, it is preferable that the saponifying solution-coated surface is rinsed with water or acid, and further washed with water.

(Antireflective Layer)

It is preferable that the transparent protective film disposed on one side of the polarizing plate, where a liquid crystal cell is not placed, is provided with functional films, such as an antireflective layer. In the invention, it is especially preferable that the transparent protective film is provided with an antireflective layer having at least a light-scattering layer and a low refractive-index layer which are stacked in this order or an antireflective layer having an intermediate refractive-index layer, a high refractive-index layer and a low refractive-index layer which are stacked in this order. Suitable examples of these antireflective layers are described below.

Suitable examples of an antireflective layer having a light-scattering layer and a low refractive-index layer, which are provided on the transparent protective film, are mentioned below.

In a light-scattering layer relating to the invention, matting particles are dispersed. The refractive index of a material forming the matting particles-free region of light-scattering layer is preferably 1.50 to 2.00, and the refractive index of a low refractive-index layer is preferably from 1.35 to 1.49. In the invention, the light-scattering layer combines anti-glaring properties with hard coat properties, and it may be a single layer or constituted of a plurality of layers, e.g., two to four layers.

From the viewpoint of achieving sufficient anti-glaring properties and a visually uniform matte feeling, it is preferable to design the antireflective layer so as to have the following surface asperity profile. More specifically, the center-line average roughness Ra is from 0.08 to 0.40 µm, the ten-point average roughness Rz is at most 10 times as great as Ra, the average mountain-valley distance Sm is from 1 to 100 µm, the standard deviation of the convexity heights from the deepest point of asperity is 0.5 µm or below, the standard deviation of average mountain-valley distance Sm based on the center line is 20 µm or below and the proportion of faces having a slope angle of 0 to 5 degrees is 10% or above.

In addition, the color hue of reflected light is favorably made neutral by adjusting the chromaticity of reflected light under a C light source to such ranges that a* value is from −2 to 2 and b* value is from −3 to 3, and beside, by adjusting the ratio between the minimum reflectivity and the maximum reflectivity in the wavelength range of 380 nm to 780 nm to a range of 0.5 to 0.99. Further, a yellow tinge in white-display sate when the antireflective layer is used in a liquid crystal display is favorably reduced by adjusting the b* value of a transmitted light under a C light source to the range of 0 to 3.

Moreover, when the standard deviation of brightness distribution is 20 or below when the brightness distribution is measured on the present antireflective film under a condition that 120 µm×40 µm mesh is inserted between a planar light source and the film, the application of the present film to a high-definition panel can favorably reduce glare.

With respect to the optical characteristics of the antireflective layer relating to the invention, when the specular reflectivity is adjusted to 2.5% or below, the transmittance to 99% or above and the 60-degree glossiness to 70% or below, reflection of extraneous light is favorably controlled and the viewability can be enhanced. It is particularly preferable that the specular reflectivity is adjusted to 1% or below, especially to 0.5% or below. Furthermore, it is favorable from the viewpoint of achieving glare prevention and reduction in blurred letters on a high-definition LCD panel that the haze is adjusted to a range of 20% to 50%, the inside haze/total haze ratio to a range of 0.3 to 1, the drop in the haze value by further forming a low refractive-index layer on a light-scattering layer provided on the antireflective layer to 15% or below, the transmission image definition in the comb width of 0.5 mm to a range of 20% to 50% and the transmittance ratio of light transmitted vertically to the antireflective layer surface to light transmitted in the direction slanting at an angle of 2 degrees from the vertical direction to a range of 1.5 to 5.0.

(Low Refractive-Index Layer)

The low refractive-index layer of the antireflective layer for use in the invention has a refractive index of 1.20 to 1.49, preferably 1.30 to 1.44. Further, it is advantageous from the viewpoint of reducing the reflectivity that the low refractive-index layer satisfies the following mathematical expression (XI).

$$(m/4) \times 0.7 < n1 d1 < (m/4) \times 1.3 \tag{XI}$$

In the above expression, m is a positive odd number, n1 is the refractive index of the low refractive-index layer and d1 is the thickness (nm) of the low refractive-index layer. In addition, $\lambda$ is a wavelength and it is a value ranging from 500 to 550 nm.

Materials forming the low refractive-index layer for use in the invention are described below.

The low refractive-index layer for use in the invention contains a fluorine-containing polymer as low refractive-index binder. Fluorine-containing polymers used suitably as the binder are those which have their kinetic friction coefficients in the range of 0.03 to 0.20, their contact angles to water in the range of 90° to 120° and their purified-water sliding angles in the range of 70° or below and can form cross-links when heat or ionizing radiation is applied. When the antireflective film according to the invention is inserted into an image display unit, it is favorable that the strength to peel a commercially available adhesive tape off the low refractive-index layer is adjusted to as small a value as possible, preferably 5 N or below, far preferably 3 N or below, particularly preferably 1 N or below. By doing so, a sticker and a memo affixed to the layer are easy to peel away. Furthermore, the higher the surface hardness measured with a microhardness meter, the less scratch-prone the low refractive-index layer. So the surface hardness is preferably 0.3 GPa or above, and far preferably 0.5 GPa or above.

Examples of a fluorine-containing polymer usable in the low refractive-index layer include hydrolysis products and dehydration condensation products of silane compounds containing perfluoroalkyl groups (e.g., heptadecafluoro-1,1,2,2-tetrahydrodecyl)triethoxysilane), and fluorine-containing copolymers having as constituents fluorine-containing monomer units and constitutional units for imparting cross-linking reactivity.

Examples of a fluorine-containing monomer include fluoroolefins (such as fluoroethylene, vinylidene fluoride, tetrafluoroethylene, perfluorooctylethylene, hexafluoropropylene and perfluoro-2,2-dimethyl-1,3-dioxol), partially or completely fluorinated alkyl ester derivatives of (meth) acrylic acid (such as Biscoat 6FM, trade name, a product of Osaka Organic Chemical Industry Ltd., and M-2020, trade name, a product of Daikin Industries, Ltd.) and completely or partially fluorinated vinyl ethers. Of these monomers, perfluoroolefins are preferred over the others, and hexafluoropropylene in particular can be used to advantage from the viewpoints of refractive index, solubility, transparency and availability.

Examples of a constitutional unit for imparting cross-linking reactivity include constitutional units obtained by polymerization of monomers having in advance self-cross-linking functional groups in their individual molecules, such as glycidyl (meth)acrylate and glycidyl vinyl ether, constitutional units obtained by polymerization of monomers having carboxyl, hydroxyl, amino or sulfo groups (e.g., (meth)acrylic acid, methylol (meth)acrylate, hydroxylalkyl (meth)acrylate, allkyl acrylate, hydroxyethyl vinyl ether, hydroxybutyl vinyl ether, maleic acid, crotonic acid), and constitutional units obtained by introducing groups capable of causing cross-linking reaction, such as (meth)acryloyl group, into the constitutional units as recited above by macromolecular reaction (wherein such groups can be introduced by use of, e.g., a technique of reacting acrylic acid chloride with hydroxyl group).

In addition to the foregoing fluorine-containing monomer units and the constitutional units for imparting cross-linking reactivity, it is also possible to copolymerize monomers having no fluorine atoms in view of transparency of the coating. The monomer units usable in combination with the foregoing constitutional units have no particular restrictions, but examples thereof can include olefins (such as ethylene, propylene, isoprene, vinyl chloride and vinylidene chloride), acrylic acid esters (such as methyl acrylate, ethyl acrylate and 2-ethylhexyl acrylate), methacrylic acid esters (such as methyl methacrylate, ethyl methacrylate, butyl methacrylate and ethylene glycol dimethacrylate), styrene derivatives (such as styrene, divinylbenzene, vinyltoluene and α-methylstyrene), vinyl ethers (such as methyl vinyl ether, ethyl vinyl ether and cyclohexyl vinyl ether), vinyl esters (such as vinyl acetate, vinyl propionate and vinyl succinate), acrylamides (such as N-tert-butylacrylamide and N-cyclohexylacrylamide), methacrylamides, and acrylonitrile derivatives.

In combination with the polymers recited above, curing agents may be used as appropriate, as disclosed in JP-A-10-25388 and JP-A-10-147739.

(Light-Scattering Layer)

A light-scattering layer is formed for the purposes of giving the film light diffusibility by surface scattering and/or internal scattering and hard coating properties for enhancement of scratch resistance. Accordingly, the light-scattering layer formed contains a binder for imparting hard coating properties, matting particles for imparting light diffusibility and, if needed, inorganic fillers for an increase in refractive index, prevention of shrinkage by cross-linking and enhancement of strength.

The thickness of the light-scattering layer is preferably from 1 to 10 µm, far preferably from 1.2 to 6 µm, from the viewpoints of imparting hard coating properties to the layer and preventing the layer from curling and becoming brittle.

The binder in the scattering layer is preferably a polymer having as its main chain a saturated hydrocarbon chain or a polyether chain, far preferably a polymer having as its main chain a saturated hydrocarbon chain. Further, it is advantageous that the binder polymer has a cross-linking structure. The binder polymer having a saturated hydrocarbon chain as its main chain is preferably a polymer prepared from an ethylenic unsaturated monomer. As a binder polymer having a saturated hydrocarbon chain as its main chain and a cross-linked structure, a (co)polymer prepared from a monomer having two or more ethylenic unsaturated groups is suitable. For making the binder polymer have a high refractive index, it is possible to choose a monomer having in its molecular structure an aromatic ring, a halogen atom other than a fluorine atom, and at least one atom selected from a sulfur atom, a phosphorus atom or a nitrogen atom, too.

Examples of a monomer having at least two ethylenic unsaturated groups include polyhydric alcohol esters of (meth)acrylic acid [such as ethylene glycol di(meth)acrylate, butanediol di(meth)acrylate, hexanediol di(meth)acrylate, 1,4-cyclohexane diacrylate, pentaerythritol tetra(meth)acrylate], pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3- cyclohexanetetramethacrylate, polyurethane polyacrylate and polyester polyacrylate], ethylene oxide modification products of the esters as recited above, vinylbenzene and derivatives thereof [such as 1,4-divinylbenzene, 2-acryloyl-ethyl 4-vinylbenzoate, and 1,4-divinylcyclohexanone], vinyl sulfones (such as divinyl sulfone), acrylamides (such as methylenebisacrylamide) and methacrylamides. These monomers may be used as combinations of two or more thereof.

Examples of a high reflective-index monomer include bis (4-methacryloylthiophenyl) sulfide, vinylnaphthalene, vinyl phenyl sulfide, and 4-methacryloxyphenyl-4'-methoxyphenylthioether. These monomers also may be used as combinations of two or more thereof.

These monomers having ethylenic unsaturated groups can be polymerized by irradiation with ionizing radiation or heating in the presence of a photo-radical initiator or a thermo-radical initiator.

Accordingly, the antireflective film can be formed by preparing a coating solution containing a monomer having an ethylenic unsaturated group as recited above, a photo-radical initiator or a thermo-radical initiatoer, matting particles and an inorganic filler, coating the solution on a transparent support, and then curing the solution through polymerization reaction caused by ionizing radiation or heat. As these photo-radical and thermo-radical initiators, known initiators can be used.

Polymers having polyether chains in their respective main chains are preferably polymers obtained by ring opening polymerization of multifunctional epoxy compounds. The ring opening polymerization of multifunctional epoxy compounds can be performed by irradiation with ionizing radiation or heating in the presence of a photo-acid generator or a thermo-acid generator. Accordingly, it is also possible to form the antireflective film by preparing a coating solution containing a multifunctional epoxy compound, a photo-acid generator or a thermo-acid generator, matting particles and an inorganic filler, coating the solution on a transparent support, and then curing the composition through polymerization reaction caused by ionizing radiation or heat.

A cross-linked structure may be introduced into a binder polymer by using a monomer having a cross-linkable functional group in place of or in addition to a monomer having two or more ethylenic unsaturated groups to introduce cross-linkable functional groups into the binder polymer, and further by allowing these cross-linkable functional groups to undergo reaction.

Examples of such a cross-linkable functional group include an isocyanlate group, an epoxy group, an aziridine group, an oxazoline group, an aldehyde group, a carbonyl group, a hydrazino group, a carboxyl group, a methylol group and an active methylene group. And vinylsulfonic acid, acid anhydrides, cyanoacrylate derivatives, melamine, etherified methylol, ester and urethane, and further metal alkoxides also, such as tetramethoxysilane, can be utilized as monomers for introduction of cross-linked structures. Further, functional groups showing cross-linkability as a result of decomposition reaction, such as blocked isocyanate groups, may be used. In other words, cross-linkable functional groups used in the invention needn't cause reaction immediately but may be those showing reactivity as a result of decomposition.

Binder polymers having those cross-linkable functional groups can form cross-linked structures by heating after they are coated.

For the purpose of imparting antiglare properties, matting particles, such as particles of an inorganic compound or particles of a resin, having an average particle diameter greater than that of filler particles, which ranges preferably from 1 to 10 μm, far preferably from 1.5 to 7.0 μm, are incorporated in the light-scattering layer.

Suitable examples of such matting particles include particles of an inorganic compound, such as silica particles and $TiO_2$ particles; and resin particles, such as acrylic resin particles, cross-linked acrylic resin particles, polystyrene particles, cross-linked polystyrene particles, melamine resin particles and benzoguanamine resin particles. Of these particles, cross-linked polystyrene particles, cross-linked acrylic resin particles, cross-linked acrylic styrene resin particles and silica particles are preferred over the others.

As to the shape of the matting particles, a spherical shape and an indefinite shape are both usable.

Two or more types of matting particles different in particle diameter may be used together. It is possible to impart an antiglare property by use of matting particles greater in particle diameter and other optical properties by use of matting particles smaller in particle diameter.

As to the particle diameter distribution of the matting particles, a monodisperse distribution is best. The closer their particle sizes are to one another, the more suitable the particles are for use. When the particles whose diameters are greater by 20% or more than the average particle diameter are defined as coarse particles, it is appropriate that the proportion of the coarse particles to the all particles used is 1% or below by number, preferably 0.1% or below by number, far preferably 0.01% or below by number. The matting particles having such a narrow particle diameter distribution can generally be obtained by size classification after synthesis reaction. The more desirable distribution can be achieved by increasing the number of times the classification is carried out, or by making the degree of classification stricter.

The matting particles are incorporated in a light-scattering layer so that the amount of matting particles in the light-scattering layer formed is preferably from 10 to 1,000 mg/m$^2$, far preferably from 100 to 700 mg/m$^2$.

The size distribution of matting particles is measured according to the Coulter Counter method, and the distribution measured is converted to the number distribution of particles.

In addition to the matting particles, it is favorable for further heightening the refractive index of the light-scatting layer to incorporate in the layer an inorganic filler including at least one metal oxide chosen from oxides of titanium, zirconium, aluminum, indium, zinc, tin and antimony and having an average particle diameter of 0.2 μm or below, preferably 0.1 μm or below, far preferably 0.06 μm or below.

Contrary to the above, it is preferable in the light-scattering layer using matting particles of high refractive index that silicon oxide is used for the purpose of widening a difference in refractive index from the matting particles and keeping the refractive index of the layer rather low. The suitable particle size range of silicon oxide is the same as that of the foregoing inorganic filler.

Examples of the inorganic filler usable in the light-scattering layer include $TiO_2$, $ZrO_2$, $Al_2O_3$, $In_2O_3$, $ZnO$, $SnO_2$, $Sb_2O_3$, ITO and $SiO_2$. Of these fillers, $TiO_2$ and $ZrO_2$ are preferred over the others from the viewpoint of heightening the refractive index. It is also preferable that the surfaces of these inorganic fillers are treated with a silane coupling agent or a titanate coupling agent, and it is advantageous to use a surface treatment agent giving a functional group capable of reacting with the binder to the filler surface.

The usage of such inorganic fillers is preferably from 10 to 90%, far preferably from 20 to 80%, particularly preferably from 30 to 75%, of the total mass of the light-scattering layer.

Since the particle sizes of those inorganic fillers are sufficiently smaller than the wavelengths of light, no scattering is caused, so the dispersion of those inorganic fillers in the binder polymer can behave like an optically uniform material.

The bulk refractive index of a mixture of the binder and the inorganic filler in the light-scattering layer is preferably from 1.48 to 2.00, far preferably from 1.50 to 1.80. For adjusting the refractive index to such a range, it is adequate that the kinds of the optically transparent resin and the inorganic filler and the mixing proportions thereof are chosen properly. How to make a proper choice can be experimentally found in advance.

In order to secure uniformity in surface condition for the light-scattering layer, especially by eliminating unevenness of coating, unevenness of drying and point defects, either of fluorine- and silicon-containing surfactants or a mixture of these surfactants is incorporated into a coating solution for forming an anti-glaring layer. A fluorine-containing surfactant in particular is used to advantage because even addition in a smaller amount can produce effects of lessening troubles on the surface of an antireflective film according to the invention, such as unevenness of coating, unevenness of drying and point defects. These surfactants are added with the intention of increasing productivity by imparting high-speed coating suitability to the coating solution while enhancing uniformity in surface condition.

Next an antireflective layer formed by laminating an intermediate refractive-index layer, a high refractive-index layer and a low refractive-index layer on a transparent protective film in order of mention is described.

The antireflective layer has a layer structure including, in the order presented, at least an intermediate refractive-index layer, a high refractive-index layer and a low refractive-index layer (outermost layer) in a state of the layered product on a base, and is designed to satisfy the following refractive index relationship among constituent layers.

More specifically, the refractive index relationship is:

Refractive index of high refractive-index layer>refractive index of intermediate refractive-index layer>refractive index of transparent support>refractive index of low refractive-index layer.

In addition, a hard coating layer may be placed between the transparent support and the intermediate refractive-index layer. Alternatively, the antireflective layer may include an intermediate refractive-index hard coating layer, a high refractive-index layer and a low refractive-index layer (as disclosed, e.g., in JP-A-8-122504, JP-A-8-110401, JP-A-10-300902, JP-A-2002-243906 and JP-A-2000-111706). Further, another function may be imparted to each constituent layer. For instance, soil resistance may be imparted to a low refractive-index layer, or an antistatic function may be imparted to a high refractive-index layer (as disclosed, e.g., in JP-A-10-206603 and JP-A-2002-243906).

The haze of the antireflective film is preferably 5% or below, far preferably 3% or below. In addition, the suitable strength of the film is H or higher, preferably 2H or higher, particularly preferably 3H or higher, when evaluated by the pencil hardness test according to JIS K5400.

(High Refractive-Index Layer and Intermediate Refractive-Index Layer)

The layer having a high refractive index, which is a constituent layer of the antireflective film, is formed of a curable film containing at least a matrix binder and superfine particles of inorganic compound having an average particle size of 100 nm or below and a high refractive index.

In particulate inorganic compounds having high refractive indices, inorganic compounds having refractive indices of 1.65 or higher, preferably 1.9 or higher, are included. Examples of such compounds include oxides of Ti, Zn, Sb, Sn, Zr, Ce, Ta, La and In, and compound oxides which each contain two or more of the metal atoms recited above.

Such superfine particles can be obtained by treating particle surfaces with a surface treatment agent (such as the silane coupling agents disclosed in JP-A-11-295503, JP-A-11-153703 and JP-A-2000-9908, the anionic compounds or the organometallic coupling agents as disclosed in JP-A-2001-310432), giving particles a core/shell structure whose core is a particle having a high refractive index (as disclosed in JP-A-2001-166104 and JP-A-2001-31043), or using a specific dispersing agent (as disclosed in JP-A-11-153703, U.S. Pat. No. 6,210,858 and JP-A-2002-2776069).

Examples of a material forming the matrix include films of thermoplastic resins and thermosetting resins hitherto known.

Further, at least one composition selected from compositions containing multifunctional compounds which individually contain at least two radical polymerizable and/or cation polymerizable groups or compositions containing organometallic compounds having hydrolyzable groups and partial condensates thereof is suitable as the matrix-forming material. Examples of such a composition include the compositions disclosed in JP-A-2000-47004, JP-A-2001-315242, JP-A-2001-31871 and JP-A-2001-296401.

In addition, curable films formed from colloidal metal oxides obtained from metal alkoxide hydrolysis condensates and metal alkoxide compositions are also used to advantage. Descriptions thereof can be found, e.g., in JP-A-2001-293818.

The high refractive-index layer generally has its refractive index in a range of 1.70 to 2.20. The thickness of the high refractive-index layer is preferably from 5 nm to 10 μm, far preferably from 10 nm to 1 μm.

The refractive index of the intermediate refractive-index layer is adjusted so as to lie somewhere between the refractive index of the low refractive-index layer and that of the high refractive-index layer. The suitable refractive index of the intermediate refractive-index layer is from 1.50 to 1.70. The suitable thickness of the intermediate refractive-index layer is from 5 nm to 10 μm, preferably from 10 nm to 1 μm.

(Low Refractive-Index Layer)

The low refractive-index layer is stacked on the high refractive-index layer. The refractive index of the low refractive-index layer is generally from 1.2 to 1.55, preferably from 1.30 to 1.50.

It is appropriate that the low refractive-index layer be structured as the outermost layer having scratch resistance and soil resistance. For substantial enhancement of scratch resistance, it is effective to impart slippability to the layer surface, and thin-film layer techniques hitherto known, which include introduction of silicone or fluorine, can be adopted.

For the foregoing purpose, it is appropriate that the fluorine-containing compound used have its refractive index in a range of 1.35 to 1.50, preferably 1.36 to 1.47. Further, the fluorine-containing compound used is preferably a compound having a cross-linkable or polymerizable functional group containing fluorine atoms in a proportion of 35 to 80% by mass.

Examples of such a fluorine-containing compound include the compounds disclosed in JP-A-9-222503, paragraph numbers [0018] to [0026]; JP-A-11-38202, paragraph numbers [0019] to [0030]; JP-A-2001-40284, paragraph numbers [0027] to [0028]; and JP-A-2000-284102.

The silicone compound usable for the foregoing purpose is a compound having a siloxane structure, the macromolecular chain of which preferably has curable functional groups or polymerizable functional groups to form a cross-linked structure in a film formed. Examples of such a compound include reactive silicones (e.g., Silaplaine, produced by Chisso Corporation) and polysiloxanes containing silanol groups at their respective both ends (as disclosed in JP-A-11-25840).

The cross-linking or polymerizing reaction of cross-linkable or polymerizing group-containing fluoropolymer and/or siloxane polymer is favorably carried out by light exposure or heating simultaneously with or subsequently to the coating operation of a coating solution for forming the outermost layer containing a polymerization initiator and a sensitizer.

Alternatively, it is also preferable to form a cured film by sol-gel conversion, wherein curing is performed by causing condensation reaction between an organometallic compound, such as a silane coupling agent, and a specific silane coupling agent containing a fluorohydrocarbon group in the presence of a catalyst.

Examples of such a specific silane coupling agent include polyfluoroalkyl-containing silane compounds or partial hydrolysis condensates thereof (such as the compounds disclosed in JP-A-58-142958, JP-A-58-147483, JP-A-58-147484, JP-A-9-157582 and JP-A-11-106704) and silyl compounds containing poly(perfluoroalkyl ether) groups as fluorine-containing long-chain groups (such as the compounds disclosed in JP-A-2000-117902, JP-A-2001-48590 and JP-A-2002-53804).

As additives other than the above, the low regractive-index layer can contain a filler (e.g., silicon dioxide (silica), an inorganic compound having a low refractive index and an average primary-grain size of 1 to 150 nm, such as fluorine-containing grains (magnesium fluoride, calcium fluoride or barium fluoride grains), the organic fine particles disclosed in JP-A-11-3820, paragraph numbers [0020] to [0038]), a silane coupling agent, a slipping agent and a surfactant.

When the low refractive-index layer is situated underneath the outermost layer, it may be formed by use of a vapor-phase method (such as a sputtering method, an ion plating method or a plasma CVD method). In point of low-priced production, coating methods are preferable.

The thickness of the low refractive-index layer is preferably from 30 to 200 nm, far preferably from 50 to 150 nm, especially preferably from 60 to 120 nm.

Furthermore, a hard coating layer, a forward scattering layer, a primer layer, an antistatic layer, an undercoat layer and a protective layer may be provided.

The hard coating layer is provided on the surface of the transparent support in order to impart physical strength to a transparent protective film included in the antireflective layer. And it is especially preferable that the hard coating layer is provided between the transparent support and the high refractive-index layer. The hard coating layer is preferably formed by cross-linking reaction or polymerizing reaction of a light- and/or heat-curable compound. The suitable functional groups having curability are photopolymerizable functional groups, and the suitable organometallic compounds containing hydrolyzable functional groups are organic alkoxysilyl compounds.

Examples of such compounds include the same ones as recited in the descriptions of the high refractive-index layer. Examples of a composition constituting the hard coating layer include those disclosed in JP-A-2002-144913, JP-A-2000-9908 and WO 00/46617 brochure.

The high refractive-index layer can serve as a hard coating layer. In this case, it is preferable that the hard coating layer is formed so as to contain particulates in a finely dispersed state by use of the technique covered in the description of the high refractive-index layer.

The hard coating layer can serve as an anti-glare layer also when an anti-glare function is imparted thereto by addition of particles having an average size of 0.2 to 10 µm.

The hard coating layer can be designed to have a proper thickness according to the intended purpose. The suitable thickness of the hard coating layer is from 0.2 to 10 µm, preferably from 0.5 to 7 µm.

The suitable strength of the hard coating layer is H or higher, preferably 2H or higher, particularly preferably 3H or higher, when evaluated by the pencil hardness test according to JIS K5400. In addition, the hard coating layer is more useful the smaller is the amount of abrasion that a sample piece thereof suffers by Taber test according to JIS K5400.

(Antistatic Layer)

In the case of providing an antistatic layer, it is preferable that the antistatic layer can impart a conductivity expressed in a volume resistivity of $10^{-8}$ ($\Omega cm^{-3}$) or below. It is possible to impart the volume resistivity of $10^{-8}$ ($\Omega cm^{-3}$) by use of a hygroscopic substance, a water-soluble inorganic salt, some type of surfactant, a cationic polymer, an anionic polymer or colloidal silica, but the conductivity imparted by such a compound varies greatly depending on ambient temperature and humidity. In low-humidity surroundings, there occurs a problem that sufficient conductivity cannot be secured. Accordingly, metal oxides are suitable as materials for a conductive layer. However, colored metal oxides are unsuitable, because the film to which they are added is colored throughout. Examples of a metal producing colorless metal oxide include Zn, Ti, Al, In, Si, Mg, Ba, Mo, W and V, and it is preferable to use metal oxides containing these metals as their respective main components. Suitable examples of a colorless metal oxide include $ZnO$, $TiO_2$, $SnO_2$, $Al_2O_3$, $In_2O_3$, $SiO_2$, $MgO$, $BaO$, $MoO_3$, $V_2O_5$, and compound oxides thereof. Of these oxides, $ZnO$, $TiO_2$ and $SnO_2$ are used to particular advantage. In the case of adding atoms of different kinds to these oxides, addition of Al and In to $ZnO$, addition of Sb, Nb and halogen elements to $SnO_2$ and addition of Nb and Ta to $TiO_2$ are effective. Further, as disclosed in JP-B-59-6235, materials prepared by depositing the metal oxides recited above on crystalline metal grains or fibrous materials (e.g., titanium oxide) may be used. Although volume resistance and surface resistance are different physical property values and a simple comparison cannot be drawn between them, it is adequate for securing the conductivity expressed in a volume resistance of $10^{-8}$ ($\Omega cm^{-3}$) or below that the conductive layer has a surface resistance of about $10^{-10}$ ($\Omega/\square$) or below, preferably $10^{-8}$ ($\Omega/\square$). The surface resistance of the conductive layer is required to be determined as the value in the case of arranging the antistatic layer as the outermost layer, and can be measured at a stage during the process of film formation according to the invention.

(Liquid Crystal Display)

The present cellulose acylate film, the optical compensation sheet formed of the present film and the polarizing plate using the present film can be used in various display-mode liquid crystal cells and liquid crystal displays. Various display modes, including TN (Twisted Nematic), IPS (In-Plane Switching), FLC (Ferroelectric Liquid crystal), AFLC (Antiferroelectric Liquid crystal), OCB (Optically Compensatory Bend), STN (Super Twisted Nematic), VA (Vertically Aligned) and HAN (Hybrid Aligned Nematic) modes, have been proposed. Of these modes, the OCB mode or the VA mode is preferred over the others, and the VA mode can be used to greatest advantage.

An OCB-mode liquid crystal cell is a liquid crystal display using a liquid crystal cell of bend alignment mode in which rod-shaped liquid crystalline molecules in the upper part of the liquid crystal cell and those in the lower part are forced to align in substantially opposite directions (symmetrically). Cells of such an OBC mode are disclosed in U.S. Pat. Nos. 4,583,825 and 5,410,422. Since the rod-shape liquid crystal molecules are symmetrically aligned in the upper part and the lower part of the liquid crystal cell, the bend orientation mode of liquid crystal cell has an optically self-compensation function. Therefore, this liquid crystal mode is referred to as an OCB (Optically Compensatory Bend) liquid crystal mode. The liquid crystal display of the bend orientation mode has an advantage of high response speed.

In a VA-mode liquid crystal cell, rod-shaped liquid crystalline molecules are aligned vertically in a substantial sense when no voltage is applied.

Examples of a VA-mode liquid crystal cell include (1) a strictly VA-mode liquid crystal cell in which rod-shaped liquid crystalline molecules are aligned in a substantially vertical direction when no voltage is applied thereto, but they are forced to align in a substantially horizontal direction by application of a voltage thereto (as disclosed in JP-A-2-176625), (2) a multidomain VA-mode (MVA-mode) liquid crystal cell (as described in *SID* 97, Digest of Tech. Papers (preprints) 28, p. 845 (1997)), (3) an n-ADM-mode liquid crystal cell in which rod-shaped liquid crystalline molecules are aligned in a substantially vertical direction when no voltage is applied thereto, but they are brought into a twisted multidomain alignment by application of a voltage thereto (as described in preprints of Nippon Ekisho Toronkai (Symposium on Liquid crystal), pp. 58-59 (1998)), and (4) a SURVIVAL-mode liquid crystal cell (announced at LCD International 98).

A VA-mode liquid crystal display has a liquid crystal cell and two polarizing plates disposed on both sides of the cell. The liquid crystal cell holds a liquid crystal between two electrode substrates. In an embodiment of the present liquid crystal display, only one optical compensation sheet may be placed between a liquid crystal cell and one polarizing plate, or two optical compensation sheets may be placed between the liquid crystal cell and one polarizing plate and between the liquid crystal and the other polarizing plate, respectively. The optical compensation sheet may be the present cellulose acylate film.

In another embodiment of the present liquid crystal display, an optical compensation sheet formed of the present cellulose acylate film is used as a transparent protective film of a polarizing plate, which is placed between a liquid crystal cell and a polarizer. The optical compensation sheet may be used only for a transparent protective film (arranged between a liquid crystal cell and a polarizer) of one polarizing plate, or it may be used for two transparent protective films (arranged between a liquid crystal cell and each polarizer) of both of polarizing plates. When the optical compensation sheet is used only for one polarizing plate, it is especially preferable to use the sheet as a liquid crystal-side protective film of the polarizing plate placed on the backlight side of the liquid crystal cell. A reason for doing so is as follows: When the optical compensation sheet and a functional film (such as an anti-glaring sheet) are bonded together and errors occur during processing of a polarizing plate, the high-priced optical compensation sheet and the functional film are targeted for junk at a time, so it is appropriate that bonding of the present cellulose acylate film to a liquid crystal cell be carried out on the VA cell side. The protective film may be a cellulose acylate film currently in use, but it is preferable that the film is thinner than the present cellulose acylate film. For instance, the thickness of such a film is preferably from 40 to 80 μm, and examples of such a film include commercially available ones, such as KC4UX2M (40 μm, produced by Konica Opto Co., Ltd.), KC5UX (60 μm, produced by Konica Opto C., Ltd.) and TD80 (80 μm, produced by Fuji Photo Film Co., Ltd.), but they are not limited to these products.

The invention will now be illustrated in more detail by reference to the following examples, but these examples should not be construed as limiting the scope of the invention in any way.

<Methods for Measurements>

Various characteristics of cellulose acylate films are determined in accordance with the following methods.

(Retardation Values Re and Rth)

These values are calculated by the method explained hereinbefore in this specification.

(Moisture Content Rate)

The moisture content in a sample measuring 7 mm×35 mm was determined using a Karl Fischer trace moisture measuring device LE-20S (made by Hiranuma Sangyo Co., Ltd.). And the moisture content rate was calculated by dividing the moisture content (g) by the mass of the sample (g).

(Stretching Temperature)

In the stretching process, the surface temperature of film is measured with a radiation thermometer (for thin film use).

(Thermal Shrinkage Rate)

Samples measuring 30 mm×120 mm were allowed to sand for 2 hours under conditions of 25° C. and 60% RH, and holes of 6 mm φ were punched at intervals of 100 mm along the both edges of each sample by use of an automatic pin gauge (made by Shinto Scientific Co., Ltd.). The actual size (L1) of each interval was read down to the least division of the scale, 1/1000 mm. Each sample was further allowed to stand for 24 hours under a 60° C.-90% RH condition or a 90° C.-3% RH condition, and allowed to stand again for 2 hours under conditions of 25° C. and 60% RH, and then the dimension (L2) of each punched interval was measured. And thermal shrinkage rate was determined by the expression $\{(L1-L2)/L1\}\times 100$.

(Glass Transition Temperature Tg)

A film sample (undergoing no stretching treatment) measuring 5 mm×30 mm underwent moisture control for at least 2 hours in the 25° C.-60% RH atmosphere, and then examined for Tg using a dynamic viscoelasticity measuring equipment (Vibron DVA-225, made by I.T. Keisoku Seigyo K.K.) at settings that the intergrip distance was 20 mm, the speed of rising in temperature was 2° C./min, the temperature range of measurement was from 30° C. to 200° C. and the frequency was 1 Hz. When the storage elasticity modulus was plotted as ordinate with a logarithmic scale and the temperature (° C.) as abscissa with a linear scale, sharp reductions in storage elasticity modulus were found at the occasion of transfer from the solid region to the glass transition region. A straight line 1 was drawn along the sharp reduction in the solid region and a straight line 2 along the sharp reduction in the glass transition region. The intercept of the straight line 1 and the straight line 2 was taken as a glass transition temperature Tg (dynamic viscoelasticity) because it corresponded to a temperature at which the film sample began softening by sudden decrease in the storage elasticity modulus under rise in temperature and the transfer to the glass transition region started.

(Elasticity Modulus)

A film sample measuring 10 mm×200 mm was subjected to moisture control for 2 hours under conditions of 25° C. and 60% RH, and then stretched using a tensile tester (Strograph R-2, made by Toyo Seiki Seisaku-sho, Ltd.) at settings that the initial sample length was 100 mm and the stretching speed was 10 mm/sec. And the elasticity thereof was calculated from the initial tensile stress and the elongation.

(Change in Mass)

A piece measuring 100 mm×100 mm was cut out of a sample film, allowed to stand for 48 hours in the thermal atmosphere regulated at 80° C. under 90% RH, and then examined for change in mass. Before and after the thermostating at 80° C., the sample piece underwent 2-hour humidity control to 60% RH at 25° C.

(Photoelasticity Coefficient)

Tensile stress was applied to the major axis of a film sample measuring 10 mm×100 mm, and the Re value under this tensile stress was measured with an ellipsometer (M150, made by JASCO Corporation). The photoelasticity coefficient was calculated from the amount of retardation change with the stress.

(Haze)

Haze measurement of a sample having a size of 40 mm×80 mm was made with a haze meter(HGM-2DP, made by Suga Test Instruments Co., Ltd.) at 25° C. and 60% RH in accordance with JIS K6714.

EXAMPLE 1

<<Formation of Cellulose Acylate Film>>

(1) Cellulose Acylate

Cellulose acylates having different degrees of acyl substitution as presented in Table 1 were prepared. More specifically, acylation reaction was carried out at 40° C. by addition of sulfuric acid as a catalyst (in an amount of 7.8 parts by mass per 100 parts by mass of cellulose) besides carboxylic acids. Thereafter, the total degree of substitution and the degree of 6-position substitution were adjusted by controlling the content of sulfuric acid catalyst, the water content and the ripening time. The ripening was performed at 40° C. Further, low molecular components of the cellulose acylates thus prepared were removed by washing with acetone.

(2) Dope Preparation

<1-1> Cellulose Acylate Solution

The following ingredients were charged into a mixing tank, made into a solution by stirring, and further heated at 90° C. for about 10 minutes. The resulting solution was filtered through a filter paper with an average pore size of 34 μm and a sintered metal filter with an average pore size of 10 μm.

| Cellulose Acylate Solution | |
| --- | --- |
| Cellulose acylate chosen from those listed in Table 1 | 100.0 parts by mass (weight) |
| Triphenyl phosphate | 8.0 parts by mass |
| Biphenyldiphenyl phosphate | 4.0 parts by mass |
| Methylene chloride | 403.0 parts by mass |
| Methanol | 60.2 parts by mass |

<1-2> Matting Agent Dispersion

The following ingredients including each of the cellulose acylate solutions prepared in the foregoing manner were charged into a dispersing machine, thereby preparing a dispersion of matting agent.

| Matting Agent Dispersion | |
| --- | --- |
| Silica grains having an average size of 16 nm (Aerosil R972, produced by Nippon Aerosil Co., Ltd.) | 2.0 parts by mass |
| Methylene chloride | 72.4 parts by mass |
| Methanol | 10.8 parts by mass |
| Cellulose acylate solution | 10.3 parts by mass |

<1-3> Retardation Developer Solution A

The following ingredients including each of the cellulose acylate solutions prepared in the foregoing manner were charged into a mixing tank, and made into a solution by stirring under heating. Thus, a retardation developer Solution A was prepared.

| Retardation Developer Solution A | |
| --- | --- |
| Retardation Developer A | 20.0 parts by mass |
| Methylene chloride | 58.3 parts by mass |
| Methanol | 8.7 parts by mass |
| Cellulose acylate solution | 12.8 parts by mass |

A dope for film formation was prepared by mixing 100 parts by mass of each of the cellulose acylate solutions with 1.35 parts by mass of the matting agent dispersion, and further with the retardation developer solution A in a proportion as presented in Table 2. The dopes thus prepared were used for forming films F1 to F5 and films F8 to F14.

Retardation Developer A

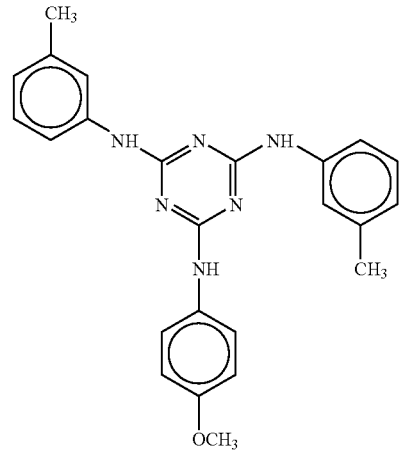

<1-4> Retardation Developer Solution B

The following ingredients including one of the cellulose acylate solutions prepared in the foregoing manner were charged into a mixing tank, and made into a solution by stirring under heating. Thus, a retardation developer Solution B was prepared.

| Retardation Developer Solution B | |
| --- | --- |
| Retardation developer A | 8.0 parts by mass |
| Retardation developer B | 12.0 parts by mass |
| Methylene chloride | 58.3 parts by mass |
| Methanol | 8.7 parts by mass |
| Cellulose acylate solution | 12.8 parts by mass |

A dope for film formation was prepared by mixing 100 parts by mass of one of the cellulose acylate solutions with 1.35 parts by mass of the matting agent dispersion, and further with the retardation developer solution B in a proportion presented in Table 2. The dope thus prepared was used for forming films F6 and F7.

In Table 2, the proportion of the retardation developer added is expressed in parts by mass per 100 parts by mass of cellulose acetate.

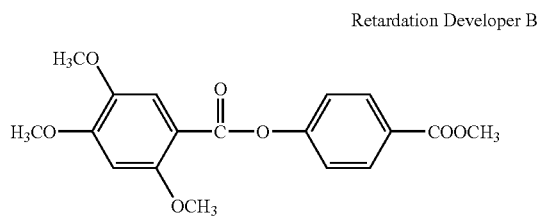

Retardation Developer B (Flow Casting)

Each of the dopes was flow-cast into film by use of a band-type casting machine. As to the films F1 to F5, F7 to F9 and F11 to F14, each film was stripped away from the band, and stretching thereof with a tenter in the direction of the width was initiated when the content of residual solvents was in the range of 0 to 20% by mass. Each of the thus made films had a high elasticity modulus of 4,800 MPa or above. As to the films F6 and F10, on the other hand, the volatile fraction at the start time of stretching was more than 20% by mass, so the elastic modulus attained was lower than 4,800 MPa.

In the tenter, each film was stretched in the direction of the width as it was dried by exposure to hot air, and then made to shrink by about 5%. Thereafter, the tenter conveyance was changed to roll conveyance, and each film was further dried, subjected to knurling, and reeled at the time when the width reached to 1,500 mm. The stretch factor was calculated from the film width measured at the entrance of the tenter and the film width measured at the exit of the tenter, and presented in Table 2. On the thus formed cellulose acylate films (optical compensation films) each, values of Re retardation and Rth retardation at a wavelength of 590 nm under a 25° C.-60% RH condition were measured with KOBRA 21ADH (made by Oji Scientific Instruments).

TABLE 1

| Raw Cotton No. | Acetyl Sub-stitution Degree | Propionyl Sub-stitution Degree | Butyryl Sub-stitution Deree | 6-Position Sub-stitution Degree | Ratio of 6-position Substitution Degree to Total substitution Degree |
| --- | --- | --- | --- | --- | --- |
| CA1 | 1.920 | 0.000 | 0.000 | 0.601 | 0.313 |
| CA2 | 1.429 | 0.701 | 0.234 | 0.947 | 0.396 |
| CA3 | 2.785 | 0.000 | 0.000 | 0.910 | 0.327 |
| CA4 | 2.753 | 0.000 | 0.000 | 0.903 | 0.328 |
| CA5 | 2.745 | 0.000 | 0.000 | 0.882 | 0.321 |
| CA6 | 1.952 | 0.808 | 0.000 | 0.897 | 0.325 |
| CA7 | 0.998 | 0.625 | 0.000 | 0.887 | 0.547 |
| CA8 | 1.794 | 0.000 | 0.700 | 0.902 | 0.360 |

TABLE 2

| Film No. | Raw Cotton No. | Retardation developer solution used | Amount of retardation developer added (wt %) | Stretch Temp. (° C.) | Stretch factor (%) | Volatile fraction (wt %) at start of stretch operation | Elasticity modulus (MPa) | Average thickness (μm) | Re (nm) | Rth (nm) | note |
| --- | --- | --- | --- | --- | --- | --- | --- | --- | --- | --- | --- |
| F1 | CA6 | — | 0.0 | 155 | 60 | 1 | 5200 | 90 | 40 | 150 | invention |
| F2 | CA7 | A | 2.0 | 165 | 50 | 2 | 5100 | 82 | 50 | 219 | invention |
| F3 | CA3 | A | 8.0 | 145 | 40 | 19 | 4980 | 40 | 55 | 190 | invention |
| F4 | CA3 | A | 5.0 | 145 | 32 | 20 | 4820 | 75 | 62 | 225 | invention |
| F5 | CA1 | A | 3.0 | 170 | 50 | 17 | 5100 | 80 | 56 | 198 | invention |
| F6 | CA3 | B | 2.0 | 140 | 26 | 40 | 4000 | 112 | 35 | 170 | comparison |
| F7 | CA3 | B | 2.0 | 165 | 45 | 14 | 5200 | 146 | 45 | 210 | invention |
| F8 | CA3 | A | 3.5 | 170 | 55 | 5 | 6200 | 72 | 64 | 193 | invention |
| F9 | CA8 | A | 4.0 | 162 | 50 | 0 | 4900 | 75 | 60 | 202 | invention |
| F10 | CA3 | A | 6.5 | 85 | 8 | 52 | 3500 | 67 | 19 | 118 | comparison |
| F11 | CA4 | A | 5.0 | 140 | 35 | 16 | 5150 | 92 | 78 | 267 | invention |
| F12 | CA5 | A | 6.9 | 160 | 55 | 9 | 5300 | 72 | 89 | 262 | invention |
| F13 | CA2 | A | 3.0 | 170 | 55 | 5 | 6150 | 71 | 87 | 277 | invention |
| F14 | CA6 | A | 6.0 | 165 | 45 | 0 | 5300 | 94 | 75 | 260 | invention |

The thus made films had their glass transition temperatures (Tg) in the range of 138° C. to 147° C. Their moisture content rates after moisture control to 80% RH at 25° C. were in the range of 2.9% to 3.4%. In addition, their moisture permeabilities under conditions of 60° C., 95% RH and 24 hours were in the range of 800 to 2,000 g/m²/day. All these films had their haze values in the range of 0.1 to 0.9, and the average diameter of secondary particles of the matting agent used was 1.0 μm or below. The tensile elasticity moduli measured in the direction MD or TD are presented in Table 2. As to the comparative samples, those were all below 4,800 MPa. The changes in mass by 48-hour standing under conditions of 80° C. and 90% RH were from 0% to 3%. In addition, the dimensional changes by 24-hour standing under conditions of 60° C. and 90% RH and those by 24-hour standing under 90° C. and 3% RH were all in the range of −1.2% to 0.2%. Further, every sample film had a photoelasticity coefficient of $50 \times 10^{-13}$ cm$^2$/dyne ($5 \times 10^{-11}$ m$^2$/N) or below.

EXAMPLE 2

<2-1-1>

(Polarizing Plate Making 1)

Iodine was adsorbed to a stretched polyvinyl alcohol film to make a polarizer.

Each of the cellulose acylate films (F1 to F14, corresponding to TAC1 in FIGS. 1 to 3) formed in Example 1 was stacked on one side of the polarizer with the aid of an adhesive of polyvinyl alcohol type. Saponification treatment for these films was performed under the following condition.

A 1.5N water solution of sodium hydroxide was prepared, and kept at 55° C. A 0.01N aqueous dilute sulfuric acid was prepared, and kept at 35° C. The cellulose acylate films formed were immersed for 2 minutes in the water solution of sodium hydroxide, and then immersed in water to thoroughly wash the sodium hydroxide away from the films. Then, the films were immersed for 1 minute in the dilute aqueous sulfuric acid, and then immersed in water to thoroughly wash the sulfuric acid away from the films. Finally, these film samples were fully dried at 120° C.

Figure 2:
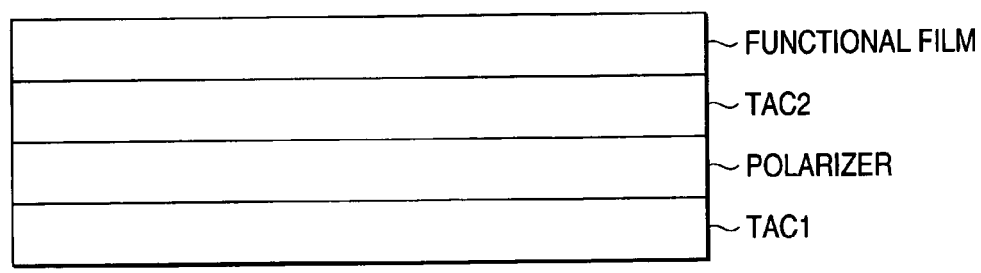
FIG. 2 is a schematic cross-sectional diagram showing an example of a profile structure of a polarizing plate according to an exemplary embodiment of the invention.
Figure 3:
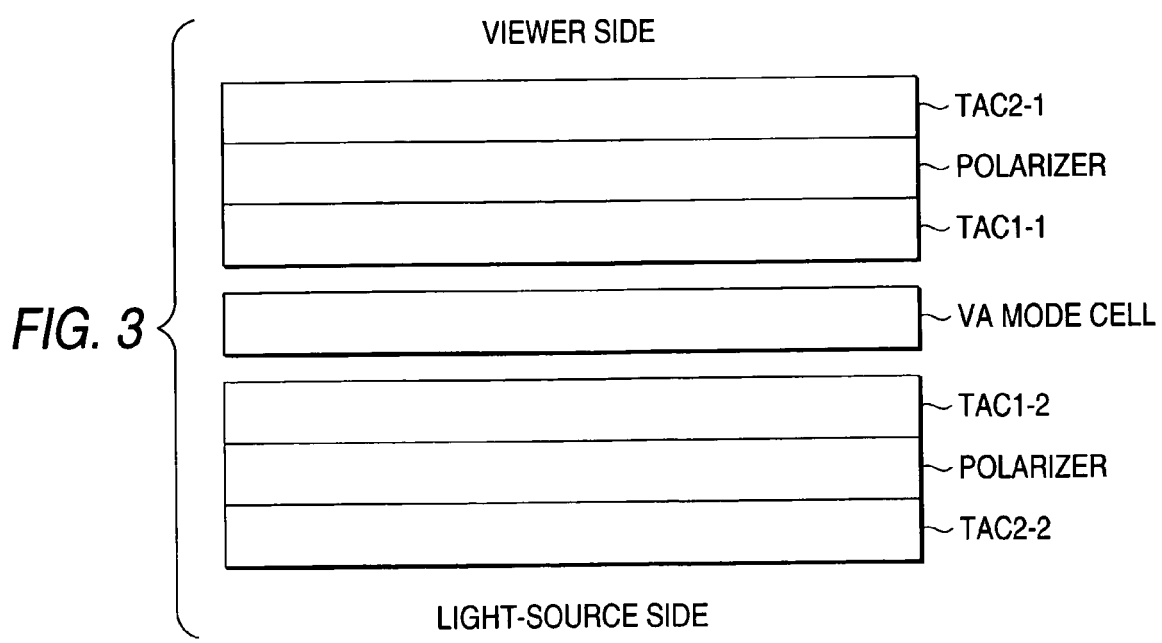
FIG. 3 is a schematic cross-sectional diagram showing an example of a profile structure of a liquid crystal display unit according to an exemplary embodiment of the invention.

A commercially available cellulose triacylate film (FUJI TAC TD80UF, produced by Fuji Photo Film Co., Ltd., corresponding to a functional film TAC2 in FIG. 2 and TAC2-1 or TAC2-2 in FIG. 3) was saponified, and stacked on the other side of the polarizer with the aid of the adhesive of polyvinyl alcohol type, and further dried at 70° C. for at least 10 minutes.

The polarizer was placed so that its transmission axis became parallel to the width direction of each of the cellulose acylate films made in Example 1 (as shown in FIG. 1). The commercially available cellulose acylate film also was placed so that its width direction became parallel to the transmission axis of the polarizer.

Polarizing plates were combined so that each of the cellulose acylate films made in Example 1 was situated on the inside of each polarizer, and thereon were measured total transmittance TT, parallel transmittance PT and cross transmittance CT in the wavelength region of 380 nm to 780 nm by use of a spectrophotometer (UV3100PC). From these measurements, the average values thereof in the wavelength region of 400 to 700 nm were determined. As a result, TT was found to be from 40.8 to 44.7, PT from 34 to 38.8, and CT 1.0 or below. Further, in the durability test by 500-hour standing under conditions of 60° C. and 95% RH, all the polarizing plates formed fell within the ranges $-0.1 \leq \Delta CT \leq 0.2$ and $-2.0 \leq \Delta P \leq 0$, while in the durability test at 60° C. and 90% RH, they fell within the ranges $-0.05 \leq \Delta CT \leq 0.15$ and $-1.5 \leq \Delta P \leq 0$.

One part of each of the polarizing plates A1 to A14 (a polarizing plate integral with an optical compensation film, which is free of a functional film as distinct from that shown in FIG. 2) was stored in a moisture-proof bag as it was, and the other part underwent 2-hour moisture control at 25° C. and 60% RH and then stored in a moisture-proof bag. The moisture-proof bag was a package made of a layered product of polyethylene terephthalate, aluminum and polyethylene, and the moisture permeability thereof was 0.01 mg/m$^2$ or below (24 hours).

<2-2-1>

(Preparation of Coating Solution for Light-Scattering Layer)

A mixture of pentaerythritol triacrylate and pentaerythritol tetraacrylate (PETA, produced by Nippon Kayaku Co., Ltd.) in an amount of 50 g was diluted with 39.5 g of toluene. Thereto, 2 g of a polymerization initiator (Irgacure 184, produced by Ciba Specialty Chemicals, Inc.) was further added, and mixed with stirring. The solution prepared was coated and cured by irradiation with ultraviolet rays. The refractive index of the coating thus formed was 1.51.

To this solution were further added 1.7 g of a 30% toluene dispersion of cross-linked polystyrene particles (refractive index: 1.60, SX-350, produced by Soken Chemical & Engineering Co., Ltd.) having an average particle size of 3.5 μm and 13.3 g of a 30% toluene dispersion of cross-linked acryl-styrene particles (refractive index: 1.44, SX-350, produced by Soken Chemical & Engineering Co., Ltd.) having an average particle size of 3.5 μm, which were each prepared through 20-minute dispersion at 10,000 rpm with a Polytron dispersing machine. Thereto were finally added 0.75 g of a surface modifier of fluorine type (FP-1) and 10 g of a silane coupling agent (KMB-5130, produced by Shin-Etsu Chemical Co., Ltd.), thereby preparing a finished solution.

The mixed solution thus obtained was filtered through a polypropylene filter having a pore size of 30 μm, and served as a coating solution for a light-scattering layer.

<2-2-2>

(Preparation of Coating Solution for Low Refractive-Index Layer)

To begin with, a sol solution (a) was prepared as follows: In a reaction vessel equipped with a stirrer and a reflux condenser, 120 parts of methyl ethyl ketone, 100 parts of acryloyloxypropyltrimethoxysilane (KBM5103, produced by Shin-Etsu Chemical Co., Ltd.) and 3 parts of diisopropoxy-aluminum ethylacetoacetate were placed and mixed, and then thereto 30 parts of ion-exchanged water was added. Therein, reaction was run for 4 hours at 60° C., and then cooled to room temperature. Thus, the sol solution (a) was obtained. The mass-average molecular weight was found to be 1,600, and the proportion of polymers including oligomers, the molecular weights of which were from 1,000 to 20,000, was 100%. In addition, it was ascertained by gas chromatography that the acryloyloxypropyltrimethoxysilane used as a starting material was not left at all. A thermally cross-linkable fluoropolymer having a refractive index of 1.42 (JN-7228, solids concentration: 6%, produced by JSR Corporation) in an amount of 13 g was admixed with 1.3 g of silica sol (silica, differing in grain size from MEK-ST, average grain size: 45 nm, solids concentration: 30%, produced by Nissan Chemical Industries, Ltd.), 0.6 g of the sol solution (a), 5 g of methyl ethyl ketone and 0.6 g of cyclohexanone. The resulting admixture was stirred, and then filtered through a polypropylene filter having a pore size of 1 μm, thereby preparing a coating solution for a low refractive-index layer.

<2-2-3>

(Making of Light-Scattering-Layer-Attached Transparent Protective Film 01)

A 80 μm-thick triacetyl cellulose film (FUJI TAC TD80UF, produced by Fuji Photo Film Co., Ltd.) in a roll form was wound off, and thereon the coating solution for the foregoing functional layer (light-scattering layer) was coated by using a doctor blade and a microgravure roll of 50 mm in diameter having a gravure pattern with a line number of 180 per inch and a depth of 40 μm under conditions that the revs of the gravure roll was 30 rpm and the feeding speed was 30 m/min, and then dried for 150 seconds at 60° C. Thereafter, the coated layer was cured by irradiation with ultraviolet rays under a nitrogen-purged atmosphere by using an air-cooled metallic halide lamp of 160 W/cm (made by Eyegraphics Co., Ltd.) at an illuminance of 400 mW/cm$^2$ and an exposure of 250 mJ/cm$^2$, thereby forming a 6 μm-thick functional layer, and further rewound.

The triacetyl cellulose film coated with the functional layer (light-scattering layer) was wound off again, and on the light-scattering layer side the coating solution for a low refractive index layer was coated by using a doctor blade and a microgravure roll of 50 mm in diameter having a gravure pattern with a line number of 180 per inch and a depth of 40 μm under conditions that the revs of the gravure roll was 30 rpm and the feeding speed was 15 m/min, and then dried at 120° C. for 150 seconds and further at 140° C. for 8 minutes. Thereafter, the coated layer was cured by irradiation with ultraviolet rays under a nitrogen-purged atmosphere by using an air-cooled metallic halide lamp of 240 W/cm (made by Eyegraphics Co., Ltd.) at an illuminance of 400 mW/cm$^2$ and an exposure of 900 mJ/cM$^2$, thereby forming a 100 nm-thick low refractive index layer, and further rewound (corresponding to the functional film TAC2 in FIG. 2 or TAC2-1 in FIG. 3).

<2-3-1>

(Making of Polarizing Plate 2)

Iodine was adsorbed to a stretched polyvinyl alcohol film to make a polarizer.

The light-scattering-layer-attached transparent protective film 01 was subjected to saponification in the same manner as described in <2-2-1>, and the functional film-absent side thereof was bonded to one side of the polarizer with the aid of an adhesive of polyvinyl alcohol type.

The cellolose acylate films made in Example 1 (F1 to F14, corresponding to TAC1 in FIG. 1) were subjected to saponification in the same manner as the above, and each was bonded to the other side of the polarizer with the aid of the adhesive of polyvinyl alcohol type and dried at 70° C. for 10 minutes (to complete the structure shown in FIG. 2).

The polarizer was placed so that its transmission axis became parallel to the width direction of each of the cellulose acylate films made in Example 1 (as shown in FIG. 1). The light-scattering-layer-attached transparent protective film 01 also was placed so that its width direction became parallel to the transmission axis of the polarizer. In the manner described above, polarizing plates (B1 to B14, polarizing plates which each are integral with a functional film and an optical compensation film as shown in FIG. 2) were made. Likewise the polarizing plates made in <2-1-1->, one part of each of the polarizing plates B1 to B 14 was stored in a moisture-proof bag after 2-hour moisture control at 25° C. and 60% RH, and the other part thereof was stored in a moisture-proof bag without moisture control.

Iodine was adsorbed to a stretched polyvinyl alcohol film to make a polarizer. The light-scattering-layer-attached transparent protective film 01 made in <2-2-3> and the functional layer-free 80 μm-thick triacetyl cellulose film (FUJI TAC TD80UF, produced by Fuji Photo Film Co., Ltd.) were subjected to saponification in the same manner as described above were bonded to the polarizer in the same way as described above with the aid of the adhesive of polyvinyl alcohol type, thereby making a polarizing plate (B0: a polarizing plate integral with a functional film and an optical compensation film, as shown in FIG. 2). As in the case with the polarizing plate making <2-2-2>, one part of the polarizing plate was stored in a moisture-proof bag after moisture control, and the other part thereof was stored in a moisture-proof bag without moisture control.

The spectral reflectivity at an incident angle of 5° in the wavelength region of 380 to 780 nm was measured from the functional film side by use of a spectrophotometer (made by JASCO Corporation), and the 450-650 nm integrating-sphere-average reflectivity was determined. Herein, it was found to be 2.3%.

<2-4-1>

(Preparation of Coating Solution for Hard Coating Layer)

To 750.0 parts by mass of trimethylolpropane triacylate (TMPTA, produced by Nippon Kayaku Co., Ltd.), 270.0 parts by mass of poly(glycidyl methacrylate) having a mass-average molecular weight of 3,000, 730.0 g of methyl ethyl ketone, 500.0 g of cyclohexanone and 50.0 g of a photopolymerization initiator (Irgacure184, produced by Nihon Ciba-Geigy K.K.) were added and stirred. This mixture was filtered through a polypropylene filter having a pore size of 0.4 μm, thereby preparing a coating solution for a hard coating layer.

<2-4-2>

As fine particles of titanium dioxide, titanium dioxide fine particles containing cobalt and having undergone a surface treatment using aluminum hydroxide and zirconium hydroxide (MPT-129C, produced by Ishihara Sangyo Kaisha, Ltd.) was used.

To 257.1 g of these particles, 38.6 g of the following dispersing agent and 704.3 g of cyclohexanone were added. This admixture was dispersed with a Dyno Mill, thereby preparing a titanium dioxide dispersion having a mass-average particle size of 70 nm.

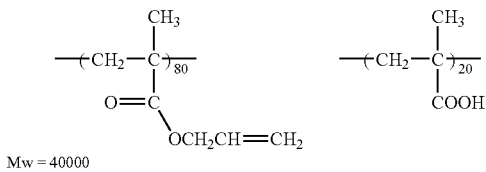

Mw = 40000

<2-4-3>

(Preparation of Coating Solution for Intermediate Refractive-Index Layer)

To 88.9 g of the titanium dioxide dispersion, 58.4 g of a dipentaerythritol pentaacrylate/dipentaerythritol hexaacrylate mixture (DPHA), 3.1 g of a photopolymerization initiator (Irgacure907), 1.1 g of a photosensitizer (KAYACURE DETX, produced by Nippon Kayaku Co., Ltd.), 482.4 g of methyl ethyl ketone and 1869.8 g of cyclohexanone were added and stirred. After thorough stirring, the admixture was filtered through a polypropylene filter having a pore size of 0.4 μm, thereby preparing a coating solution for an intermediate refractive index layer.

<2-4-4>

(Preparation of Coating Solution for High Refractive-Index Layer)

To 586.8 g of the titanium dioxide dispersion, 47.9 g of a dipentaerythritol pentaacrylate/dipentaerythritol hexaacrylate mixture (DPHA, produced by Nippon Kayaku Co., Ltd.), 4.0 g of a photopolymerization initiator (Irgacure907, produced by Nihon Ciab-Geigy K.K.), 1.3 g a photosensitizer (KAYACURE DETX, produced by Nippon Kayaku Co., Ltd.), 455.8 g of methyl ethyl ketone and 142.8 g of cyclohexanone were added and stirred. Then, the admixture was filtered with a polypropylene filter having a pore size of 0.4 µm, thereby preparing a coating solution for a high refractive-index layer.

<2-4-5>

(Preparation of Coating Solution for Low Refractive-Index Layer)

A copolymer having the following structure was dissolved in methyl isobutyl ketone so that the concentration thereof was adjusted to 7% by mass, and thereto were added a terminal methacrylate-containing silicone resin X-22-164C (produced by Shin-Etsu Chemical Co., Ltd.) in a concentration of 3% by mass on a solids basis and the photo-radical initiator (Irgacure907, trade name) in a concentration of 5% by mass on a solids basis. Thereby, a coating solution for a low refractive index layer was prepared.

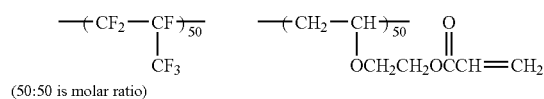

(50:50 is molar ratio)

(Making of Antireflective-Film-Attached Transparent Protective Film 02)

On an 80 µm-thick triacetyl cellulose film (FUJI TAC TD80UF, produced by Fuji Photo Film Co., Ltd.), the coating solution for a hard coating layer was coated with a gravure coater. The coating layer was dried at 100° C., and then cured by subjecting the coating layer to UV irradiation with a 160 W/cm air-cooled metal halide lamp (made by Eye Graphics Co., Ltd.) at an illuminance of 400 mW/cm$^2$ and an exposure of 300 mJ/cm$^2$ while reducing an oxygen concentration in the atmosphere to 1.0 volume % or below by nitrogen purge. Thus, a hard coating layer having a thickness of 8 µm was formed.

On the hard coating layer, the coating solution for an intermediate refractive index layer, the coating solution for a high refractive-index layer and the coating solution for a low refractive-index layer were coated continuously using a gravure coater equipped with 3 coating stations.

The drying of the intermediate refractive index layer was carried out under a condition of 100° C. and 2 minutes, and the UV cure was carried out at illuminance of 400 mW/cm$^2$ and an exposure of 400 mJ/cm$^2$ by use of a 180 W/cm air-cooled metal halide lamp (made by Eye Graphics Co., Ltd.) while reducing an oxygen concentration in the atmosphere to 1.0 volume % or below by nitrogen purge. The intermediate refractive index layer after curing had a refractive index of 1.630 and a thickness of 67 nm.

Both the high refractive-index layer and the low refractive-index layer were dried at 90° C. for 1 minute and further 100° C. for 1 minute, and the UV cure for them was carried out at illuminance of 600 mW/cm$^2$ and an exposure of 600 mJ/cm$^2$ by use of a 240 W/cm air-cooled metal halide lamp (made by Eye Graphics Co., Ltd.) while reducing an oxygen concentration in the atmosphere to 1.0 volume % or below by nitrogen purge.

The high refractive-index layer after curing had a refractive index of 1.905 and a thickness of 107 nm, and the low refractive-index layer after curing had a refractive index of 1.40 and a thickness of 85 nm. In the manner mentioned above, a antireflective layer-attached transparent protective film 01 was made (corresponding to a functional film TAC2 in FIG. 2 or TAC2-1 in FIG. 3).

<2-5-1>

(Making of Polarizing Plate 3)

In the same manner as in <2-3-1>, except that the antireflective layer-attached transparent protective film 02 was used in place of the light-scattering layer-attached transparent protective layer 01, polarizing plates (C1 to C4: polarizing plates which are each integral with a functional film and an optical compensation film, as shown in FIG. 2). In the same manner, a polarizing plate (C0) was made by use of the antireflective layer-attached transparent protective film 02, the polarizer and an 80 µm-thick triacetyl cellulose film (FUJI TAC TD80UF, made by Fuji Photo Film Co., Ltd.) coated with no functional film.

The spectral reflectivity at an incident angle of 5° in the wavelength region of 380 to 780 nm was measured from the functional film side by use of a spectrophotometer (made by JASCO Corporation), and the 450-650 nm integrating-sphere-average reflectivity was determined. Herein, it was found to be 0.4%.

<2-6>

(Making of Optical Compensation Film 1)

Polyimide (weight-average molecular weight: 59,000) synthesized from 2,2'-bis(3,4-dicarboxyphenyl)hexafluoropropane and 2,2'-bis(trifluoromethyl)-4,4'-diaminobiphenyl was dissolved in cyclohexane to prepare a polyimide solution of 15% by mass0 The prepared polyimide solution was coated onto the cellulose acylate film F-1, and stretched in the width direction by a stretch factor of 7% and dried at a temperature of 180° C. The thus prepared optical compensation film L1 has a total thickness of 85 µm. Re and Rth of the film L1 are 60 nm and 210 nm, respectively.

EXAMPLE 3

(Mounting in Panel)

EXAMPLE 3-1

(Mounting in VA Panel) (Single Type)

A liquid crystal display unit as shown in FIG. 3 was produced. More specifically, an upper-side polarizing plate (including TAC2-1 (with or without a functional film), a polarizer and TAC1-1), a VA-mode liquid crystal cell and a lower-side polarizing plate (including TAC1-2, a polarizer and TAC2-2), from the viewing direction (from above), were stacked in the display unit, and further a backlight source was arranged.

<Making of Liquid Crystal Cell>

A liquid crystal cell was made as follows: Two substrates were stacked so that the gap between them was kept at 3.6 µm, and a liquid crystal material having negative permittivity anisotropy (MLC6608, produced by Merck & Co.) was infused in between the substrates and sealed therein to form a liquid crystal layer. The retardation of the liquid crystal layer (the product of a thickness (d µm) and a refractive-index anisotropy (Δn) of the liquid crystal layer, or d Δn) was adjusted to 300 nm. Additionally, the liquid crystal material was oriented so as to have vertical molecular alignment.

In the liquid crystal display unit using a liquid crystal cell of vertical alignment type (FIG. 3), a commercially available super-high contrast polarizing plate (e.g., HLC2-5618 made by Sanritz Corporation) was used as the upper-side polarizing plate (viewer side). As the lower-side polarizing plate (backlight side) was arranged the polarizing plate (each of A1 to A5, A7 to A9 and A11 to A12) made in Example 2 <2-1-1> by use of each of the cellulose acylate films F1 to F5, F7 to F9 and F11 to F12 (optical compensation films) formed in Example 1 so that the cellulose acylate film formed in Example 1 (corresponding to TAC1-2 in FIG. 3) was situated on the liquid crystal cell side. The upper-side polarizing plate and the lower-side polarizing plate were bonded to the liquid crystal cell via an adhesive. Herein, these two polarizing plates were placed in the crossed Nicol arrangement so that the transmission axis of the upper-side polarizing plate was oriented in a vertical direction and that of the lower-side polarizing plate in a lateral direction. The polarizing plates used in making the liquid crystal display units included both the polarizing plates having stored in a moisture-proof sealed bag after 2-hour moisture control under the 25° C.-60% RH condition and those having stored in a moisture-proof sealed bag without moisture control.

As a result of viewing the liquid crystal display units produced herein, although a commercial product was used as the upper-side polarizing plate and the present integral-type polarizing plates were each used as the lower-side polarizing plate, it was ascertained that neutral black-state display was achieved in both frontal direction and viewing-angle direction. In addition, the viewing angles in 8 steps from the black-state display (L1) to the white-state display (L8) (in the range in which the contrast ratio is 10 or more and there is no tone reversal in the black side) were measured with an instrument (EZ-Contrast 160D, made by ELDIM).

In the next place, the color hue of black-state display at an azimuth of 45° relative to the lateral direction of the liquid crystal display screen and in the direction of an polar angle of 60° with respective to the normal to the screen surface was measured with an instrument (EZ-Contrast 160D, made by ELDIM), and taken as the initial value. Then, this panel was allowed to stand for one week in a room in the normal range of temperature and humidity (of the order of 25° C.-60% RH, without humidity control), and the color hue in the black-state display was measured again.

The measured values of viewing angles and changes in color hue are shown in Table 3. All the liquid crystal display units made in accordance with the invention had wide viewing angles and slight changes in color hue. The liquid crystal display units using the polarizing plates having undergone humidity control prior to the assembly were more greatly reduced in change of color hue.

Further, the liquid crystal display units were stand for 24 hours in the surroundings of 60° C.-90% RH, and the units taken out of these surroundings were examined for light leakage. The examination results obtained are shown in Table 4. Light leaks owing to a warp of glass cell were not observed in the present cases.

EXAMPLE 3-2

In the liquid crystal display unit (FIG. 3) using the liquid display cell of vertical alignment type, the polarizing plate (each of A1 to A5, A7 to A9 and A11 to A12) made in Example 2 <2-1-1> by use of each of the cellulose acylate films F1 to F5, F7 to F9 and F11 to F12 (optical compensation films) formed in Example 1 was used as the lower-side polarizing plate (backlight side), and the polarizing plate (B0) made in Example 2 <2-3-1> was used as the upper-side polarizing plate. These polarizing plates were bonded to the liquid crystal cell via an adhesive. Herein, they are arranged so that each of the cellulose acylate films formed in Example 1 was situated on the liquid crystal cell side. In addition, these two polarizing plates were placed in the crossed Nicol arrangement so that the transmission axis of the viewer-side polarizing plate was oriented in a vertical direction and that of the backlight-side polarizing plate in a lateral direction. During these operations, the work area was air-conditioned so as to keep the temperature at 20° C. to 25° C. and the humidity at 50% RH to 70% RH. The polarizing plates used herein for making the liquid crystal display units included both the polarizing plates having stored in a moisture-proof sealed bag after 2-hour moisture control under the 25° C.-60% RH condition and those having stored in a moisture-proof sealed bag without moisture control.

As a result of observing each of the liquid crystal display units produced, it was ascertained that neutral black-state display was achieved in both frontal direction and viewing-angle direction. Further, viewing angles and changes in color hue were measured by the same procedure as in Example 3-1. The results obtained are shown in Table 3.

In addition, light leakages were measured in the same manner as in Example 3-1, and the result thereof is shown in Table 4.

EXAMPLE 3-3

In the liquid crystal display unit (FIG. 3) using the same liquid display cell of vertical alignment type as in Example 3-1, except that the cell gap was set at 4.3 μm and the value of Δd was adjusted to 360 nm, the polarizing plate (each of A13 and A14) made in Example 2 <2-1-1> by use of each of the cellulose acylate films F13 and F14 (optical compensation films) formed in Example 1 was used as the lower-side polarizing plate, and the polarizing plate (C0) made in Example 2 <2-5-1> was used as the upper-side polarizing plate. These polarizing plates were bonded to the liquid crystal cell via an adhesive. At this time, they are arranged so that each of the cellulose acylate films formed in Example 1 was situated on the liquid crystal cell side. In addition, these two polarizing plates were placed in the crossed Nicol arrangement so that the transmission axis of the viewer-side polarizing plate was oriented in a vertical direction and that of the backlight-side polarizing plate in a lateral direction. During these operations, the work area was air-conditioned so as to keep the temperature at 20° C. to 25° C. and the humidity at 50% RH to 70% RH. The polarizing plates used herein for making the liquid crystal display units included both the polarizing plates having stored in a moisture-proof sealed bag after 2-hour moisture control under the 25° C.-60% RH condition and those having stored in a moisture-proof sealed bag without moisture control.

As a result of observing each of the liquid crystal display units produced, it was ascertained that neutral black-state display was achieved in both frontal direction and viewing-angle direction. Further, viewing angles and changes in color hue were measured by the same procedure as in Example 3-1. The results obtained are shown in Table 3.

In addition, light leakages were measured in the same manner as in Example 3-1, and the result thereof is shown in Table 4.

COMPARATIVE EXAMPLE 3-1

The mounting in VA panels was performed in the same manner as in Example 3-1, except that A6, B6, A10 and B10 were used as the lower-side polarizing plates, respectively. Incidentally, all the polarizing plates used herein were sealed and stored in advance in a moisture-proofing bag without undergoing moisture control.

As a result of observing each of the liquid crystal display units produced, it was ascertained that neutral black-state display was achieved in both frontal direction and viewing-angle direction. Further, viewing angles and changes in color hue were measured by the same procedure as in Example 3-1. The results obtained are shown in Table 3.

In addition, light leakages were measured in the same manner as in Example 3-1, and the result thereof is shown in Table 4.

TABLE 3

| Liquid crystal display unit | Viewing Angle | | Black hue change (ΔE*) after 1-week lapse from assembly | |
|---|---|---|---|---|
| | direction of transmission axis | direction of 45° relative to transmission axis | without moisture control | with moisture control |
| Example 3-1 | >80° | >80° | 0.010 to 0.013 | 0.002 |
| Example 3-2 | " | " | " | " |
| Example 3-3 | " | " | " | " |
| Comparative Example 3-1 | <50° | <50° | 0.020 to 0.032 | — |

As can be seen from Table 3, each of the samples produced in Example 3-1 to Example 3-3 according to the invention had sufficiently wide viewing angles and color hues highly stable to aging, and they are clearly superior in these points to the comparative sample.

TABLE 4

| | Light Leaks |
|---|---|
| Example 3-1 | not observed |
| Example 3-2 | not observed |
| Example 3-3 | not observed |
| Comparative Example 3-1 | observed |

As shown in Table 4, light leaks coming from a warp in the glass cell were not observed with respect to any of the samples produced in Examples 3-1 to 3-3 according to the invention. In this point also, superiority of the present samples to the comparative sample is corroborated.

The same performance examinations as given to the VA-mode liquid crystal display units were made on OCB-mode liquid crystal display units. As a result, it has been ascertained that the cellulose acylate films, polarizing plates and liquid crystal display units according to the invention had substantial effects on viewing angles, color hue changes and light leakage.

EXAMPLE 4

<4-1>

<Formation of Cellulose Acylate Film>

<Preparation of Cellulose Acylate Solution (A)>

The following composition was charged and stirred in a mixing tank, and the ingredients therein were dissolved to prepare a cellulose acylate solution (A).

| Composition of Cellulose Acylate Solution (A) | |
|---|---|
| Cellulose acetate having acetyl substitution degree of 2.86 | 100.0 parts by mass |
| Compound I-(7) illustrated in the specification | 12.0 parts by mass |
| Methylene chloride | 403.0 parts by mass |
| Methanol | 60.2 parts by mass |

<4-2> Matting Agent Dispersion

The following ingredients including the cellulose acylate solution prepared in the foregoing manner were charged into a dispersing machine, thereby preparing a dispersion of matting agent.

| Matting Agent Dispersion | |
|---|---|
| Silica grains having an average size of 16 nm (Aerosil R972, produced by Nippon Aerosil Co., Ltd.) | 2.0 parts by mass |
| Methylene chloride | 72.4 parts by mass |
| Methanol | 10.8 parts by mass |
| Cellulose acylate solution | 10.3 parts by mass |

A dope (A) for film formation was prepared by mixing 100 parts by mass of the cellulose acylate solution (A) with 1.35 parts by mass of the matting agent dispersion. The dope thus prepared was used for forming films F15 to F18.

<4-3>

<Preparation of Cellulose Acylate Solution (B)>

The following composition was charged and stirred in a mixing tank, and the ingredients therein were dissolved to prepare a cellulose acylate solution (B).

| Composition of Cellulose Acylate Solution (B) | |
|---|---|
| Cellulose acetate having acetyl substitution degree of 2.92 | 100.0 parts by mass |
| Compound IV-1 illustrated in the specification | 12.0 parts by mass |
| Methylene chloride | 403.0 parts by mass |
| Methanol | 60.2 parts by mass |

A dope (B) for film formation was prepared by mixing 100 parts by mass of the cellulose acylate solution (B) with 1.35 parts by mass of the matting agent dispersion. The dope thus prepared was used for forming films F19 to F22.

<4-4>

<Preparation of Cellulose Acylate Solution (C)>

The following composition was charged and stirred in a mixing tank, and the ingredients therein were dissolved to prepare a cellulose acylate solution (C).

| Composition of Cellulose Acylate Solution (C) | |
|---|---|
| Cellulose acetate having acetyl substitution degree of 2.75 | 100.0 parts by mass |
| Compound C-1 illustrated below | 12.0 parts by mass |
| Methylene chloride | 403.0 parts by mass |
| Methanol | 60.2 parts by mass |

A dope (C) for film formation was prepared by mixing 100 parts by mass of the cellulose acylate solution (C) with 1.35 parts by mass of the matting agent dispersion. The dope thus prepared was used for forming films F23 to F26.

Compound C-1

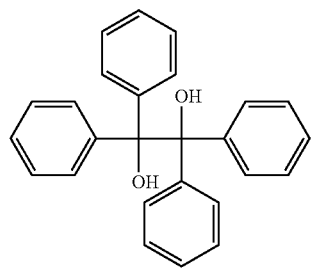

<Preparation of Cellulose Acylate Solution (D)>

The following composition was charged and stirred in a mixing tank, and the ingredients therein were dissolved to prepare a cellulose acylate solution (D).

| Composition of Cellulose Acylate Solution (D) | |
|---|---|
| Cellulose acetate having acetyl substitution degree of 2.81 | 100.0 parts by mass |
| Compound D-1 illustrated below | 12.0 parts by mass |
| Methylene chloride | 300.0 parts by mass |
| Methanol | 54.0 parts by mass |
| 1-Butanol | 11.0 parts by mass |

A dope (D) for film formation was prepared by mixing 100 parts by mass of the cellulose acylate solution (D) with 1.35 parts by mass of the matting agent dispersion. The dope thus prepared was used for forming films F27 and F28.

Compound D-1

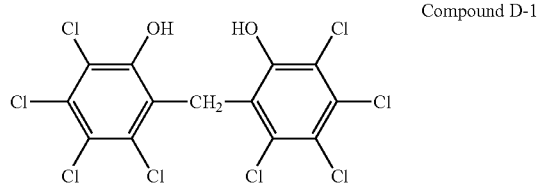

COMPARATIVE EXAMPLE 4

<4-5>

<Preparation of Cellulose Acylate Solution (E)>

The following composition was charged and stirred in a mixing tank, and the ingredients therein were dissolved to prepare a cellulose acylate solution (E).

| Composition of Cellulose Acylate Solution (E) | |
|---|---|
| Cellulose acetate having acetyl substitution degree of 2.86 | 100.0 parts by mass |
| Triphenyl phosphate | 8.0 parts by mass |
| Biphenyldiphenyl phosphate | 4.0 parts by mass |
| Methylene chloride | 403.0 parts by mass |
| Methanol | 60.2 parts by mass |

A dope (E) for film formation was prepared by mixing 100 parts by mass of the cellulose acylate solution (E) with 1.35 parts by mass of the matting agent dispersion. The dope thus prepared was used for forming films F29 to F31.

<4-6>

<Preparation of Cellulose Acylate Solution (F)>

The following composition was charged and stirred in a mixing tank, and the ingredients therein were dissolved to prepare a cellulose acylate solution (F).

| Composition of Cellulose Acylate Solution (F) | |
|---|---|
| Cellulose acetate having acetyl substitution degree of 2.81 | 100.0 parts by mass |
| Compound F-1 illustrated below | 12.0 parts by mass |
| Methylene chloride | 300.0 parts by mass |
| Methanol | 54.0 parts by mass |
| 1-Butanol | 11.0 parts by mass |

A dope (F) for film formation was prepared by mixing 100 parts by mass of the cellulose acylate solution (F) with 1.35 parts by mass of the matting agent dispersion. The dope thus prepared was used for forming films F32 and F33.

Compound F-1

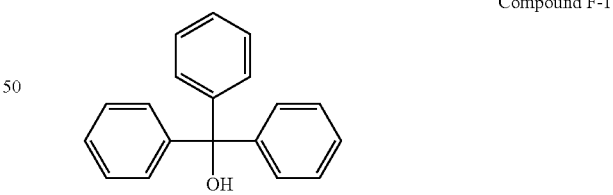

(Flow Casting)

Each of the dopes (A) to (C) and (E) was flow-cast into film by use of a band-type casting machine. When the film was stripped away from the band, it was stretched in its traveling direction by a stretch factor of 5%. In forming the films F15, F18, F19, F22, F23, F26 and F29, each of the films stripped away from the band was further stretched in the width direction by a stretch factor of 10% by use of a tenter. On the other hand, in forming the films F16, F20, F24 and F30, each of the films stripped away from the band was further stretched in the width direction by a stretch factor of 30% by use of a tenter.

In forming the films F17, F21, F25 and F31, each of the films stripped away from the band was dried without stretch in the width direction.

In the tenter, each film was stretched in the direction of the width as it was dried by exposure to hot air, and then made to shrink by about 5%. Thereafter, the tenter conveyance was changed to roll conveyance, and each film was further dried, subjected to knurling and reeled at the time when the width reached to 1,500 mm. The stretch factor was calculated from the film width measured at the entrance of the tenter and the film width measured at the exit of the tenter, and presented in Table 5.

The dopes D and F were each flow-cast into film by use of a drum-type casting machine. Each film was stretched in its traveling direction by a stretch factor of 10% when stripped away from the drum and when conveyed with a pin tenter, respectively. During the conveyance with the pin tenter, each film was made to shrink by about 5% in the width direction as it was dried by exposure to hot air, and peeled. Further, in forming the films F27 and F32, each film peeled from the drum was stretched by a stretch factor of 15% in the width direction. On the other hand, in forming the films F28 and F33, each film stripped away from the drum was dried without stretch in the width direction. Thereafter, the pin tenter conveyance was changed to roll conveyance, and each film was further dried, subjected to knurling, and reeled at the time when the width reached to 1,500 mm. The stretch factor was calculated from the film width measured at the entrance of the pin tenter and the film width measured at the exit of the pin tenter, and presented in Table 5.

below. The tensile elasticity moduli of the films made in this Example 4 were 4,800 MPa or above. The changes in mass by 48-hour standing under conditions of 80° C. and 90% RH were from 0% to 3%. In addition, the dimensional changes by 24-hour standing under conditions of 60° C. and 90% RH and those by 24-hour standing under 90° C. and 3% RH were all in the range of −1.2% to 0.2%. Further, every sample film had a photoelasticity coefficient of $50\times10^{-13}$ cm$^2$/dyne ($5\times10^{-11}$ m$^2$/N) or below.

<4-7>

(Making of Optical Compensation Film 2)

Polyimide (weight-average molecular weight: 59,000) synthesized from 2,2'-bis(3,4-dicarboxyphenyl)hexafluoropropane and 2,2'-bis(trifluoromethyl)-4,4'-diaminobiphenyl was dissolved in cyclohexane to prepare a polyimide solution of 15% by mass0 The prepared polyimide solution was coated onto the cellulose acylate film F-15, and stretched in the width direction by a stretch factor of 7% and dried at a temperature of 180° C. The thus prepared optical compensation film L15 has a total thickness of 77 μm. Re and Rth of the film L15 are 55 nm and 190 nm, respectively.

EXAMPLE 5

(Making of Polarizing Plate)

Iodine was adsorbed to a stretched polyvinyl alcohol film to make a polarizer.

Each of the cellulose acylate films (F15 to F28, corresponding to the functional film TAC2 in FIG. 2, TAC2-2 or

TABLE 5

| Film No. | Dope No. | Additives | Amount of solvent (mass %) when stretch starts MD | TD | TD stretch rate | Elasticity Modulus (MPa) MD | TD | S(MD)/S(TD) | Moisture permeability (g/m², 24 hours) | Average film thickness (μm) |
|---|---|---|---|---|---|---|---|---|---|---|
| 15 | A | I-7 | 32 | 18 | 1.05 | 5300 | 5300 | 1.00 | 1120 | 81 |
| 16 | A | Triazine | 32 | 18 | 1.25 | 5000 | 5600 | 0.89 | 1180 | 76 |
| 17 | A |  | 32 | 18 | 9.95 | 5300 | 5100 | 1.04 | 1120 | 82 |
| 18 | A |  | 50 | 30 | 1.05 | 5100 | 4800 | 1.06 | 1130 | 81 |
| 19 | B | IV-1 | 32 | 18 | 1.05 | 5000 | 5100 | 0.98 | 920 | 80 |
| 20 | B | Phenyldiol | 32 | 18 | 1.25 | 4800 | 5200 | 0.92 | 930 | 77 |
| 21 | B |  | 32 | 18 | 0.95 | 5000 | 4800 | 1.04 | 930 | 82 |
| 22 | B |  | 50 | 30 | 1.05 | 4900 | 4650 | 1.05 | 910 | 81 |
| 23 | C | C-1 | 32 | 18 | 1.05 | 4900 | 5000 | 0.98 | 1100 | 82 |
| 24 | C | Diol | 32 | 18 | 1.25 | 4800 | 5100 | 0.94 | 1130 | 75 |
| 25 | C |  | 32 | 18 | 0.95 | 4900 | 4900 | 1.00 | 1090 | 83 |
| 26 | C |  | 50 | 30 | 1.05 | 4750 | 4600 | 1.03 | 1100 | 82 |
| 27 | D | D-1 | 71 | 60 | 1.00 | 5100 | 5100 | 1.00 | 1080 | 80 |
| 28 | D | Biphenol | 71 | 60 | 0.86 | 5200 | 4600 | 1.13 | 1110 | 81 |
| 29 | E | Triphenyl phosphate | 32 | 18 | 1.05 | 3900 | 4100 | 0.95 | 1250 | 81 |
| 30 | E | phosphate | 32 | 18 | 1.25 | 3800 | 4400 | 0.86 | 1270 | 77 |
| 31 | E | Biphenyl-diphenyl phosphate | 32 | 18 | 0.95 | 4000 | 4000 | 1.00 | 1240 | 83 |
| 32 | F | F-1 | 71 | 60 | 1.00 | 4400 | 4500 | 0.98 | 1280 | 83 |
| 33 | F | Monoalcohol | 71 | 60 | 0.86 | 4500 | 4000 | 1.13 | 1310 | 84 |

The thus made films had their glass transition temperatures (Tg) in the range of 138° C. to 147° C. Their moisture content rates after moisture control to 80% RH at 25° C. were in the range of 2.7% to 3.4%. In addition, their moisture permeabilities under conditions of 60° C., 95% RH and 24 hours were in the range of 800 to 1,500 g/m²/day. All these films had their haze values in the range of 0.1 to 0.9, and the average diameter of secondary particles of the matting agent used was 1.0 μm or TAC2-2 in FIG. 3) formed in Example 4 was stacked on one side of the polarizer with the aid of an adhesive of polyvinyl alcohol type. Saponification treatment for these films was performed under the following condition.

A 1.5N water solution of sodium hydroxide was prepared, and kept at 55° C. A 0.01N aqueous dilute sulfuric acid was prepared, and kept at 35° C. The cellulose acylate films formed were immersed for 2 minutes in the water solution of sodium hydroxide, and then immersed in water to thoroughly wash the sodium hydroxide away from the films. Then, the films were immersed for 1 minute in the dilute aqueous sulfuric acid, and then immersed in water to thoroughly wash the sulfuric acid away from the films. Finally, these film samples were fully dried at 120° C.

The cellulose acylate film F5 formed in Example 1 was subjected to saponification, and then stacked on the other side of the polarizer with the aid of an adhesive of polyvinyl alcohol type, and further dried at 70° C. for at least 10 minutes.

The polarizer was placed so that its transmission axis became parallel to the width direction of each of the cellulose acylate films made in Example 4 (as shown in FIG. 1).

Polarizing plates were combined so that each of the cellulose acylate films made in Example 4 was situated on the outside of each polarizer, and thereon were measured total transmittance TT, parallel transmittance PT and cross transmittance CT in the wavelength region of 380 nm to 780 nm by use of a spectrophotometer (UV3100PC). From these measurements, the average values thereof in the wavelength region of 400 to 700 nm were determined. As a result, TT was found to be from 40.8 to 44.7, PT from 34 to 38.8, and CT 1.0 or below. Further, in the durability test by 500-hour standing under conditions of 60° C. and 95% RH, all the polarizing plates formed fell within the ranges $-0.1 \leq \Delta CT \leq 0.2$ and $-2.0 \leq \Delta P \leq 0$, while in the durability test at 60° C. and 90% RH, they fell within the ranges $-0.05 \leq \Delta CT \leq 0.15$ and $-1.5 \leq \Delta P \leq 0$.

EXAMPLE 6

(Mounting in VA Panel) (Single Type)

A liquid crystal display unit as shown in FIG. 3 was produced. More specifically, an upper-side polarizing plate (including TAC2-1 (with or without a functional film), a polarizer and TAC1-1), a VA-mode liquid crystal cell and a lower-side polarizing plate (including TAC1-2, a polarizer and TAC2-2), from the viewing direction (from above), were stacked in the display unit, and further a backlight source was arranged.

<Making of Liquid Crystal Cell>

A liquid crystal cell was made as follows: Two substrates were stacked so that the gap between them was kept at 3.6 μm, and a liquid crystal material having negative permittivity anisotropy (MLC6608, produced by Merck & Co.) was infused in between the substrates and sealed therein to form a liquid crystal layer. The retardation of the liquid crystal layer (the product of a thickness (d μm) and a refractive-index anisotropy (Δn) of the liquid crystal layer, or d Δn) was adjusted to 300 nm. Additionally, the liquid crystal material was oriented so as to have vertical molecular alignment.

In the liquid crystal display unit using a liquid crystal cell of vertical alignment type (FIG. 3), the polarizing plate (each of A15, A17, A19, A21, A23, A25 and A27) made in Example 5 by use of each of the cellulose acylate films F1, F17, F19, F21, F23, F25 and F27 (optical compensation films) formed in Example 4 was used as each of the upper-side polarizing plate and the lower-side polarizing plate and arranged so that the cellulose acylate film formed in Example 4 (corresponding to TAC2-1 or 2-2 in FIG. 3) was situated on the light-source side of the lower-side polarizing plate or the viewer side of the upper-side polarizing plate. The upper-side polarizing plate and the lower-side polarizing plate were bonded to the liquid crystal cell via an adhesive. Herein, these two polarizing plates were placed in the crossed Nicol arrangement so that the transmission axis of the upper-side polarizing plate was oriented in a vertical direction and that of the lower-side polarizing plate in a lateral direction.

Further, the liquid crystal display units were stand for 24 hours in the surroundings of 60° C.-90% RH, and the units taken out of these surroundings were examined for light leakage. The examination results obtained are shown in Table 6. Light leaks caused by a photoelasticity effect were not observed.

COMPARATIVE EXAMPLE 6-1

Liquid crystal display units were produced in the same manner as in Example 6, except that the polarizing plates A16, A18, A20, A22, A24, A26 and A28 to A33 were respectively used in place of the polarizing plates used in Example 6.

As a result of observing each of the liquid crystal display units produced, it was ascertained that neutral black-state display was achieved in both frontal direction and viewing-angle direction. In addition, light leakages were measured in the same manner as in Example 6, and the result thereof is shown in Table 6.

COMPARATIVE EXAMPLE 6-2

Liquid crystal display units were produced in the same manner as in Example 6, except that the polarizing plates A6, B6, A10 and B10 were respectively used in place of the polarizing plates used in Example 6.

As a result of observing each of the liquid crystal display units produced, it was ascertained that neutral black-state display was achieved in both frontal direction and viewing-angle direction. In addition, light leakages were measured in the same manner as in Example 6, and the result thereof is shown in Table 6.

TABLE 6

| Light Leakage caused by Photoelasticity Effect | |
| --- | --- |
| Example 6 | small |
| Comparative Example 6-1 | medium |
| Comparative Example 6-2 | great |

As shown in Table 6, light leakage caused by a photoelasticity effect was small with respect to every sample produced in Example 6 according to the invention. Use of the present film as the air-side protective film also made it possible to further reduce light leakage, compared with the use on the liquid crystal side alone.

EXAMPLE 7

(Mounting of Optical Compensation Film in VA Panel)

Each of the optical compensation films L1 and L15 was mounted in the VA-mode liquid crystal display unit and evaluated in the same manner as in Example 3-1, except that each of the optical compensation films L1 and L15 was used in place of the film on the liquid crystal display-side of the lower-side polarizing plate (corresponding to TAC 1-2 in FIG. 3).

The optical compensation film, polarizing plate and liquid crystal display unit have unexpected results in viewing angle, change in color hue and light leakage.

The same performance examinations as given to the VA-mode liquid crystal display units were made on OCB-mode liquid crystal display units. As a result, it has been ascertained that the cellulose acylate films, optical compensation films, polarizing plates and liquid crystal display units according to the invention had substantial effects on viewing angles, color hue changes and light leakage.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application Nos. JP2005-125463 and JP2005-288708, filed Apr. 7 of 2005 and Sep. 30 of 2005, respectively, the contents of which are incorporated herein by reference.

What is claimed is:

1. A cellulose acylate film having an elasticity modulus of 4,800 MPa to 10,000 MPa in at least one direction of a machine direction MD in producing of the cellulose acylate film and a transverse direction TD perpendicular to the machine direction, the cellulose acylate film having an in-plane retardation Re($\lambda$) satisfying Expression: 20 nm $\leq$ Re(590) $\leq$ 200 nm and a thickness-direction retardation Rth($\lambda$) satisfying Expression: 70 nm $\leq$ Rth(590) $\leq$ 350 nm, and the cellulose acylate film having a thickness of 40 μm to 150 μm;

wherein the cellulose acylate film comprises mixed fatty acid ester of cellulose, wherein a hydroxyl group of the cellulose is substituted by an acetyl group, another hydroxyl group of the cellulose is substituted by an acyl group having 3 or more carbon atoms, and the cellulose acylate film satisfies Expressions (I) and (II):

$$2.0 \leq A+B \leq 3.0 \tag{I}$$

$$0 < B \tag{II}$$

wherein A represents a substitution degree of the acetyl group, and B represents a substitution degree of the acyl group having 3 or more carbon atoms; and wherein the mixed fatty acid ester of cellulose is a cellulose acylate comprising a glucose unit, wherein a hydroxyl group of the glucose unit is substituted by the acetyl group or the acyl group having 3 or more carbon atoms, and the cellulose acylate film satisfies Expressions (III) and (IV):

$$2.0 \leq DS2 \leq DS3 \leq DS6 \leq 2.85 \tag{III}$$

$$DS6/(DS2+DS3DS6) \geq 0.315 \tag{IV}$$

wherein DS2 represents a substitution degree of the acyl group for a 2-position hydroxyl group of the glucose unit, DS3 a substitution degree of the acyl group for a 3- position hydroxyl group of the glucose unit, and DS6 a substitution degree of the acyl group for a 6-position hydroxyl group of the glucose unit.

2. The cellulose acylate film according to claim 1, which is produced by stretching a film having a solvent in a proportion of 20% by weight or less at the start of the stretching.

3. The cellulose acylate film according to claim 1, which has undergone a stretching at a drawing ratio of 1.01 to 3.

4. The cellulose acylate film according to claim 1, which has undergone a stretching at a temperature of 70° C. to 250° C.

5. The cellulose acylate film according to claim 1, wherein the acyl group is a butanoyl group.

6. The cellulose acylate film according to claim 1, wherein the acyl group is a propionyl group, and the substitution degree B is at least 0.6.

7. The cellulose acylate film according to claim 1, which comprises a retardation developer.

8. The cellulose acylate film according to claim 1, which comprises a retardation developer in an amount of 10 parts by weight or less with respect to 100 parts by weight of cellulose acylate.

9. The cellulose acylate film according to claim 1, which comprises at least one of a plasticizer, an ultraviolet absorber and a release accelerator.

10. A polarizing plate comprising: a polarizer; a protective film of a cellulose acylate film according to claim 1, and at least one layer of hard coating layer, an antiglare layer and an antireflection layer, in this order, wherein the polarizer is disposed between the protective film and a liquid crystal cell.

11. A liquid crystal display device comprising a cellulose acylate film according to claim 1.

12. The liquid crystal display according to claim 11, which is of VA mode.

* * * * *